(12) United States Patent
Wang

(10) Patent No.: US 12,540,946 B2
(45) Date of Patent: Feb. 3, 2026

(54) METHODS AND SYSTEMS FOR DETECTING AND QUANTIFYING LARGE NUMBER OF MOLECULE BIOMARKERS FROM A BODY FLUID SAMPLE

(71) Applicant: Complete Omics Inc., Baltimore, MD (US)

(72) Inventor: Qing Wang, Baltimore, MD (US)

(73) Assignee: Complete Omics Inc., Baltimore, MD (US)

( * ) Notice: Subject to any disclaimer, the term of this patent is extended or adjusted under 35 U.S.C. 154(b) by 989 days.

(21) Appl. No.: 17/762,425

(22) PCT Filed: Mar. 18, 2022

(86) PCT No.: PCT/US2022/020989
§ 371 (c)(1),
(2) Date: Sep. 22, 2022

(87) PCT Pub. No.: WO2022/198071
PCT Pub. Date: Sep. 22, 2022

(65) Prior Publication Data
US 2024/0053355 A1    Feb. 15, 2024

Related U.S. Application Data

(60) Provisional application No. 63/162,894, filed on Mar. 18, 2021.

(51) Int. Cl.
*G01N 33/68* (2006.01)
*C12Q 1/6872* (2018.01)
(Continued)

(52) U.S. Cl.
CPC ....... *G01N 33/6848* (2013.01); *C12Q 1/6872* (2013.01); *G01N 33/92* (2013.01);
(Continued)

(58) Field of Classification Search
None
See application file for complete search history.

(56) References Cited

U.S. PATENT DOCUMENTS

2006/0246495 A1   11/2006   Garrett et al.
2012/0220491 A1    8/2012   Hutchens et al.
(Continued)

FOREIGN PATENT DOCUMENTS

WO    WO 2010/117817 A2    10/2010

OTHER PUBLICATIONS

Holman, S. W., RePLiCal: A QconCAT Protein for Retention Time Standardization in Proteomics Studies, J. Proteome Res. 2016, 15, 1090-1102 (Year: 2016).*

(Continued)

*Primary Examiner* — Xiaoyun R Xu
(74) *Attorney, Agent, or Firm* — Ming Zhang

(57) ABSTRACT

A method for detecting and quantifying analytes in a sample can include (a) identifying and/or profiling the analytes; (b) identifying at least one divider analyte from the analytes; (c) dividing the analytes into groups using the at least one divider analyte; and (d) detecting and/or quantifying a first group of analytes ending with a first divider analyte by scanning and/or quantifying the first group of analytes until a first threshold of intensity of the first divider analyte is reached. The method can further include (e) switching to detect and quantify a second group of analytes starting with the first divider analyte by scanning and quantifying the second group of analytes until a second threshold of intensity of a second divider analyte is reached. The step e) can be repeated until each group is scanned and/or quantified.

20 Claims, 4 Drawing Sheets
Specification includes a Sequence Listing.

(51) Int. Cl.
  *G01N 33/92*  (2006.01)
  *H01J 49/00*  (2006.01)
(52) U.S. Cl.
  CPC .... *H01J 49/0031* (2013.01); *C12Q 2600/156* (2013.01); *G01N 2570/00* (2013.01)

(56) References Cited

U.S. PATENT DOCUMENTS

2017/0074827 A1  3/2017  Prasad et al.
2017/0226564 A1  8/2017  Sitdikov et al.
2017/0370954 A1  12/2017  Perichon et al.

OTHER PUBLICATIONS

International Preliminary Report and Written Opinion for PCT/US2022/020989 dated Sep. 12, 2023 8 pages.
Lamb, et al., "A practical approach" Gene Probes, Apr. 4, 1995, abstract 1 page.
Office Action for EP18781045.2, Oct. 17, 2023m 5 pages.

\* cited by examiner

SEQUENCE LISTING

<160> NUMBER OF SEQ ID NOS: 90

<210> SEQ ID NO 1
<211> LENGTH: 10
<212> TYPE: PRT
<213> ORGANISM: Homo sapiens

```
<400> SEQUENCE: 1

Ala Gly Ala His Leu Gln Gly Gly Ala Lys
 1               5                  10

<210> SEQ ID NO 2
<211> LENGTH: 8
<212> TYPE: PRT
<213> ORGANISM: Homo sapiens

<400> SEQUENCE: 2

Thr Thr Ser Gly Ile His Pro Lys
 1               5

<210> SEQ ID NO 3
<211> LENGTH: 9
<212> TYPE: PRT
<213> ORGANISM: Homo sapiens

<400> SEQUENCE: 3

Ser Ser Thr Pro Glu Glu Val Lys Lys
 1               5

<210> SEQ ID NO 4
<211> LENGTH: 9
<212> TYPE: PRT
<213> ORGANISM: Homo sapiens

<400> SEQUENCE: 4

Lys Leu Ala Gly Asp Glu Ser Ala Asp
 1               5

<210> SEQ ID NO 5
<211> LENGTH: 9
<212> TYPE: PRT
<213> ORGANISM: Homo sapiens

<400> SEQUENCE: 5

Ser Leu Asp Glu His Tyr His Ile Arg
 1               5

<210> SEQ ID NO 6
<211> LENGTH: 12
<212> TYPE: PRT
<213> ORGANISM: Homo sapiens

<400> SEQUENCE: 6

Thr Ser Ala Pro Pro Ser Arg Pro Pro Pro
 1               5                  10

Pro Arg

<210> SEQ ID NO 7
<211> LENGTH: 7
<212> TYPE: PRT
<213> ORGANISM: Homo sapiens

<400> SEQUENCE: 7

Thr Asn Tyr Ile Gly His Lys
 1               5

<210> SEQ ID NO 8
<211> LENGTH: 15
<212> TYPE: PRT
<213> ORGANISM: Homo sapiens
```

```
<400> SEQUENCE: 8

Thr Asp Thr Ser His His Asp Gln Asp His
                 5                   10

Pro Thr Phe Asn Lys
                15

<210> SEQ ID NO 9
<211> LENGTH: 10
<212> TYPE: PRT
<213> ORGANISM: Homo sapiens

<400> SEQUENCE: 9

Asp Ile Ala Ala Asn Glu Glu Asn Arg Lys
                 5                   10

<210> SEQ ID NO 10
<211> LENGTH: 10
<212> TYPE: PRT
<213> ORGANISM: Homo sapiens

<400> SEQUENCE: 10

Val Thr Ser Gly Ser Thr Thr Thr Thr Arg
                 5                   10

<210> SEQ ID NO 11
<211> LENGTH: 8
<212> TYPE: PRT
<213> ORGANISM: Homo sapiens

<400> SEQUENCE: 11

Asp Cys Gln Asp Ile Ala Asn Lys
                 5

<210> SEQ ID NO 12
<211> LENGTH: 10
<212> TYPE: PRT
<213> ORGANISM: Homo sapiens

<400> SEQUENCE: 12

Glu His Met Gln Pro Thr His Pro Ile Arg
                 5                   10

<210> SEQ ID NO 13
<211> LENGTH: 12
<212> TYPE: PRT
<213> ORGANISM: Homo sapiens

<400> SEQUENCE: 13

Gly Pro Pro Ala Ser Ser Pro Ala Pro Ala
                 5                   10

Pro Lys

<210> SEQ ID NO 14
<211> LENGTH: 9
<212> TYPE: PRT
<213> ORGANISM: Homo sapiens

<400> SEQUENCE: 14

Lys Leu Asn Val Thr Glu Gln Glu Lys
                 5

<210> SEQ ID NO 15
```

```
<211> LENGTH: 9
<212> TYPE: PRT
<213> ORGANISM: Homo sapiens

<400> SEQUENCE: 15

Asp Gly Asp Gly Thr Ile Thr Thr Lys
                5

<210> SEQ ID NO 16
<211> LENGTH: 8
<212> TYPE: PRT
<213> ORGANISM: Homo sapiens

<400> SEQUENCE: 16

Ser Leu Glu Ala Ala Ser Glu Lys
                5

<210> SEQ ID NO 17
<211> LENGTH: 7
<212> TYPE: PRT
<213> ORGANISM: Homo sapiens

<400> SEQUENCE: 17

Glu Thr Ile Glu Gln Glu Lys
                5

<210> SEQ ID NO 18
<211> LENGTH: 5
<212> TYPE: PRT
<213> ORGANISM: Homo sapiens

<400> SEQUENCE: 18

Leu Lys Pro Ile Lys
                5

<210> SEQ ID NO 19
<211> LENGTH: 11
<212> TYPE: PRT
<213> ORGANISM: Homo sapiens

<400> SEQUENCE: 19

Glu Gly Val His Gly Gly Leu Ile Asn Lys
                5                   10

Lys

<210> SEQ ID NO 20
<211> LENGTH: 14
<212> TYPE: PRT
<213> ORGANISM: Homo sapiens

<400> SEQUENCE: 20

Asp His Glu Glu Leu Ser Leu Val Ala Ser
                5                   10

Glu Ala Val Arg

<210> SEQ ID NO 21
<211> LENGTH: 6
<212> TYPE: PRT
<213> ORGANISM: Homo sapiens

<400> SEQUENCE: 21

Asn Glu Leu Val Gln Lys
                5
```

```
<210> SEQ ID NO 22
<211> LENGTH: 9
<212> TYPE: PRT
<213> ORGANISM: Homo sapiens

<400> SEQUENCE: 22

Leu Asn Tyr Lys Pro Pro Pro Gln Lys
                5

<210> SEQ ID NO 23
<211> LENGTH: 8
<212> TYPE: PRT
<213> ORGANISM: Homo sapiens

<400> SEQUENCE: 23

His Val Phe Gly Gln Pro Ala Lys
                5

<210> SEQ ID NO 24
<211> LENGTH: 10
<212> TYPE: PRT
<213> ORGANISM: Homo sapiens

<400> SEQUENCE: 24

Glu Thr Gly Glu His Leu Val His Val Lys
                5                   10

<210> SEQ ID NO 25
<211> LENGTH: 14
<212> TYPE: PRT
<213> ORGANISM: Homo sapiens

<400> SEQUENCE: 25

Gly Pro Gly Pro Gly Gly Pro Gly Gly Ala
                5                   10

Gly Val Ala Arg

<210> SEQ ID NO 26
<211> LENGTH: 10
<212> TYPE: PRT
<213> ORGANISM: Homo sapiens

<400> SEQUENCE: 26

Val Leu Glu Asp Arg Pro Leu Ser Asp Lys
                5                   10

<210> SEQ ID NO 27
<211> LENGTH: 9
<212> TYPE: PRT
<213> ORGANISM: Homo sapiens

<400> SEQUENCE: 27

Phe Glu Thr Val His Gln Ile His Lys
                5

<210> SEQ ID NO 28
<211> LENGTH: 10
<212> TYPE: PRT
<213> ORGANISM: Homo sapiens

<400> SEQUENCE: 28

Ala Met Glu Ala Val Ala Ala Gln Gly Lys
                5                   10
```

<210> SEQ ID NO 29
<211> LENGTH: 8
<212> TYPE: PRT
<213> ORGANISM: Homo sapiens

<400> SEQUENCE: 29

Val His Leu Thr Pro Glu Glu Lys
                5

<210> SEQ ID NO 30
<211> LENGTH: 10
<212> TYPE: PRT
<213> ORGANISM: Homo sapiens

<400> SEQUENCE: 30

Asn Ile Ile His Gly Ser Asp Ser Val Lys
                5                   10

<210> SEQ ID NO 31
<211> LENGTH: 6
<212> TYPE: PRT
<213> ORGANISM: Homo sapiens

<400> SEQUENCE: 31

Ser Ile Tyr Gly Glu Lys
                5

<210> SEQ ID NO 32
<211> LENGTH: 8
<212> TYPE: PRT
<213> ORGANISM: Homo sapiens

<400> SEQUENCE: 32

Glu Leu His Ile Gln Gly Asn Arg
                5

<210> SEQ ID NO 33
<211> LENGTH: 9
<212> TYPE: PRT
<213> ORGANISM: Homo sapiens

<400> SEQUENCE: 33

Glu Phe Asp His Asn Ser Asn Ile Arg
                5

<210> SEQ ID NO 34
<211> LENGTH: 10
<212> TYPE: PRT
<213> ORGANISM: Homo sapiens

<400> SEQUENCE: 34

Val Tyr Ser Thr Ser Val Thr Gly Ser Arg
                5                   10

<210> SEQ ID NO 35
<211> LENGTH: 9
<212> TYPE: PRT
<213> ORGANISM: Homo sapiens

<400> SEQUENCE: 35

Glu Tyr Ala Pro Gly Glu Thr Val Lys
                5

<210> SEQ ID NO 36

```
<211> LENGTH: 10
<212> TYPE: PRT
<213> ORGANISM: Homo sapiens

<400> SEQUENCE: 36

Glu Gly Val His Gly Gly Leu Ile Asn Lys
                  5                   10

<210> SEQ ID NO 37
<211> LENGTH: 7
<212> TYPE: PRT
<213> ORGANISM: Homo sapiens

<400> SEQUENCE: 37

Asp Glu Ile Glu Ser Val Lys
                  5

<210> SEQ ID NO 38
<211> LENGTH: 8
<212> TYPE: PRT
<213> ORGANISM: Homo sapiens

<400> SEQUENCE: 38

Ser Ile Val Asn Tyr Lys Pro Lys
                  5

<210> SEQ ID NO 39
<211> LENGTH: 5
<212> TYPE: PRT
<213> ORGANISM: Homo sapiens

<400> SEQUENCE: 39

Pro Tyr Glu Ile Lys
                  5

<210> SEQ ID NO 40
<211> LENGTH: 10
<212> TYPE: PRT
<213> ORGANISM: Homo sapiens

<400> SEQUENCE: 40

Ala Gly Phe Ala Gly Asp Asp Ala Pro Arg
                  5                   10

<210> SEQ ID NO 41
<211> LENGTH: 15
<212> TYPE: PRT
<213> ORGANISM: Homo sapiens

<400> SEQUENCE: 41

Gly Asp Asp Thr Pro Leu His Leu Ala Ala
                  5                   10

Ser His Gly His Arg
                 15

<210> SEQ ID NO 42
<211> LENGTH: 10
<212> TYPE: PRT
<213> ORGANISM: Homo sapiens

<400> SEQUENCE: 42

Leu Gln Ala Val Thr Asp Asp His Ile Arg
                  5                   10
```

<210> SEQ ID NO 43
<211> LENGTH: 12
<212> TYPE: PRT
<213> ORGANISM: Homo sapiens

<400> SEQUENCE: 43

Ser Asn Val Ser Asp Ala Val Ala Gln Ser
                 5                  10
Thr Arg

<210> SEQ ID NO 44
<211> LENGTH: 11
<212> TYPE: PRT
<213> ORGANISM: Homo sapiens

<400> SEQUENCE: 44

His Gln Gly Val Met Val Gly Met Gly Gln
                 5                  10
Lys

<210> SEQ ID NO 45
<211> LENGTH: 13
<212> TYPE: PRT
<213> ORGANISM: Homo sapiens

<400> SEQUENCE: 45

Asn Pro Leu Pro Ser Lys Glu Thr Ile Glu
                 5                  10
Gln Glu Lys

<210> SEQ ID NO 46
<211> LENGTH: 5
<212> TYPE: PRT
<213> ORGANISM: Homo sapiens

<400> SEQUENCE: 46

Asn Asp Pro Phe Lys
                 5

<210> SEQ ID NO 47
<211> LENGTH: 10
<212> TYPE: PRT
<213> ORGANISM: Homo sapiens

<400> SEQUENCE: 47

Ile Tyr His Ser His Ile Asp Ala Pro Lys
                 5                  10

<210> SEQ ID NO 48
<211> LENGTH: 14
<212> TYPE: PRT
<213> ORGANISM: Homo sapiens

<400> SEQUENCE: 48

Ser Val Thr Glu Gln Gly Ala Glu Leu Ser
                 5                  10
Asn Glu Glu Arg

<210> SEQ ID NO 49
<211> LENGTH: 11
<212> TYPE: PRT
<213> ORGANISM: Homo sapiens

<400> SEQUENCE: 49

Val Pro Asp Asp Pro Glu His Leu Ala Ala
                 5                  10
Arg

<210> SEQ ID NO 50
<211> LENGTH: 11
<212> TYPE: PRT
<213> ORGANISM: Homo sapiens

<400> SEQUENCE: 50

Glu Met Glu Ala Glu Leu Glu Asp Glu Arg
                 5                  10
Lys

<210> SEQ ID NO 51
<211> LENGTH: 7
<212> TYPE: PRT
<213> ORGANISM: Homo sapiens

<400> SEQUENCE: 51

Asp Val Asp Asn Ala Leu Arg
                 5

<210> SEQ ID NO 52
<211> LENGTH: 6
<212> TYPE: PRT
<213> ORGANISM: Homo sapiens

<400> SEQUENCE: 52

Val Phe Asn Asp Met Lys
                 5

<210> SEQ ID NO 53
<211> LENGTH: 12
<212> TYPE: PRT
<213> ORGANISM: Homo sapiens

<400> SEQUENCE: 53

Ser Ser Glu Asp Pro Asn Glu Asp Ile Val
                 5                  10
Glu Arg

<210> SEQ ID NO 54
<211> LENGTH: 8
<212> TYPE: PRT
<213> ORGANISM: Homo sapiens

<400> SEQUENCE: 54

Gly Ile Gln Asn Asp Leu Thr Lys
                 5

<210> SEQ ID NO 55
<211> LENGTH: 11
<212> TYPE: PRT
<213> ORGANISM: Homo sapiens

<400> SEQUENCE: 55

Asn Phe Ser Asp Asn Gln Leu Gln Glu Gly
                 5                  10
Lys

<210> SEQ ID NO 56
<211> LENGTH: 9
<212> TYPE: PRT
<213> ORGANISM: Homo sapiens

<400> SEQUENCE: 56

Ala Glu Ile Ser Phe Glu Asp Arg Lys
                 5

<210> SEQ ID NO 57
<211> LENGTH: 15
<212> TYPE: PRT
<213> ORGANISM: Homo sapiens

<400> SEQUENCE: 57

Leu Arg Thr Glu Gly Asp Gly Val Tyr Thr
                 5                  10

Leu Asn Asn Glu Lys
                15

<210> SEQ ID NO 58
<211> LENGTH: 13
<212> TYPE: PRT
<213> ORGANISM: Homo sapiens

<400> SEQUENCE: 58

Ala Val Ala Gly Asn Ile Ser Asp Pro Gly
                 5                  10

Leu Gln Lys

<210> SEQ ID NO 59
<211> LENGTH: 6
<212> TYPE: PRT
<213> ORGANISM: Homo sapiens

<400> SEQUENCE: 59

Phe Thr Asp His Leu Lys
                 5

<210> SEQ ID NO 60
<211> LENGTH: 17
<212> TYPE: PRT
<213> ORGANISM: Homo sapiens

<400> SEQUENCE: 60

Thr Ser Leu Glu Val Ser Pro Asn Pro Glu
                 5                  10

Pro Pro Glu Lys Pro Val Arg
                15

<210> SEQ ID NO 61
<211> LENGTH: 12
<212> TYPE: PRT
<213> ORGANISM: Homo sapiens

<400> SEQUENCE: 61

Glu Tyr Ala Glu Asp Asp Asn Ile Tyr Gln
                 5                  10

Gln Lys

<210> SEQ ID NO 62
<211> LENGTH: 7

```
<212> TYPE: PRT
<213> ORGANISM: Homo sapiens

<400> SEQUENCE: 62

Glu Leu Ala Asn Glu Leu Arg
                5

<210> SEQ ID NO 63
<211> LENGTH: 12
<212> TYPE: PRT
<213> ORGANISM: Homo sapiens

<400> SEQUENCE: 63

Glu Gln Ala Glu Ala Glu Val Ala Ser Leu
                5                   10

Asn Arg

<210> SEQ ID NO 64
<211> LENGTH: 10
<212> TYPE: PRT
<213> ORGANISM: Homo sapiens

<400> SEQUENCE: 64

Asp Gly Gly Leu Ile Cys Thr Ser Cys Arg
                5                   10

<210> SEQ ID NO 65
<211> LENGTH: 15
<212> TYPE: PRT
<213> ORGANISM: Homo sapiens

<400> SEQUENCE: 65

Gln Thr Leu Glu Asn Glu Arg Gly Glu Leu
                5                   10

Ala Asn Glu Val Lys
                15

<210> SEQ ID NO 66
<211> LENGTH: 13
<212> TYPE: PRT
<213> ORGANISM: Homo sapiens

<400> SEQUENCE: 66

Ala Thr Asp Ala Glu Ala Asp Val Ala Ser
                5                   10

Leu Asn Arg

<210> SEQ ID NO 67
<211> LENGTH: 10
<212> TYPE: PRT
<213> ORGANISM: Homo sapiens

<400> SEQUENCE: 67

Gly Tyr Ser Phe Thr Thr Thr Ala Glu Arg
                5                   10

<210> SEQ ID NO 68
<211> LENGTH: 12
<212> TYPE: PRT
<213> ORGANISM: Homo sapiens

<400> SEQUENCE: 68

Thr Glu Gly Asp Gly Val Tyr Thr Leu Asn
```

Asp Lys

<210> SEQ ID NO 69
<211> LENGTH: 6
<212> TYPE: PRT
<213> ORGANISM: Homo sapiens

<400> SEQUENCE: 69

Glu Thr Ile Val Leu Lys
                5

<210> SEQ ID NO 70
<211> LENGTH: 8
<212> TYPE: PRT
<213> ORGANISM: Homo sapiens

<400> SEQUENCE: 70

Asp Asp Asn Pro Asn Leu Pro Arg
                5

<210> SEQ ID NO 71
<211> LENGTH: 9
<212> TYPE: PRT
<213> ORGANISM: Homo sapiens

<400> SEQUENCE: 71

Leu His Val Asp Pro Glu Asn Phe Arg
                5

<210> SEQ ID NO 72
<211> LENGTH: 6
<212> TYPE: PRT
<213> ORGANISM: Homo sapiens

<400> SEQUENCE: 72

Phe Ile Glu Asp Val Lys
                5

<210> SEQ ID NO 73
<211> LENGTH: 12
<212> TYPE: PRT
<213> ORGANISM: Homo sapiens

<400> SEQUENCE: 73

Glu Leu Ile Ser Asn Ser Ser Asp Ala Leu
                5                   10
Asp Lys

<210> SEQ ID NO 74
<211> LENGTH: 10
<212> TYPE: PRT
<213> ORGANISM: Homo sapiens

<400> SEQUENCE: 74

Glu Ser Asp Thr Ser Tyr Val Ser Leu Lys
                5                   10

<210> SEQ ID NO 75
<211> LENGTH: 14
<212> TYPE: PRT
<213> ORGANISM: Homo sapiens

<400> SEQUENCE: 75

Asn Val Thr Glu Leu Asn Glu Pro Leu Ser
                5                   10

Asn Glu Glu Arg

<210> SEQ ID NO 76
<211> LENGTH: 13
<212> TYPE: PRT
<213> ORGANISM: Homo sapiens

<400> SEQUENCE: 76

His Val Phe Gly Glu Ser Asp Glu Leu Ile
                5                   10

Gly Gln Lys

<210> SEQ ID NO 77
<211> LENGTH: 11
<212> TYPE: PRT
<213> ORGANISM: Homo sapiens

<400> SEQUENCE: 77

Gly Ser Glu Ser Gly Ile Phe Thr Asn Thr
                5                   10

Lys

<210> SEQ ID NO 78
<211> LENGTH: 16
<212> TYPE: PRT
<213> ORGANISM: Homo sapiens

<400> SEQUENCE: 78

Asp Thr Glu Glu Glu Asp Phe His Val Asp
                5                   10

Gln Val Thr Thr Val Lys
                15

<210> SEQ ID NO 79
<211> LENGTH: 10
<212> TYPE: PRT
<213> ORGANISM: Homo sapiens

<400> SEQUENCE: 79

Thr Ile Asp Asp Leu Glu Asp Lys Leu Lys
                5                   10

<210> SEQ ID NO 80
<211> LENGTH: 12
<212> TYPE: PRT
<213> ORGANISM: Homo sapiens

<400> SEQUENCE: 80

Glu Asp Leu Arg Leu Pro Glu Gly Asp Leu
                5                   10

Gly Lys

<210> SEQ ID NO 81
<211> LENGTH: 11
<212> TYPE: PRT
<213> ORGANISM: Homo sapiens

<400> SEQUENCE: 81

Ser Val Met Ile Asp Glu Asp Met Thr Ala 5                   10

Arg

<210> SEQ ID NO 82
<211> LENGTH: 17
<212> TYPE: PRT
<213> ORGANISM: Homo sapiens

<400> SEQUENCE: 82

Thr Val Tyr Phe Ala Glu Glu Val Gln Cys
                  5                   10

Glu Gly Asn Ser Phe His Lys
                 15

<210> SEQ ID NO 83
<211> LENGTH: 9
<212> TYPE: PRT
<213> ORGANISM: Homo sapiens

<400> SEQUENCE: 83

Leu Gly Pro Leu Val Glu Gln Gly Arg
                  5

<210> SEQ ID NO 84
<211> LENGTH: 10
<212> TYPE: PRT
<213> ORGANISM: Homo sapiens

<400> SEQUENCE: 84

Ile Gln Leu Val Glu Glu Glu Leu Asp Arg
                  5                   10

<210> SEQ ID NO 85
<211> LENGTH: 7
<212> TYPE: PRT
<213> ORGANISM: Homo sapiens

<400> SEQUENCE: 85

Glu Gly Leu Glu Leu Leu Lys
                  5

<210> SEQ ID NO 86
<211> LENGTH: 12
<212> TYPE: PRT
<213> ORGANISM: Homo sapiens

<400> SEQUENCE: 86

Gly Thr Val Thr Asp Phe Pro Gly Phe Asp
                  5                   10

Glu Arg

<210> SEQ ID NO 87
<211> LENGTH: 13
<212> TYPE: PRT
<213> ORGANISM: Homo sapiens

<400> SEQUENCE: 87

Thr Ile Asp Asp Leu Glu Glu Thr Leu Ala
                  5                   10

Ser Ala Lys

<210> SEQ ID NO 88

```
<211> LENGTH: 11
<212> TYPE: PRT
<213> ORGANISM: Homo sapiens

<400> SEQUENCE: 88

Asp Leu Gln Phe Val Glu Val Thr Asp Val
                  5                  10

Lys

<210> SEQ ID NO 89
<211> LENGTH: 17
<212> TYPE: PRT
<213> ORGANISM: Homo sapiens

<400> SEQUENCE: 89

Ala Gly Thr Gln Ile Glu Asn Ile Glu Glu
                  5                  10

Asp Phe Arg Asp Gly Leu Lys
                 15

<210> SEQ ID NO 90
<211> LENGTH: 8
<212> TYPE: PRT
<213> ORGANISM: Homo sapiens

<400> SEQUENCE: 90

Leu Val Val Leu Pro Phe Pro Lys
                  5
```

METHODS AND SYSTEMS FOR DETECTING AND QUANTIFYING LARGE NUMBER OF MOLECULE BIOMARKERS FROM A BODY FLUID SAMPLE

CROSS-REFERENCES TO RELATED APPLICATIONS

This application is a 371 National Entry of International Patent Application No. PCT/US22/20989, filed Mar. 18, 2022, which claims the priority to U.S. Provisional Patent Application No. 63/162,894, filed Mar. 18, 2021, all of which are hereby incorporated by reference in their entirety for all purposes.

REFERENCE TO AN ELECTRONIC SEQUENCE LISTING

The contents of the electronic sequence listing ("COSMIC0003_ST25.txt"; Size is 12,047 bytes, it was created on Dec. 7, 2025) is herein incorporated by reference in its entirety.

BACKGROUND

The present disclosure generally relates to methods and systems for detecting and quantifying a large number of analytes (e.g., at least 500 or at least 1000 molecule biomarkers, biomolecules (proteins and metabolites) and others) from a body fluid sample.

Body fluids are the optimal resource for non-invasive molecular diagnostics. However, analytes such as biomolecules (particularly proteins and metabolites) in body fluid samples are tough to analyze because these analytes in the body fluids usually vary dramatically across many magnitudes in terms of characteristic of detection such as abundance and retention time. For example, in a unit volume of plasma, regardless of the disease or health status of a subject, the abundance of albumin (with a concentration at about 40~50 g/L) is ten billion times higher than that of free triiodothyronine (with a concentration at about 1~6 ng/L). In general, the detection of lower abundance analytes or molecules (e.g., free triiodothyronine) is always prohibited or jeopardized by the presence of high abundance molecules. However, most of the high abundance molecules are not disease biomarkers, and at the same time meaningful disease biomarkers are usually present in body fluids at lower abundances.

In a targeted mass spectrometry-based detection, there is a limitation of the total number of targeted analytes or molecules that can be detected and/or quantified in each scan cycle for the currently existing techniques, which limits the number of analytes or molecules that can be assayed to be around or below a couple of thousands (e.g. n~=~500). In general, a body fluid sample would comprise at least thousands or tens thousands of analytes, exceeding the limitations of the currently existing techniques.

In addition, as the number of the target analytes or molecules goes up in each scan cycle, the data quality typically goes down, because the currently existing mass spectrometer would have to either spend less time on each molecule if the cycle time is fixed, therefore the accuracy of detection will drop; or to operate on a longer cycle time to accommodate more analytes without reducing the time spent on each analyte, therefore less data points will be collected across a certain time window because the number of scan cycles will reduce due to the prolonged cycle time.

The currently existing techniques (e.g., commercial mass spectrometer) are not suitable for or incapable of detecting and quantifying a large number (e.g., at least one thousand) of analytes from a body fluid sample in one scan cycle.

Needed in the art are methods or systems for detecting and quantifying a large number (e.g., at least thousands) of analytes in a body fluid sample in each analytical assay.

SUMMARY

The present disclosure includes the recognition that using endogenous divider analytes to separate a detection (which usually exceeds limitations of currently existing techniques) into a number of consecutive sub-detections of many time windows with detection of each of the endogenous divider analytes as a trigger for switching to the next sub-detection would represent a breakthrough for detecting and quantifying a large number (e.g., at least thousands) of analytes in a body fluid sample. Indeed, the method or system of the present disclosure is capable of sequential detection of as many analytes as possible if the many analytes can be eluted into the mass spectrometer following a gradient of certain solvent.

In one aspect, the present invention relates to a method for detecting and quantifying analytes in a sample of a subject. The method comprises (a) identifying and/or profiling the analytes; (b) identifying at least one divider analyte from the analytes; (c) dividing the analytes into a plurality of groups using the at least one divider analyte; and (d) detecting and/or quantifying J a first group of analytes ending with a first of the at least one divider analyte by scanning and/or quantifying the first group of analytes until a first threshold of intensity of the first of the at least one divider analyte is reached.

In one embodiment, the method further comprises (e) switching to detect and quantify a second group of analytes starting with the first of the at least one divider analyte by scanning and quantifying the second group of analytes until a second threshold of intensity of a second of the at least one divider analyte is reached.

In one embodiment, the method comprises (f) repeating step e) until each of the plurality of groups are scanned and quantified.

In one embodiment, the sample comprises a body fluid.

In one embodiment, the sample is selected from the group consisting of a saliva sample, a plasma sample, a sweat sample, a lacrimal fluid sample, a gastro-intestinal fluid sample, a pancreatic fluid sample, a serum sample, a urine sample, and combinations thereof.

In one embodiment, at least one of the steps (a)-(d) is conducted by a mass spectrometry equipment.

In one embodiment, at least one of the plurality of groups comprises at least 500 analytes.

In one embodiment, at least one of the plurality of groups comprises at least 1000 analytes.

In one embodiment, at least one of the steps (a)-(e) is conducted by a mass spectrometry equipment.

In one embodiment, at least one of the steps (a)-(d) is conducted by a mass spectrometry equipment.

In one embodiment, the step (b) comprises ranking the analytes according to detectability of the analytes to identify the at least one divider analyte.

In one embodiment, the at least one divider analyte has an abundance, and the abundance of the at least one divider analyte is used as a threshold for each group of analytes next to the at least one divider analyte.

In one embodiment, the quantifying of the first group of analytes comprises using the first of the at least one divider analyte as an internal standard.

In one embodiment, the quantifying of the first group of analytes comprises adding an exogenous divider.

In one embodiment, the step (e) comprises changing detection parameters according to the second group of analytes.

In one embodiment, the detection parameters comprise retention time.

In another aspect, the present invention relates to a system for detecting and quantifying analytes in a sample of a subject. The system comprises an input member configured for receiving the sample in a detecting member, the detecting member configured for detecting and/or quantifying the analytes in the sample; and a control member comprising a storage member and a processor, wherein the storage member stores one or more instructions to cause the processor to execute steps comprising: (a) identifying and/or profiling the analytes; (b) identifying at least one divider analyte from the analytes; (c) dividing the analytes into a plurality of groups using the at least one divider analyte; and (d) detecting and/or quantifying a first group of analytes ending with a first of the at least one divider analyte by scanning and/or quantifying the first group of analytes until a first threshold of intensity of the first of the at least one divider analyte is reached.

In one embodiment, the steps further comprise (e) switching to detect and quantify a second group of analytes starting with the first of the at least one divider analyte by scanning and quantifying the second group of analytes until a second threshold of intensity of a second of the at least one divider analyte is reached.

In one embodiment, the steps further comprise (f) repeating step e) until each of the plurality of groups are scanned and quantified.

In one embodiment, the system further comprises an output member configured for generating a report of results of the detecting and/or quantifying step.

BRIEF DESCRIPTION OF DRAWINGS

In FIG. 1, the identified endogenous molecules #1 to #9 (e.g., nine divider analytes/molecules) separate the entire analytes into ten detection segments (i.e., Detection Segment 0 to Detection Segment 9). The present system including a mass spectrometer first scans for a first set of analytes (termed "Detection Segment #0" hereinafter) including the $1^{st}$ endogenous landmark high-abundance molecule (i.e. "$1^{st}$ landmark molecule"); when the instrument detects the $1^{st}$ landmark molecule with intensity above a certain threshold, the system including the mass spectrometer switches for the detection of a second set of analytes (termed "Detection Segment #1") including the $2^{nd}$ endogenous landmark high-abundance molecule (i.e. "$2^{nd}$ landmark molecule"); when the instrument detects the $2^{nd}$ landmark molecule with intensity above a certain threshold, the mass spectrometer switches for the detection of a third set of analytes (termed "Detection Segment #2") including the $3^{rd}$ endogenous landmark high-abundance molecule (i.e. "$3^{rd}$ landmark molecule"), and so on and so forth until the system finishes scan the entire analytes.

As shown in FIG. 2, the actual detection time may change with a different HPLC or running a different gradient HPLC method, but the relationship (the relative positions of the analytes) represented on the table is stable which has been proven by repeated assays under different HPLC methods. Specifically, the retention time fluctuations of liquid chromatogram with different liquid chromatography methods, but stable retention relationships between adjacent peaks were reproducible. All plots were obtained from different organic solvent gradient methods, but with the same x-axis indicating retention time (minute).

DETAILED DESCRIPTION

Definitions

Figure 1:
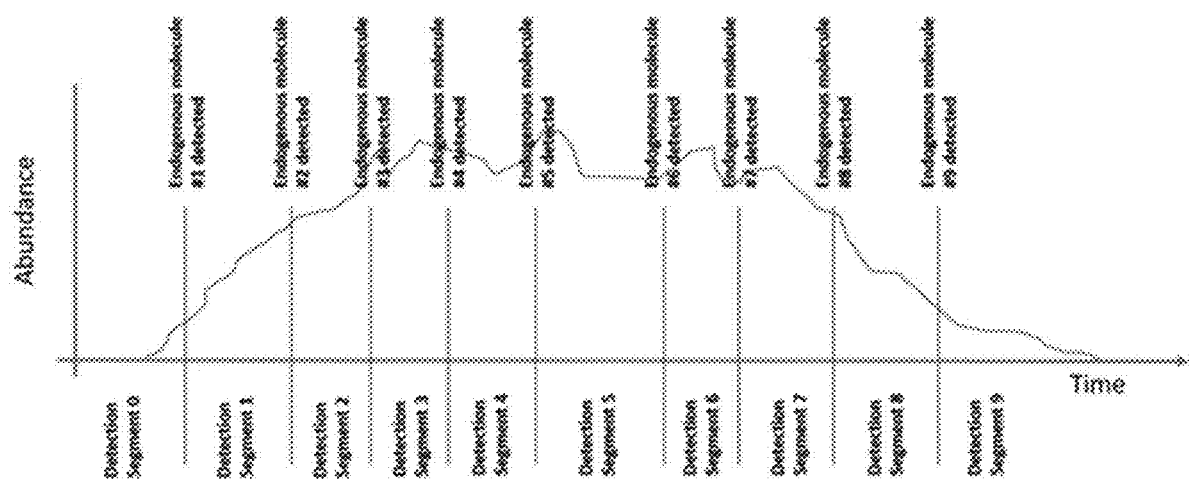
FIG. 1 is a graph showing the logistics of the method and system according to certain embodiments of the present invention.

Some definitions are provided hereafter. Nevertheless, definitions may be located in the "Embodiments" section below, and the above header "Definitions" does not mean that such disclosures in the "Embodiments" section are not definitions.

All percentages expressed herein are by weight of the total weight of the composition unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified.

The term "and/or" used in the context of "X and/or Y" should be interpreted as "X," or "Y," or "X and Y." Similarly, "at least one of X or Y" should be interpreted as "X," or "Y," or "X and Y." For example, "at least a small molecule or a peptide" should be interpreted as "a small molecule," or "a peptide," or "both a small molecule and a peptide."

Where used herein, the terms "example" and "such as," particularly when followed by a listing of terms, are merely exemplary and illustrative and should not be deemed to be exclusive or comprehensive. As used herein, a condition "associated with" or "linked with" another condition means the conditions occur concurrently, preferably means that the conditions are caused by the same underlying condition, and most preferably means that one of the identified conditions is caused by the other identified condition.

The term "subject," as used herein, refers to a mammal who may or may not have a disease such as a cancer. Mammals include, but is not limited to, rodents, aquatic mammals, domestic animals such as dogs and cats, farm animals such as sheep, pigs, cows and horses, and humans. In one embodiment, the mammal may be a cat, a dog or a human. In some embodiments, the terms "subject" and "patient" are used interchangeably herein in reference to a human subject.

The term "body fluid," as used herein, refers to any liquid sample from a subject, such as a saliva sample, a plasma sample, a sweat sample, a lacrimal fluid sample, a gastrointestinal fluid sample, a pancreatic fluid sample, a serum sample or a urine sample. However, the present method/system is not limited to the body fluid. For example, the present method/system can be applied also to other test substances, such as a cell lysate, a non-biological sample containing mixed substances.

The term "analyte," as used herein, refers to a molecule or substance to be detected or quantitated. For example, an analyte may be any known or unknown component of a sample (e.g., a body fluid). In one embodiment, analytes are chemical molecules of interest, e.g., biopolymers, i.e., an oligomer or polymer such as an oligonucleotide, a peptide, a polypeptide, an antibody, or the like, any small molecules or any substances, or any metabolites.

The term "divider," "divider analyte," or "divider molecule," as used herein, refers to an endogenous substance or molecule whose features have been predetermined. Typically for mass spectrometry, these divider analytes are molecules existing in the sample to be tested (i.e. test sample) that have intensity reaching a certain level that are easily detected and quantified by the instrument. Also, each of the set of divider analytes may have distinctive yet predetermined detection times. More specifically, the detection times of both the dividers and the analytes may be predetermined and their sequential order of detections among different analytes may be predetermined to help establish the sequential detection of different detection segments and the dividers in it.

The term "endogenous," as used herein, refers to a substance or molecule that a subject (e.g., a mammal) naturally produces or produces in vivo. For example, an endogenous divider analyte for detecting an entire analytes of a sample from a subject in the present invention refers to a substance or molecule the subject naturally produces or produces in vivo along with the other analytes in the sample. In one embodiment, only endogenous dividers are used in the present methods/systems.

The term "non-endogenous," or "exogenous," as used herein, refers to a substance or molecule that a subject (e.g., a mammal) does not naturally produce or produce in vivo. For example, an exogenous divider for detecting an entire analytes of a sample from a subject in the present invention refers to a substance or molecule the subject does not naturally produce or produce in vivo along with the other analytes in the sample. In one embodiment, both endogenous dividers and exogenous dividers are used in the present methods/systems. In another embodiment, only exogenous dividers are used in the present methods/systems.

The term "biomarker," as used herein, refers to a molecule or substance that is associated either quantitatively or qualitatively with a biological change. Examples of biomarkers may include polypeptides, proteins or fragments of a polypeptide or protein; polynucleotides, such as a gene product, RNA or RNA fragment; and any other body metabolites.

The term "metabolite," as used herein, refers to any small chemical molecule physiologically presented in a body fluid sample or other biological samples. The metabolite may or may not involve pharmaceutical agents used. For example, in one embodiment, the metabolite is a product of physiological processes, which may or may not involve one or several pharmaceutical agents, adjuvants, additives, or excipients used in formulation or combinations thereof.

The term "biopolymer," as used herein, refers to a polymer of one or more types of repeating units, regardless of the source. In one embodiment, biopolymers may be found in biological systems and particularly include polypeptides and polynucleotides, as well as such compounds containing amino acids, nucleotides, or analogs thereof.

The term "polypeptide," as used herein, refers to a polymer of amino acids of any length. In general, polypeptides may be of any length, e.g., greater than 2 amino acids, greater than 4 amino acids, greater than about 10 amino acids, greater than about 20 amino acids, greater than about 50 amino acids, greater than about 100 amino acids, greater than about 300 amino acids, usually up to about 500 or 1000 or more amino acids. The term "peptide," as used herein, refers to a polymer of amino acids. For example, peptides may be generally greater than 2 amino acids, greater than 4 amino acids, greater than about 10 amino acids, greater than about 20 amino acids, usually up to about 50 amino acids. In some embodiments, peptides are between 5 and 30 amino acids in length.

In one embodiment, the term "polypeptide," "peptide" and "protein" are used interchangeably to refer to a polymer of amino acid residues. That is, a description directed to a polypeptide applies equally to a description of a peptide and a description of a protein, and vice versa. For example, the terms apply to naturally occurring amino acid polymers as well as amino acid polymers in which one or more amino acid residues is a non-natural amino acid. In one embodiment, the terms encompass amino acid chains of any length, including full length proteins, wherein the amino acid residues are linked by covalent peptide bonds. In one embodiment, polypeptides of the present invention are made of all naturally occurring amino acids.

The term "amino acid," as used herein, refers to natural and/or unnatural or synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, alpha-carboxyglutamate, and O-phosphoserine. For example, naturally encoded amino acids are the 20 common amino acids (and their corresponding one-letter symbols) [alanine (A), arginine (R), asparagine (N), aspartic acid (D), cysteine (C), glutamine (Q), glutamic acid (E), glycine (G), histidine (H), isoleucine (I), leucine (L), lysine (K), methionine (M), phenylalanine (F), proline (P), serine (S), threonine (T), tryptophan (W), tyrosine (Y), and valine (V)] and pyrrolysine and selenocysteine. Amino acid analogs refers to compounds that have the same basic chemical structure as a naturally occurring amino acid, i.e., any carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid.

The term "non-naturally occurring amino acid," refers to an amino acid that is not one of the 20 common amino acids or pyrrolysine or selenocysteine; other terms that may be used synonymously with the term "non-natural amino acid" is "non-naturally encoded amino acid," "unnatural amino acid," "non-naturally-occurring amino acid," and variously hyphenated and non-hyphenated versions thereof. The term "non-natural amino acid" may include, but not limited to, amino acids that occur naturally by modification of a naturally encoded amino acid (including but not limited to, the 20 common amino acids or pyrrolysine and selenocysteine) but are not themselves incorporated into a growing polypeptide chain by the translation complex. Examples of naturally-occurring amino acids that are not naturally-encoded include, but are not limited to, N-acetyl-glucosaminyl-L-serine, N-acetylglucosaminyl-L-threonine, and O-phosphotyrosine.

The term "fragment of a polypeptide or protein," as used herein, refers to a peptide chain.

The term "polynucleotide," as used herein, refers to a polymer of nucleotides, or analogs thereof, of any length, including oligonucleotides that range from 10-100 nucleotides in length, polynucleotides of greater than 100 nucleotides in length, polynucleotides of greater than 1000 nucleotides in length, polynucleotides of greater than 10000 nucleotides in length, or polynucleotides of greater than 100000 nucleotides in length.

The term "BF-Quant," as used herein, refers to Body Fluid Quantitative Mass Spectrometry, which is one embodiment of the present method.

The term "predetermined," as used herein, refers to being determined prior to a process of interest, which not only refers to being determined before processing according to the exemplary embodiment begins but also being determined, even after the processing according to the exemplary embodiment begins, at any point in time preceding a process of interest in accordance with the condition/state at that point in time, or in accordance with the condition/state up to that point in time. If multiple "predetermined values" exist, each of these values may be different, or two or more of these values may be the same (which includes, of course, cases where all of these values are the same).

The term "high throughput," as used herein, refers to a relatively large number of detections of the present method/system as compared with the currently existing technologies. In one embodiment, the present method/system can have 10 times (10×), 100 times (100×), 1000 times (1000×), 10000 times (10000×), 100000 times (100000×) or more times of detections over that of the currently existing technologies.

The term "retention time," as used herein, refers to the amount of time that a given analyte, compound or substance or part of the analyte, compound or substance takes to pass through a chemical analysis system, such as, for example, a chromatography system. In one embodiment, the terms "retention time" and "detection time" are used interchangeably.

The term "abundance," as used herein, refers to an amount or a concentration of an analyte in a sample such as a body fluid.

The term "detectability," as used herein, refers to signal intensity from an analyte when it is detected by mass spectrometer. For example, "a higher detectability," as used herein, refers to a stronger signal intensity from an analyte detected by the mass spectrometer when all analytes are at the same abundance.

All ingredients of the composition can be admixed together or alternatively the composition can be provided in the form of a kit of parts wherein ingredients or groups of ingredients are provided separately. These separate compositions may be intended to be consumed separately or together.

Embodiments

An aspect of the present disclosure is a method for detecting and quantifying a large number (e.g., at least 500 analytes, preferably, at least 1000 analytes) of analytes in a sample (e.g., a body fluid) of a subject. For example, the present method is capable of detecting and quantifying at least 500 analytes, preferably, at least 1000 analytes from a body fluid in each analytical assay.

In one embodiment, the present method applies to detect and quantify a large number of analytes such as biopolymers or small molecules. In one embodiment, the analytes are biopolymers such as an oligomer or polymer such as an oligonucleotide, a peptide, a polypeptide, an antibody, or the like. In another embodiment, the analytes are any small molecules or any substances, or any metabolites.

In one embodiment, the present method is capable of detecting and quantifying at least 500 analytes, at least 1000 analytes, at least 1500 analytes, at least 2000 analytes, at least 2500 analytes, at least 3000 analytes, at least 3500 analytes, at least 4000 analytes, at least 4500 analytes, at least 5000 analytes, at least 5500 analytes, at least 6000 analytes, at least 6500 analytes, at least 7000 analytes, at least 7500 analytes, at least 8000 analytes, at least 8500 analytes, at least 9000 analytes, at least 9500 analytes, at least 10000 analytes, at least 10500 analytes, at least 11000 analytes, at least 11500 analytes, at least 12000 analytes, at least 12500 analytes, or at least 13000 analytes in each analytical assay.

Applicant surprisingly found that using a set of high-abundance and/or easy-to-detect housekeeping endogenous analytes in a body fluid sample as a set of landmarks (e.g., divider analytes) to separate the existing continuous detection into segment detections of many time windows can overcome the limitation of the currently existing methods, leading to a successful detection and quantification of a large number (e.g., at least 500 analytes, preferably, at least 1000 analytes) of the analytes in the body fluid sample.

The present method/system achieves the large number analyte detection and quantification by analyzing each of all detection segments through detecting each of the detection segments consecutively along with the detection of each divider analyte as an event to trigger the change of detection parameters for a different set of analytes in a different detection segment.

In one embodiment, the detection in each segment is analyte-specific in that segment. For example, during the detection of each segment, the other remaining segments could be masked such as one single detection is performed. The parameters (such as detection time or abundance/detectability) would be specific to the analytes in that segment.

Thus, in one embodiment, the results and the related analysis are analyte-specific. For example, when analyzing Endogenous molecule #3 of FIG. 1, all other endogenous molecule are completely masked. Consequently, one would only see the Endogenous molecule #3's performance and all other analytes located in Detection Segment 2 in its dedicated detection segment.

One of the key steps of the present methods is to generate time series of the segments of detections, where each segment contains a subset of biomarkers or analytes to be detected, the switch from the detection of biomarkers or analytes from segment 1 to 2 or from segment 2 to 3, or so on so forth, is triggered by the successful detection of the "divider molecules" (e.g., divider analytes) that are chosen based on highly and reproducible detectability from a biological sample.

The present methods use divider analytes (e.g., dividers or divider molecules) to separate a detection of currently existing methods into a certain number of sub-detections of the present invention. The divider analytes of the present invention are substantially endogenous analytes that are always present in body fluid samples at high abundance and are relatively stable in the samples. Thus, the present method has significantly improved its detectability of the total number of the targeted analytes and the data quality. For example, the present method can accommodate a sequential detection of as many molecules as possible for all the analytes to be eluted into a spectrometer (e.g., mass spectrometer) following a gradient of certain solvent.

Applicant uses mass spectrometer below and in the examples as an exemplary detection technique and Applicant envisions that other detection techniques can also be used in the present invention. Other detection techniques may include, but not limited to, detecting an analyte through an optical detector device, such as UV-VIS detection, a Diode-Array Detection (DAD) or Photodiode-Array Detection (PDA); detecting an analyte through flowcytometry; detecting an analyte through fluorescence detection; detecting an analyte through Isotopic analysis and NMR; detecting an analyte through Atomic absorption and emission; detecting an analyte through Calorimetry; detecting an analyte through a Biosensor, such as a physicochemical detector; etc.

In one aspect, the present disclosure relates to a method for detecting and quantifying analytes in a sample of a subject. In one embodiment, the method comprises (a) identifying and profiling each of the analytes; (b) ranking each of the analytes to identify a first plurality of divider analytes; (c) dividing the analytes into a second plurality of groups with the divider analytes; (d) detecting and quantifying the analytes in a first group ending with a first divider analyte by scanning and quantifying each of the analytes within the first group until the threshold of the intensity of the first divider analyte is reached; (e) switching to detect and quantify the analytes in a second group starting with the first divider analyte by scanning and quantifying each of the analytes (including a second divider analyte) within the second group until the threshold of the intensity of the second divider analyte is reached; (f) switching to detect and quantify the analytes in a third group starting with the second divider analyte by scanning and quantifying each of the analytes (including a third divider analyte) within the third group until the threshold of the intensity of the third divider analyte is reached; and (g) repeating step f) until each of the second plurality of groups are scanned and quantified.

In one embodiment, the sample comprises a body fluid. In one embodiment, the sample comprises any liquid sample from a subject. In another embodiment, the sample consists of any liquid sample from a subject. In another embodiment, the sample is any liquid sample from a subject.

In one embodiment, the body fluid comprises one or more of a saliva sample, a plasma sample, a sweat sample, a lacrimal fluid sample, a gastro-intestinal fluid sample, a pancreatic fluid sample, a serum sample and a urine sample. In another embodiment, the body fluid is selected from the group consisting of a saliva sample, a plasma sample, a sweat sample, a lacrimal fluid sample, a gastro-intestinal fluid sample, a pancreatic fluid sample, a serum sample and a urine sample.

In one embodiment, the present method is not limited to the body fluid. For example, the present method/system can also be applied to other test substances, such as a cell lysate, a non-biological sample containing mixed substances or any sample comprising a plurality of analytes.

In one preferred embodiment, the sample is a body fluid.

The subject to which the present method is applied comprises any mammal. The mammal may or may not have a disease such as a cancer. In one embodiment, the mammal may comprise any of rodents, aquatic mammals, domestic animals such as dogs and cats, farm animals such as sheep, pigs, cows and horses, and humans. In one embodiment, the subject may be a cat, a dog or a human. In one preferred embodiment, the subject may be a human.

It is well known that low abundance analytes in a body fluid of a mammal such as a human are important or meaningful disease-related biomarkers. However, it remains a challenge for the existing technologies to detect and quantify a large number (e.g., at least 500 analytes, at least 1000 analytes, at least 1500 analytes, or at least 2000 analytes) of low abundance analytes in a body fluid of a mammal such as a human.

In one embodiment, the method is a mass spectrometry-based detection.

In one embodiment, the method is capable of detecting and quantifying at least 500 analytes in each analytical assay.

In one embodiment, the method is capable of detecting and quantifying at least 1000 analytes in each analytical assay.

To meet the above challenge and address the limitations of the currently existing technologies, the present method first processes a body fluid sample to identify and profile the analytes and to further identify divider analytes which divide the analytes into a number of detection segments.

In one embodiment, divider analytes of the present invention have excellent detectability observed from the detection technique such as the mass spectrometry analysis. For each divider analyte, its specific detection time may be validated. The validated detection time for each divider analyte may be observed from literature or from other open resources or may be obtained by analyzing each divider analyte in through the same gradient of solvents.

In one embodiment, it is important to establish the relationship in retention times for all the analytes, including the target of interest (i.e. biomarkers, e.g. proteins/peptide analytes) and the divider analytes (e.g. proteins/peptide analytes).

As shown in FIG. 1, the present method can be used to analyze each of the detection segments by detecting and quantifying each of the detection segments consecutively along with the detection of each divider analyze as an event to trigger the change of detection parameters for a different set of biomarkers in a different detection segment.

For example, as shown in FIG. 1, by using a detection techniques such as mass spectrometer, the present method first scans for a first set of analytes (e.g., Detection Segment #0 of FIG. 1) including the $1^{st}$ endogenous landmark high-abundance molecule (i.e. the $1^{st}$ divider molecule); when the instrument such as mass spectrometer detects the $1^{st}$ divider molecule with intensity above a certain predetermined threshold, the mass spectrometer switches for the detection of a second set of analytes (e.g., Detection Segment #1 of FIG. 1) including the $2^{nd}$ endogenous landmark high-abundance molecule (i.e. the $2^{st}$ divider molecule of FIG. 1); when the instrument such as mass spectrometer detects the $2^{st}$ divider molecule with intensity above another certain predetermined threshold, the mass spectrometer switches for the detection of a third set of analytes (e.g., Detection Segment #2 of FIG. 1) including the $3^{rd}$ endogenous landmark high-abundance molecule (i.e. the $3^{rd}$ divider molecule of FIG. 1), and so on and so forth.

The present method continuously scans to finish an analytical assay (i.e., a complete run from Detection Segment 0 to Detection Segment 9) until the last segment of FIG. 1 (i.e., Detection Segment 9) has been scanned and analyzed. As such, during each analytical assay, the present method detects and quantifies all the analytes from each of the segments (i.e., Detection Segment 0 to Detection Segment 9).

As shown in FIG. 1, the present method can realize a high-throughput detection. For example, the non-limiting example of FIG. 1 shows that if a total of 9 endogenous high abundance divider analytes (i.e. "Endogenous molecule #1", "Endogenous molecule #2", . . . , "Endogenous molecule #9" of FIG. 1) are used, through the present method, the total detection capability can be boosted up by as much as 10 times (10×). Specifically, the exemplary 9 divider analytes can divide a single set of X number of detections into 10 fractions (i.e., "Detection Segment 0", "Detection Segment 1", "Detection Segment 2", . . . , "Detection Segment 9" of FIG. 1), and each fraction can accommodate the detection of X number of detections. Thus, one can change a method with X number of detections to 10× number of detections.

For example, a regular/traditional mass spectrometry may allow for maximum 500 detections in one detection cycle (limited by the capacity of the instrument), but with the present method, the same instrument can realize as many as 500×10=5,000 detections, if assuming the above scenario of having a total of 9 divider analytes (i.e. landmark molecules).

Because an even larger number of divider analytes (e.g., 99, 999, 9999, 99999, 999999 or more) can be utilized, the total number of detections that can be realized may be even larger (e.g., 100×, 1000×, 10000×, 100000×, 1000000× or more).

Figure 3:
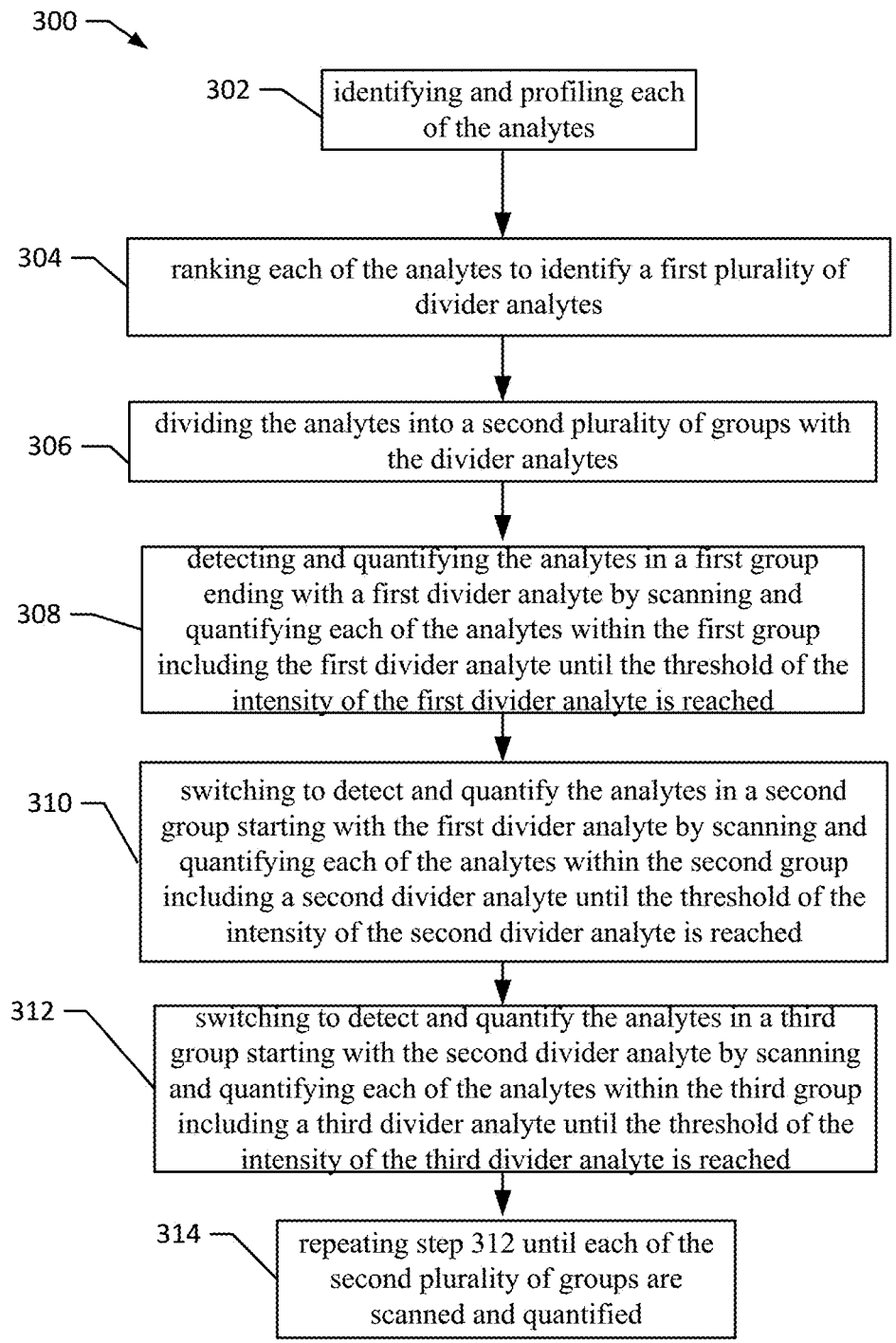
FIG. 3 is a systematic diagram showing a method according certain embodiment of the present invention.

Referring now to FIG. 3, an exemplary method 300 for detecting and quantifying a large number of analytes from a body fluid sample is depicted.

As shown in FIG. 3, each of the analytes in the sample are identified and profiled (302).

In one embodiment, each of the analytes in the sample are identified and profiled by a quick scan of the sample with a detection technique such as mass spectrometer. Each of the analytes in the sample can be identified with parameters such as retention time and detectability.

In another embodiment, each of the analytes in the sample are identified and profiled by using an external resource such as an existing published data. There are many databases containing targeted detection and also non-targeted detection parameters for mass spec detection of molecules or analytes. For example, some major databases containing targeted detection and also non-targeted detection parameters for mass spec detection of molecules or analytes such as peptides may include: 1. PeptideAtlas http://www.peptideatlas.org/builds/human/; 2. SRMatlas http://www.srmatlas.org; and 3. PRIDE https://www.ebi.ac.uk/pride/archive/. Some major databases containing targeted detection and also non-targeted detection parameters for mass spec detection of molecules or analytes such as metabolites may include: 1. HMDB https://hmdb.ca; 2. MetLin https://metlin.scripps.edu/; 3. KEGG https://www.genome.jp/kegg/compound/; 4. LipidMaps https://www.lipidmaps.org; and 5. ChEBI https://www.ebi.ac.uk/chebi/.

Returning to FIG. 3, after each of the analytes in the sample are identified and profiled (302), each of the analytes are ranked to identify a first plurality of divider analytes (304).

In one embodiment, the analytes are ranked according to their different abundances, with the more abundance analytes being at the top of the list. In one embodiment, the top analytes can be identified as the first plurality of divider analytes.

In one embodiment, each of the analytes are ranked according to their abundances to identify the first plurality of divider analytes which divide the analytes into the second plurality of groups so that each group comprises a number of analytes below the detection limit of the traditional method.

In one embodiment, each of the divider analytes have an abundance setting up a threshold among the analytes of each group next to each of the divider analytes.

In one embodiment, the divider analytes can be in the same category as the other analytes. For example, if analytes are peptides, one may select the top-abundance or top-detectable peptide analytes as the divider analytes.

In one embodiment, the divider analytes may be from different categories from the target analytes. However, these dividers from different categories from the target analytes need to be able to be analyzed and detected in the same method as that of the biomarker detection.

For example, in addition to choosing all-peptide dividers, one might also choose a small molecule such as Dopamine or Epinephrine, together with other peptide dividers as the dividers when one analyze peptide samples if both the dividers and the biomarkers can be analyzed in the same assay and environment. Specifically, dopamine and epinephrine can both be eluted from a C18 column into a mass spectrometer under organic conditions, and this analytical method holds the same for peptide biomarkers to be analyzed.

In one embodiment, for a detection technique such as mass spectrometry, each of the set of divider analytes may have distinctive yet predetermined detection times (e.g., retention times). More specifically, the detection times of both the divider analytes and the analytes are predetermined and their sequential order of detections among different analytes are predetermined to help establish the sequential detection of different detection segments and the dividers in it.

In one embodiment, the divider analytes are usually representing analytes that are stably existing at medium to high abundances in a complex biological sample. Thus, in one embodiment, the divider analytes can themselves serve as normalization internal controls to represent the abundance of the sample mass.

In one embodiment, because the divider analytes are endogenous, their detection times will fluctuate in a substantially same manner as other target analytes of interest exiting in the sample body fluid sample. As such, the detection of the present method may be resistant to retention time fluctuations.

In one embodiment, the divider analytes can represent the efficiency of a sample preparation (such as the efficiency of the digestion, chemical derivatization and clean up procedure, etc.) which cannot be achieved by adding exogenous dividers.

In one embodiment, one or more exogenous divider analytes may be added into the sample.

In one embodiment, exogenous dividers may have many shortcomings. For example, exogenous dividers may often cause significant ion suppression blocking the detection of the endogenous analytes of interest and may reduce the detection sensitivity of biomarkers of interest that are co-eluted with the exogenous dividers.

In one embodiment, exogenous dividers may still be used, which may be mixed with the test sample. In one embodiment, endogenous and exogenous dividers may be mixed and used in the same sample.

In one embodiment, the first plurality of divider analytes may be dependent on the number of the analytes and/or the complexity of the downstream diagnostic method.

For example, if there are about one hundred biomarkers to further analyze, a list of top-ten analytes as divider analytes may be enough. If there are over one thousand biomarkers to further analyze, a list of top-50 analytes as divider analytes may be sufficient to divide the detection of these one thousand biomarkers into numerous consecutive detection segments where each of the segment can be simplified down to within the detection capacity of the instrument.

Returning to FIG. 3, after each of the analytes are ranked and a first plurality of divider analytes are identified (304), the analytes are divided into a second plurality of groups with the divider analytes (306).

In one embodiment, the analytes with a list of detection parameters (e.g., retention time or detection time) may be separated into a series of consecutive segments by using the divider analytes.

In one embodiment, an extensive analysis may be performed for both divider analytes and target analytes and the dedicated segment for each analyte may be decided.

For example, for a list of 50 analytes that need to be analyzed by a mass spectrometer (with a highest capacity of detection of 12 analytes in the same assay) through a 10-minute HPLC gradient method, one may analyze the same body fluid sample through 5 runs (each run contains 10 analytes, which is below the detection limit of 12), and one may record each analyte's detected time window, and then one can choose 4 divider analytes that are eluted from the HPLC at 2, 4, 6, and $8^{th}$ minute, and to separate the list of detection of 50 analytes to 5 segments. Therefore, the mass spectrometer may detect 10 analytes in each segment (assuming the 50 analytes are evenly distributed across the entire gradient, if not, one may add in more dividers to the segments that more analytes are located at).

As shewn in FIG. 3, after the analytes are divided into a second plurality of groups with the divider analytes (306), detecting and quantifying the analytes in a first group ending with a first divider analyte by scanning and quantifying each of the analytes within the first group until the threshold of the intensity of the first divider analyte is reached (308).

Further, as shown in FIG. 3, once the threshold of the intensity of the first divider analyte is reached (308), the present method is switched to detect and quantify the analytes in a second group starting with the first divider analyte by scanning and quantifying each of the analytes within the second group until the threshold of the intensity of a second divider analyte is reached (310).

Even further, as shown in FIG. 3, once the threshold of the intensity of a second divider analyte is reached (310), the present method is switched to detect and quantify the analytes in a third group starting with the second divider analyte by scanning and quantifying each of the analytes within the third group until the threshold of the intensity of a third divider analyte is reached (312).

In each of 310 and 312, once threshold of the intensity of the related divider analyte is reached, the present method would switch its detection from the previous group to the next group with different parameters from those of the previous group.

In one embodiment, when detection of one group is performed, the other groups may be completely masked so that no interference from the other groups occurs and through simplifying the target detection list one can maximize the detection sensitivity and specificity of the instrument.

As shown in FIG. 1, the first group corresponds to Detection Segment 0 ending with a first divider analyte (i.e., Endogenous molecule #1); the second group corresponds to Detection Segment 1 ending with a second divider analyte (i.e., Endogenous molecule #2); and the third group corresponds to Detection Segment 2 ending with a third divider analyte (i.e., Endogenous molecule #3). The present method first scans for a first set of analytes (e.g., Detection Segment #0 of FIG. 1) including the $1^{st}$ endogenous landmark high-abundance molecule (i.e. the $1^{st}$ divider molecule); when the instrument such as mass spectrometer detects the $1^{st}$ divider molecule with intensity above a certain predetermined threshold, the mass spectrometer switches for the detection of a second set of analytes (e.g., Detection Segment #1 of FIG. 1) including the $2^{nd}$ endogenous landmark high-abundance molecule (i.e. the $2^{nd}$ divider molecule of FIG. 1); when the instrument such as mass spectrometer detects the $2^{st}$ divider molecule with intensity above another certain predetermined threshold, the mass spectrometer switches for the detection of a third set of analytes (e.g., Detection Segment #2 of FIG. 1) including the $3^{rd}$ endogenous landmark high-abundance molecule (i.e. the $3^{rd}$ divider molecule of FIG. 1).

Returning to FIG. 3, after the threshold of the intensity of a third divider analyte is reached (312), Step 312 is repeated until each of the second plurality of groups are scanned and quantified. As shown in FIG. 1, Step 312 is repeated until all the remaining Detection Segment #2 to Detection Segment #9 are scanned and quantified.

In one embodiment, the step of quantifying the analytes in each of the groups comprises using the corresponding divider analyte as an internal standard. In another embodiment, the step of quantifying the analytes in each of the groups comprises adding an exogenous divider.

In an aspect, the present disclosure relates to a system for detecting and quantifying analytes in a sample of a subject. In one embodiment, the system comprises an input system for entering the sample of the subject into the detecting system; a detecting system for detecting and quantifying the analytes in the sample of the subject; a network system for communicating with an external resource for profiling data of the analytes; and an output system for generating a report.

In one embodiment, the system comprises a control system comprising a non-transitory computer readable storage medium.

In one embodiment, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one embodiment, the non-transitory computer readable storage medium stores one or more computer programs adapted to cause a processor in the control system to execute steps comprising: (a) identifying and profiling each of the analytes; (b) ranking each of the analytes to identify a first plurality of divider analytes; (c) dividing the analytes into a second plurality of groups with the divider analytes; (d) detecting and quantifying the analytes in a first group ending with a first divider analyte by scanning and quantifying each of the analytes within the first group until the threshold of the intensity of the first divider analyte is reached; (e) moving to detect and quantify the analytes in a second group starting with the first divider analyte by scanning and quantifying each of the analytes within the second group until the threshold of the intensity of a second divider analyte is reached; (f) moving to detect and quantify the analytes in a third group starting with the second divider analyte by scanning and quantifying each of the analytes within the third group until the threshold of the intensity of a third divider analyte is reached; and (g) repeating step f) until each of the second plurality of groups are scanned and quantified.

In one embodiment, the sample is a body fluid.

In one embodiment, the body fluid is selected from the group consisting of a saliva sample, a plasma sample, a sweat sample, a lacrimal fluid sample, a gastro-intestinal fluid sample, a pancreatic fluid sample, a serum sample and a urine sample.

In one embodiment, the detecting system is a mass spectrometer.

In one embodiment, the system is for detecting and quantifying at least 500 analytes, at least 1000 analytes, at least 1500 analytes, at least 2000 analytes, at least 2500 analytes, at least 3000 analytes, at least 3500 analytes, at least 4000 analytes, at least 4500 analytes, at least 5000 analytes, at least 5500 analytes, at least 6000 analytes, at least 6500 analytes, at least 7000 analytes, at least 7500 analytes, at least 8000 analytes, at least 8500 analytes, at least 9000 analytes, at least 9500 analytes, at least 10000 analytes, at least 10500 analytes, at least 11000 analytes, at least 11500 analytes, at least 12000 analytes, at least 12500 analytes, or at least 13000 analytes in each analytical assay.

Figure 4:
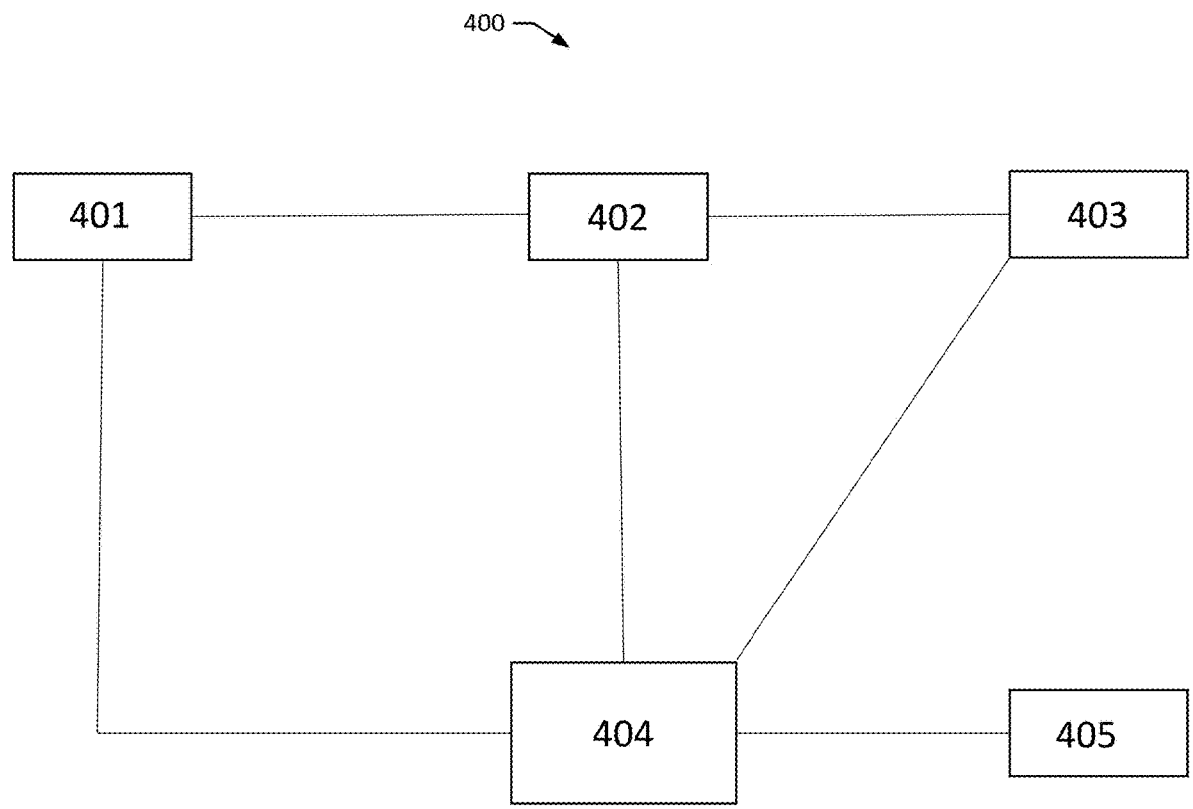
FIG. 4 is a systematic diagram showing a system according certain embodiment of the present invention.

Referring now to FIG. 4, an exemplary system 400 for detecting and quantifying a large number of analytes from a body fluid sample is depicted.

As shown in FIG. 4, the system 400 for detecting and quantifying a large number of analytes from a body fluid sample comprises an input system 401, a detecting system 402, a network system 403, a control system 404 and an output system 405.

The input system 401 comprises a sample holder in an electronic communication with the detecting system 402. Once a body fluid sample is added into the sample holder of the input system 401, the detecting system 402 can scan and profile all the analytes in the body fluid sample.

In one embodiment, the detecting system 402 is a mass spectrometer.

In one embodiment, the profiling data of the analytes may be obtained from an external resource such as a publication or a database through the network system 403.

For example, some major databases containing targeted detection and also non-targeted detection parameters for mass spec detection of molecules or analytes such as peptides may include: 1. PeptideAtlas http://www.peptideatlas.org/builds/human/; 2. SRMatlas http://www.srmatlas.org; and 3. PRIDE https://www.ebi.ac.uk/pride/archive/. Some major databases containing targeted detection and also non-targeted detection parameters for mass spec detection of molecules or analytes such as metabolites may include: 1. HMDB https://hmdb.ca; 2. MetLin https://metlin.scripps.edu/; 3. KEGG https://www.genome.jp/kegg/compound/; 4. LipidMaps https://www.lipidmaps.org; and 5. ChEBI https://www.ebi.ac.uk/chebi/.

The control system 404 controls each process of the present method and/or any other components of the system 400. In one embodiment, the control system 404 is a computer system.

The output system 405 receives the results of detection and quantification and generate a report.

All of the disclosed methods and systems described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

EXAMPLES

Example 1

A plasma proteomics biomarker detection and quantification platform established with BF-Quant—detecting and quantifying a large number of proteomics biomarkers.

The following non-limiting example presents scientific data developing and supporting the concept of methods and systems for detecting and quantifying large number of analytes (e.g., molecule biomarkers, biomolecules (proteins and metabolites) and others) from body fluid sample.

Step 1. Through the analysis of plasma proteome, Applicant identified the following two groups of peptides, where group 1 are peptide biomarkers indicating status of diseases and group 2 are peptide dividers with excellent detectability observed from the mass spectrometry analysis. For each peptide, its specific detection time was validated and indicated on the table. The validated detection time for each peptide can be observed from literature and can be obtained by analyzing each peptide in through the same gradient of organic solvents. The key is to establish the relationship in retention times for all the analytes, including the targets of interest (i.e., biomarkers, e.g. proteins/peptide analyte sequences in Group 1 in Table 1) and the dividers (e.g., proteins/peptide analyte sequences in Group 2 in Table 1, highlighted).

TABLE 1

Biomarkers, e.g. proteins/peptide analyte sequences (Group 1 shows proteins/peptide analyte sequences and Group 2 shows the dividers (i.e., divider analytes).

| Group 1 | | | |
| --- | --- | --- | --- |
| Protein | Peptide Analyte Sequence | Validated Detection Time (minute) | Seq ID No. |
| glyceraldehyde-3-phosphate dehydrogenase isoform 2 [Homo sapiens] | AGAHLQGGAK | 8.2 | 1 |
| platelet basic protein preproprotein [Homo sapiens] | TTSGIHPK | 8.2 | 2 |
| cofilin-1 [Homo sapiens] | SSTPEEVKK | 8.3 | 3 |
| platelet basic protein preproprotein [Homo sapiens] | KLAGDESAD | 8.5 | 4 |
| bridging integrator 2 [Homo sapiens] | TSAPPSRPPPPR | 12.4 | 6 |
| thrombospondin-1 precursor [Homo sapiens] | TNYIGHK | 12.4 | 7 |
| alpha-1-antitrypsin precursor [Homo sapiens] | TDTSHHDQDHPTFNK | 12.5 | 8 |
| SH3 domain-binding glutamic acid-rich-like protein [Homo sapiens] | DIAANEENRK | 12.5 | 9 |
| fibrinogen gamma chain isoform gamma-A precursor [Homo sapiens] | DCQDIANK | 12.7 | 11 |
| 14-3-3 protein gamma [Homo sapiens] | EHMQPTHPIR | 12.8 | 12 |
| zyxin [Homo sapiens] | GPPASSPAPAPK | 12.8 | 13 |
| alpha-enolase isoform 1 [Homo sapiens] | KLNVTEQEK | 12.9 | 14 |
| calmodulin [Homo sapiens] | DGDGTITTK | 12.9 | 15 |
| tropomyosin alpha-4 chain isoform 2 [Homo sapiens] | SLEAASEK | 12.9 | 16 |
| thymosin beta-4 [Homo sapiens] | ETIEQEK | 13.1 | 17 |
| laminin subunit alpha-2 isoform b precursor [Homo sapiens] | LKPIK | 13.3 | 18 |
| profilin-1 [Homo sapiens] | EGVHGGLINKK | 13.4 | 19 |
| 14-3-3 protein zeta/delta [Homo sapiens] | NELVQK | 13.6 | 21 |
| rho GDP-dissociation inhibitor 2 [Homo sapiens] | LNYKPPPQK | 13.7 | 22 |
| coronin-1A [Homo sapiens] | HVFGQPAK | 13.8 | 23 |
| filamin-A isoform 1 [Homo sapiens] | ETGEHLVHVK | 13.8 | 24 |

TABLE 1-continued

Biomarkers, e.g. proteins/peptide analyte sequences (Group 1 shows proteins/peptide analyte sequences and Group 2 shows the dividers (i.e., divider analytes).

| Protein | Peptide | Value | No. |
|---|---|---|---|
| neurogranin [Homo sapiens] | GPGPGGPGGAGVAR | 13.8 | 25 |
| integrin beta-3 precursor [Homo sapiens] | VLEDRPLSDK | 13.9 | 26 |
| 55 kDa erythrocyte membrane protein isoform 4 [Homo sapiens] | FETVHQIHK | 14 | 27 |
| phosphoglycerate mutase 2 [Homo sapiens] | AMEAVAAQGK | 14 | 28 |
| hemoglobin subunit beta [Homo sapiens] | VHLTPEEK | 14.1 | 29 |
| nucleoside diphosphate kinase B isoform a [Homo sapiens] | NIIHGSDSVK | 14.2 | 30 |
| peptidyl-prolyl cis-trans isomerase A [Homo sapiens] | SIYGEK | 14.2 | 31 |
| ras suppressor protein 1 isoform 2 [Homo sapiens] | ELHIQGNR | 14.2 | 32 |
| SH3 domain-binding glutamic acid-rich-like protein 3 [Homo sapiens] | VYSTSVTGSR | 14.4 | 34 |
| von Willebrand factor preproprotein [Homo sapiens] | EYAPGETVK | 14.7 | 35 |
| profilin-1 [Homo sapiens] | EGVHGGLINK | 14.8 | 36 |
| integrin beta-3 precursor [Homo sapiens] | DEIESVK | 15 | 37 |
| alpha-actinin-1 isoform c [Homo sapiens] | SIVNYKPK | 15.1 | 38 |
| WD repeat-containing protein 1 isoform 2 [Homo sapiens] | PYEIK | 15.1 | 39 |
| actin, alpha skeletal muscle [Homo sapiens] | AGFAGDDAPR | 15.2 | 40 |
| integrin-linked protein kinase [Homo sapiens] | GDDTPLHLAASHGHR | 15.3 | 41 |
| flavin reductase (NADPH) [Homo sapiens] | LQAVTDDHIR | 15.4 | 42 |
| triosephosphate isomerase isoform 1 [Homo sapiens] | SNVSDAVAQSTR | 15.4 | 43 |
| actin, alpha skeletal muscle [Homo sapiens] | HQGVMVGMGQK | 15.5 | 44 |
| thymosin beta-4 [Homo sapiens] | NPLPSKETIEQEK | 15.5 | 45 |
| zyxin [Homo sapiens] | NDPFK | 15.5 | 46 |
| 14-3-3 protein zeta/delta [Homo sapiens] | SVTEQGAELSNEER | 15.7 | 48 |
| lambda-crystallin homolog [Homo sapiens] | VPDDPEHLAAR | 15.7 | 49 |
| myosin-9 [Homo sapiens] | EMEAELEDERK | 15.8 | 50 |
| talin-1 [Homo sapiens] | DVDNALR | 15.8 | 51 |

TABLE 1-continued

Biomarkers, e.g. proteins/peptide analyte sequences (Group 1 shows proteins/peptide analyte sequences and Group 2 shows the dividers (i.e., divider analytes).

| | | | |
|---|---|---|---|
| cofilin-1 [Homo sapiens] | VFNDMK | 15.9 | 52 |
| immunoglobulin J chain [Homo sapiens] | SSEDPNEDIVER | 16.1 | 53 |
| serum deprivation-response protein [Homo sapiens] | GIQNDLTK | 16.2 | 54 |
| transgelin-2 isoform a/b [Homo sapiens] | NFSDNQLQEGK | 16.3 | 55 |
| filamin-A isoform 1 [Homo sapiens] | AEISFEDRK | 16.4 | 56 |
| haptoglobin isoform 1 preproprotein [Homo sapiens] | LRTEGDGVYTLNNEK | 16.4 | 57 |
| vinculin isoform VCL [Homo sapiens] | AVAGNISDPGLQK | 16.4 | 58 |
| bridging integrator 2 [Homo sapiens] | TSLEVSPNPEP-PEKPVR | 16.7 | 60 |
| ubiquitin thioesterase OTUB1 [Homo sapiens] | EYAEDDNIYQQK | 16.7 | 61 |
| thrombospondin-1 precursor [Homo sapiens] | ELANELR | 17.2 | 62 |
| tropomyosin alpha-3 chain isoform 4 [Homo sapiens] | EQAEAEVASLNR | 17.2 | 63 |
| coronin-1A [Homo sapiens] | DGGLICTSCR | 17.3 | 64 |
| myosin-9 [Homo sapiens] | QTLENERGELANEVK | 17.5 | 65 |
| tropomyosin beta chain isoform 2 [Homo sapiens] | ATDAEADVASLNR | 17.5 | 66 |
| actin, cytoplasmic 1 [Homo sapiens] | GYSFTTTAER | 17.6 | 67 |
| haptoglobin isoform 1 preproprotein [Homo sapiens] | TEGDGVYTLNDK | 17.6 | 68 |
| rho GDP-dissociation inhibitor 2 [Homo sapiens] | ETIVLK | 17.6 | 69 |
| hemoglobin subunit beta [Homo sapiens] | LHVDPENFR | 17.8 | 71 |
| obscurin isoform a [Homo sapiens] | FIEDVK | 17.8 | 72 |
| heat shock protein HSP 90-alpha isoform 2 [Homo sapiens] | ELISNSSDALDK | 17.9 | 73 |
| C-reactive protein precursor [Homo sapiens] | ESDTSYVSLK | 18 | 74 |
| 14-3-3 protein gamma [Homo sapiens] | NVTELNEPLSNEER | 18.5 | 75 |
| triosephosphate isomerase isoform 1 [Homo sapiens] | HVFGESDELIGQK | 18.5 | 76 |
| alpha-1-antitrypsin precursor [Homo sapiens] | DTEEEDFHVDQVTTVK | 18.9 | 78 |
| tropomyosin alpha-3 chain isoform 4 [Homo sapiens] | TIDDLEDKLK | 19 | 79 |

TABLE 1-continued

Biomarkers, e.g. proteins/peptide analyte sequences (Group 1 shows proteins/peptide analyte sequences and Group 2 shows the dividers (i.e., divider analytes).

| Protein | Peptide Analyte Sequence | Validated Detection Time (minute) | Seq ID No. |
|---|---|---|---|
| eukaryotic translation initiation factor 5A-1 isoform B [Homo sapiens] | EDLRLPEGDLGK | 19.2 | 80 |
| integrin-linked protein kinase [Homo sapiens] | SVMIDEDMTAR | 19.3 | 81 |
| cysteine and glycine-rich protein 1 isoform 3 [Homo sapiens] | TVYFAEEVQCEGNSFHK | 20.3 | 82 |
| tropomyosin alpha-4 chain isoform 2 [Homo sapiens] | IQLVEEELDR | 21 | 84 |
| alpha-enolase isoform 1 [Homo sapiens] | EGLELLK | 21.7 | 85 |
| annexin A5 [Homo sapiens] | GTVTDFPGFDER | 21.8 | 86 |
| tropomyosin beta chain isoform 2 [Homo sapiens] | TIDDLEETLASAK | 22.4 | 87 |
| fibronectin isoform 6 preproprotein [Homo sapiens] | DLQFVEVTDVK | 22.8 | 88 |
| alpha-actinin-1 isoform c [Homo sapiens] | AGTQIENIEED-FRDGLK | 23.4 | 89 |
| Fetuin-B (16G2) (Fetuin-like protein IRL685) (Gugu) | LVVLPFPK | 26.2 | 90 |

Group 2

| Protein | Peptide Analyte Sequence | Validated Detection Time (minute) | Seq ID No. |
|---|---|---|---|
| Apolipoprotein B-100 (Apo B-100) [Cleaved into: Apolipoprotein B-48 (Apo B-48)] | SLDEHYHIR | 11.3 | 5 |
| Fibrinogen alpha chain [Cleaved into: Fibrinopeptide A; Fibrinogen alpha chain] | VTSGSTTTTR | 12.7 | 10 |
| Carboxypeptidase B2 (EC 3.4.17.20) (Carboxypeptidase U) (CPU) (Plasma carboxypeptidase B) (pCPB) (Thrombin-activable fibrinolysis inhibitor) (TAFI) | DHEELSLVASEAVR | 13.5 | 20 |
| Complement factor H (H factor 1) | EFDHNSNIR | 14.3 | 33 |
| Ceruloplasmin | IYHSHIDAPK | 15.6 | 47 |
| Haptoglobin (Zonulin) [Cleaved into: Haptoglobin alpha chain; Haptoglobin beta chain] | FTDHLK | 16.6 | 59 |
| Albumin | DDNPNLPR | 17.7 | 70 |
| Fibrinogen alpha chain [Cleaved into: Fibrinopeptide A; Fibrinogen alpha chain] | GSESGIFTNTK | 18.6 | 77 |
| Apolipoprotein E (Apo-E) | LGPLVEQGR | 20.5 | 83 |

Figure 2:
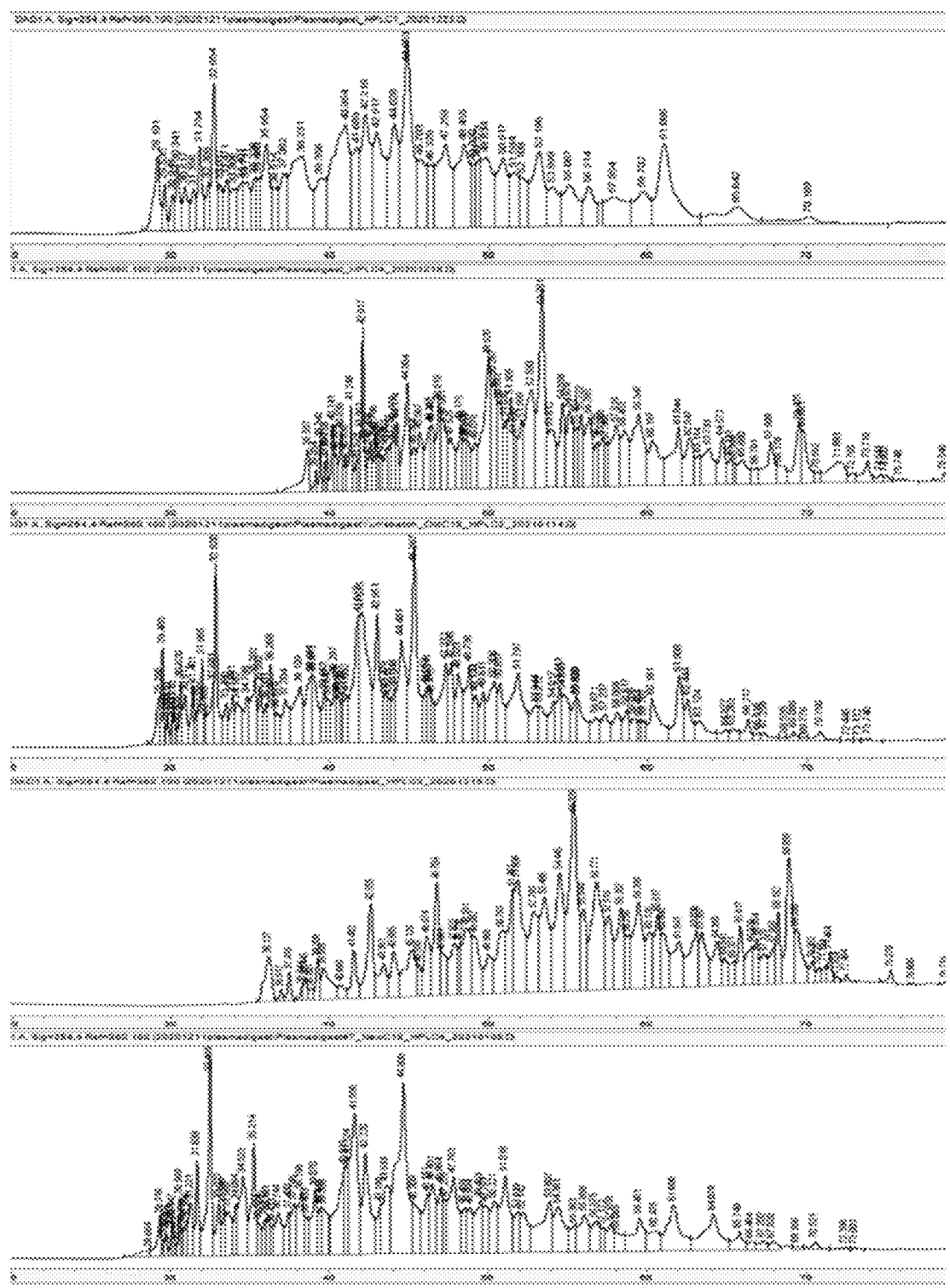
FIG. 2 is a set of graphs showing scans of the same set of analytes according to Example 1 with a different HPLC or by running a different gradient HPLC method.

Step 2. According to the retention time of each divider in group 2, and the retention time of each target molecule in group 1, we substantially separate the detection of the targets from group 1 into a certain number of detection segments which are divided/separated by the peptide dividers from group 2, and create the table (Table 2) below. The actual detection time for each molecule of interest and for each divider is used to establish the detection schedule table (Table 2). The actual detection time may change with a different HPLC or running a different gradient HPLC method, but the relationship (the relative positions of the analytes) represented on the table is stable which has been proven by repeated assays under different HPLC methods (FIG. 2).

TABLE 2

The peptide dividers from group 2 separate the detection of the targets from group 1 into a certain number of detection segments.

| Protein | Peptide Analyte Sequence | SEQ ID NO | Cancer Biomarker (Yes or No) | Divider (Yes or No) | Validated Detection Time (minute) | Detection Segment ID |
|---|---|---|---|---|---|---|
| glyceraldehyde-3-phosphate dehydrogenase isoform 2 [Homo sapiens] | AGAHLQGGAK | 1 | YES | NO | 8.2 | Detection Segment #0 |
| platelet basic protein preproprotein [Homo sapiens] | TTSGIHPK | 2 | YES | NO | 8.2 | |
| cofilin-1 [Homo sapiens] | SSTPEEVKK | 3 | YES | NO | 8.3 | |
| platelet basic protein preproprotein [Homo sapiens] | KLAGDESAD | 4 | YES | NO | 8.5 | |
| Apolipoprotein B-100 (Apo B-100) [Cleaved into: Apolipoprotein B-48 (Apo B-48)] | SLDEHYHIR | 5 | | YES | 11.3 | |
| bridging integrator 2 [Homo sapiens] | TSAPPSRPPPPR | 6 | YES | NO | 12.4 | Detection Segment #1 |
| thrombospondin-1 precursor [Homo sapiens] | TNYIGHK | 7 | YES | NO | 12.4 | |
| alpha-1-antitrypsin precursor [Homo sapiens] | TDTSHHDQDHPTFNK | 8 | YES | NO | 12.5 | |
| SH3 domain-binding glutamic acid-rich-like protein [Homo sapiens] | DIAANEENRK | 9 | YES | NO | 12.5 | |
| Fibrinogen alpha chain [Cleaved into: Fibrinopeptide A; Fibrinogen alpha chain] | VTSGSTTTTR | 10 | | YES | 12.7 | |
| fibrinogen gamma chain isoform gamma-A precursor [Homo sapiens] | DCQDIANK | 11 | YES | NO | 12.7 | Detection Segment #2 |
| 14-3-3 protein gamma [Homo sapiens] | EHMQPTHPIR | 12 | YES | NO | 12.8 | |
| zyxin [Homo sapiens] | GPPASSPAPAPK | 13 | YES | NO | 12.8 | |
| alpha-enolase isoform 1 [Homo sapiens] | KLNVTEQEK | 14 | YES | NO | 12.9 | |
| calmodulin [Homo sapiens] | DGDGTITTK | 15 | YES | NO | 12.9 | |
| tropomyosin alpha-4 chain isoform 2 [Homo sapiens] | SLEAASEK | 16 | YES | NO | 12.9 | |
| thymosin beta-4 [Homo sapiens] | ETIEQEK | 17 | YES | NO | 13.1 | |
| laminin subunit alpha-2 isoform b precursor [Homo sapiens] | LKPIK | 18 | YES | NC | 13.3 | |
| profilin-1 [Homo sapiens] | EGVHGGLINKK | 29 | YES | NO | 13.4 | |
| Carboxypeptidase B2 (EC 3.4.17.20) (Carboxypeptidase U) (CPU) (Plasma carboxypeptidase B) (pCPB) (Thrombin-activable fibrinolysis inhibitor) (TAFI) | DHEELSLVASEAVR | 20 | | YES | 13.5 | |
| 14-3-3 protein zeta/delta [Homo sapiens] | NELVQK | 21 | YES | NO | 13.6 | Detection Segment #3 |
| rho GDP-dissociation inhibitor 2 [Homo sapiens] | LNYKPPPQK | 22 | YES | NO | 13.7 | |
| coronin-1A [Homo sapiens] | HVFGQPAK | 23 | YES | NO | 13.8 | |
| filamin-A isoform 1 [Homo sapiens] | ETGEHLVHVK | 24 | YES | NO | 13.8 | |
| neurogranin [Homo sapiens] | GPGPGGPGGAGVAR | 25 | YES | NO | 13.8 | |
| integrin beta-3 precursor [Homo sapiens] | VLEDRPLSDK | 26 | YES | NO | 13.9 | |
| 55 kDa erythrocyte membrane protein isoform 4 [Homo sapiens] | FETVHQIHK | 27 | YES | NO | 14 | |
| phosphoglycerate mutase 2 [Homo sapiens] | AMEAVAAQGK | 28 | YES | NO | 14 | |
| hemoglobin subunit beta [Homo sapiens] | VHLTPEEK | 29 | YES | NO | 14.1 | |
| nucleoside diphosphate kinase B isoform a [Homo sapiens] | NIIHGSDSVK | 30 | YES | NO | 14.2 | |
| peptidyl-prolyl cis-trans isomerase A [Homo sapiens] | SIYGEK | 31 | YES | NO | 14.2 | |
| ras suppressor protein 1 isoform 2 [Homo sapiens] | ELHIQGNR | 32 | YES | NO | 14.2 | |
| Complement factor H (H factor 1) | EFDHNSNIR | 33 | | YES | 14.3 | |
| SH3 domain-binding glutamic acid-rich-like protein 3 [Homo sapiens] | VYSTSVTGSR | 34 | YES | NO | 14.4 | Detection Segment #4 |
| von Willebrand factor preproprotein [Homo sapiens] | EYAPGETVK | 35 | YES | NO | 14.7 | |
| profilin-1 [Homo sapiens] | EGVHGGLINK | 36 | YES | NO | 14.8 | |
| integrin beta-3 precursor [Homo sapiens] | DEIESVK | 37 | YES | NO | 15 | |
| alpha-actinin-1 isoform c [Homo sapiens] | SIVNYKPK | 38 | YES | NO | 15.1 | |
| WD repeat-containing protein 1 isoform 2 [Homo sapiens] | PYEIK | 39 | YES | NO | 15.1 | |

TABLE 2-continued

The peptide dividers from group 2 separate the detection of the targets from group 1 into a certain number of detection segments.

| Protein | Peptide Analyte Sequence | SEQ ID NO | Cancer Biomarker (Yes or No) | Divider (Yes or No) | Validated Detection Time (minute) | Detection Segment ID |
|---|---|---|---|---|---|---|
| actin, alpha skeletal muscle [Homo sapiens] | AGFAGDDAPR | 40 | YES | NC | 15.2 | |
| integrin-linked protein kinase [Homo sapiens] | GDDTPLHLAASHGHR | 41 | YES | NO | 15.3 | |
| flavin reductase (NADPH) [Homo sapiens] | LQAVTDDHIR | 42 | YES | NO | 15.4 | |
| triosephosphate isomerase isoform 1 [Homo sapiens] | SNVSDAVAQSTR | 43 | YES | NO | 15.4 | |
| actin, alpha skeletal muscle [Homo sapiens] | HQGVMVGMGQK | 44 | YES | NO | 15.5 | |
| thymosin beta-4 [Homo sapiens] | NPLPSKETIEQEK | 45 | YES | NO | 15.5 | |
| zyxin [Homo sapiens] | NDPFK | 46 | YES | NO | 15.5 | |
| Ceruloplasmin | IYHSHIDAPK | 47 | | YES | 15.6 | |
| 14-3-3 protein zeta/delta [Homo sapiens] | SVTEQGAELSNEER | 48 | YES | NO | 15.7 | Detection Segment #5 |
| lambda-crystallin homolog [Homo sapiens] | VPDDPEHLAAR | 49 | YES | NO | 15.7 | |
| myosin-9 [Homo sapiens] | EMEAELEDERK | 50 | YES | NO | 15.8 | |
| talin-1 [Homo sapiens] | DVDNALR | 51 | YES | NO | 15.8 | |
| cofilin-1 [Homo sapiens] | VFNDMK | 52 | YES | NO | 15.9 | |
| immunoglobulin J chain [Homo sapiens] | SSEDPNEDIVER | 53 | YES | NO | 16.1 | |
| serum deprivation-response protein [Homo sapiens] | GIQNDLTK | 54 | YES | NO | 16.2 | |
| transgelin-2 isoform a/b [Homo sapiens] | NFSDNQLQEGK | 55 | YES | NO | 16.3 | |
| filamin-A isoform 1 [Homo sapiens] | AEISFEDRK | 56 | YES | NO | 16.4 | |
| haptoglobin isoform 1 preproprotein [Homo sapiens] | LRTEGDGVYTLNNEK | 57 | YES | NO | 16.4 | |
| vinculin isoform VCL [Homo sapiens] | AVAGNISDPGLQK | 58 | YES | NO | 16.4 | |
| Haptoglobin (Zonulin) [Cleaved into: Haptoglobin alpha chain; Haptoglobin beta chain] | FTDHLK | 59 | | YES | 16.6 | |
| bridging integrator 2 [Homo sapiens] | TSLEVSPNPEPPEKPVR | 60 | YES | NO | 16.7 | Detection Segment #6 |
| ubiquitin thioesterase OTUB1 [Homo sapiens] | EYAEDDNIYQQK | 61 | YES | NO | 16.7 | |
| thrombospondin-1 precursor [Homo sapiens] | ELANELR | 62 | YES | NO | 17.2 | |
| tropomyosin alpha-3 chain isoform 4 [Homo sapiens] | EQAEAEVASLNR | 63 | YES | NO | 17.2 | |
| coronin-1A [Homo sapiens] | DGGLICTSCR | 64 | YES | NO | 17.3 | |
| myosin-9 [Homo sapiens] | QTLENERGELANEVK | 65 | YES | NO | 17.5 | |
| tropomyosin beta chain isoform 2 [Homo sapiens] | ATDAEADVASLNR | 66 | YES | NO | 17.5 | |
| actin, cytoplasmic 1 [Homo sapiens] | GYSFTTTAER | 67 | YES | NO | 17.6 | |
| haptoglobin isoform 1 preproprotein [Homo sapiens] | TEGDGVYTLNDK | 68 | YES | NO | 17.6 | |
| rho GDP-dissociation inhibitor 2 [Homo sapiens] | ETIVLK | 69 | YES | NO | 17.6 | |
| Albumin | DDNPNLPR | 70 | | YES | 17.7 | |
| hemoglobin subunit beta [Homo sapiens] | LHVDPENFR | 71 | YES | NO | 17.8 | Detection Segment #7 |
| obscurin isoform a [Homo sapiens] | FIEDVK | 72 | YES | NO | 17.8 | |
| heat shock protein HSP 90-alpha isoform 2 [Homo sapiens] | ELISNSSDALDK | 73 | YES | NO | 17.9 | |
| C-reactive protein precursor [Homo sapiens] | ESDTSYVSLK | 74 | YES | NO | 18 | |
| 14-3-3 protein gamma [Homo sapiens] | NVTELNEPLSNEER | 75 | YES | NO | 18.5 | |
| triosephosphate isomerase isoform 1 [Homo sapiens] | HVFGESDELIGQK | 76 | YES | NO | 18.5 | |
| Fibrinogen alpha chain [Cleaved into: Fibrinopeptide A; Fibrinogen alpha chain] | GSESGIFTNTK | 77 | | YES | 18.6 | |
| alpha-1-antitrypsin precursor [Homo sapiens] | DTEEEDFHVDQVTTVK | 78 | YES | NO | 18.9 | Detection Segment #8 |
| tropomyosin alpha-3 chain isoform 4 [Homo sapiens] | TIDDLEDKLK | 79 | YES | NO | 19 | |
| eukaryotic translation initiation factor 5A-1 isoform B [Homo sapiens] | EDLRLPEGDLGK | 80 | YES | NO | 19.2 | |

TABLE 2-continued

The peptide dividers from group 2 separate the detection of the targets from group 1 into a certain number of detection segments.

| Protein | Peptide Analyte Sequence | SEQ ID NO | Cancer Biomarker (Yes or No) | Divider (Yes or No) | Validated Detection Time (minute) | Detection Segment ID |
|---|---|---|---|---|---|---|
| integrin-linked protein kinase [Homo sapiens] | SVMIDEDMTAR | 81 | YES | NO | 19.3 | |
| cysteine and glycine-rich protein 1 isoform 3 [Homo sapiens] | TVYFAEEVQCEGNSFHK | 82 | YES | NO | 20.3 | |
| Apolipoprotein E (Apo-E) | LGPLVEQGR | 83 | | YES | 20.5 | |
| tropomyosin alpha-4 chain isoform 2 [Homo sapiens] | IQLVEEELDR | 84 | YES | NO | 21 | Detection Segment #9 |
| alpha-enolase isoform 1 [Homo sapiens] | EGLELLK | 85 | YES | NO | 21.7 | |
| annexin A5 [Homo sapiens] | GTVTDFPGFDER | 86 | YES | NO | 21.8 | |
| tropomyosin beta chain isoform 2 [Homo sapiens] | TIDDLEETLASAK | 87 | YES | NO | 22.4 | |
| fibronectin isoform 6 preproprotein [Homo sapiens] | DLQFVEVTDVK | 88 | YES | NO | 22.8 | |
| alpha-actinin-1 isoform c [Homo sapiens] | AGTQIENIEEDFRDGLK | 89 | YES | NO | 23.4 | |
| Fetuin-B (16G2) (Fetuin-like protein IRL685) (Gugu) | LVVLPFPK | 90 | YES | NO | 26.2 | |

Step 3. A plasma proteomics biomarker detection and quantification platform is therefore established through the BF-Quant. Detailed schedule of the detection of each biomarker is shown in Table 2.

Further, FIG. 2 shows that the retention time fluctuations of liquid chromatogram with different liquid chromatography methods, but stable retention relationships between adjacent peaks were reproducible. All plots were obtained from different organic solvent gradient methods, but with the same x-axis indicating retention time (minute).

The actual retention time value for each analyte may be different in different HPLC gradient settings. For example, in the following settings, Solvent A is Water and 0.1% Formic Acid, and Solvent B is Acetonitrile and 0.1% Formic Acid. In a 30-minute run setting, one can start from 100% Solvent A and 0% Solvent B at 0 minute and then gradually change to 0% Solvent A and 100% solvent B over 30 minutes. It is to gradually increase the concentration of Solvent B from 0% to 100% (Solvent A reduces from 100% to 0% over 30 minutes) across a 30-minute time span. Then the analyte A may be eluted and detected at 10 minute (retention time of A for this method is 10 minute) and analyte B may be eluted and detected at 20 minute (the retention time of B for this method is 20 minute) of the entire 30-minute run.

And when one change the 30-minute run to be a 15-minute run, that being said, one can start with 100% Solvent A and 0% Solvent B at 0 minute and then gradually change to 0% Solvent A and 100% solvent B over 15 minute, then the analyte A may be eluted and detected at 5 minute and analyte B may be eluted and detected at 10 minute of the entire 15-minute run.

Thus, the actual retention times of each analyte in different HPLC methods can be different, but analyte B is always eluted AFTER analyte A in an organic gradient environment, and this relationship is reproducible, not the actual time points.

In addition, if there are a thousand small peaks eluted and detected between analyte A and analyte B, these peaks are also reproducible in their relationships between each of them and A (i.e. they are eluted all after A) or between each of them and B (i.e. they are eluted all before B), as well as stable between each pair of randomly selected analytes in this assay of 1002 molecules unless one change to a completely different system, for example if one use a different column with a different chemistry, like HILIC column rather than C18 column where different properties of the analytes are used to decide the retention time, then the retention times needs to be reset, but their relationships are still stable in THAT system.

Example 2

Study Design

The key is to generate time series of the segments of detections, where each segment contains a subset of biomarkers to be detected, the switch from the detection of biomarkers from segment 1 to 2 or from segment 2 to 3, or so on so forth, is triggered by the detection of the "divider molecule" that are chosen based on highly and reproducible detectability from a biological sample. For example, peptides from albumin, immunoglobulin, haptoglobin, etc. may be chosen as dividers in detecting proteomics biomarkers from plasma.

Different separation method may be used to generate the "retention time" value essential for the construction of BF-Quant methods. For example, in proteomics assays, Applicant routinely uses C18 column to separate the different peptides through their different hydrophobicity when they are interacting with the column and the mobile phase; in nucleic acid assays, Applicant may use the size exclusion column to separate the different nucleic acid sequences through their different molecular weight when they are interacting with the size exclusion matrix and the mobile phase. There are other methods that can be used. If the method is able to separate the analytes in a reproducible manner, this method can be used to generate the "retention time" values that are then used to generate the BF-Quant worklist. There is no limitation to the separation methods herein.

In BF-Quant of the present invention, each Detection Segment can include the number of target molecules that is to the upper limit of the instrument specifications. For example, modern mass spectrometer can have a targeted detection list of 500 to 3000 transitions in the same scanning cycle, and with BF-Quant this number can be increased unlimitedly by adding in more and more dividers, and between each adjacent dividers a set of 500 to 3000 transitions can be detected. When the number of the detection needed in a Detection Segment is meeting and exceeding the instrument's limit, then at least one more divider can be setup within the Detection Segment to reduce the size of the target list below for each newly formed detection segment to be below the instrument upper limitation.

Due to the limitation of the pages, the examples here are not exhausting the modern mass spectrometry's throughput level. Applicant meant to demonstrate a principle of BF-Quant, so in Applicant's tables (in particular Tables 2, 4, 6, and 8) there are usually dozens of molecules to be detected in each Detection Segment; however Applicant can easily put thousands of molecules into each segment to be closer to the mass spectrometer's, limitation, but that will take thousands of pages here to display one table.

Detecting and Quantifying a Large Number of Metabolomics Biomarkers

There are about 300 to 500 metabolites that are routinely detected and quantified in clinical settings. However, this only represent a very small portion of the overall metabolite pool that are present in human body fluid systems. BF-Quant of the present invention could be used to detect a large number or essentially un-limited number of metabolites. To build a high-throughput detection method for metabolomics biomarkers we conducted the following three steps:

Step 1. Through the analysis of body fluid sample, we identified the following two groups of metabolites where group 1 are metabolomics biomarkers that are of clinical interest, and group 2 are metabolite dividers with excellent detectability observed from the mass spectrometry analysis. The list of biomarkers could be from our own profiling detection assays or from literatures or from databases. In the following table, for each metabolomics biomarker, its specific detection time was validated and indicated on the table. The validated detection time for each metabolite can be observed from literature and can be obtained by analyzing each metabolite through the same gradient of organic solvents individually. The key is to establish the relationship in retention times for all the analytes, including the target of interest (i.e. metabolomics biomarkers representing disease statuses) and the dividers (i.e. highly stable and highly detectable metabolomics biomarkers in Group 2 in Table 3).

TABLE 3

Target metabolomics biomarkers to be detected in a method.

| Biomarker Group | Metabolomics Biomarker Name | Precursor (M/z) | Frament (M/z) | Fragmentor | Collision Energy | Dewll Time | Charge Status | Retention Time (min) |
|---|---|---|---|---|---|---|---|---|
| Group 1 | ±-Mevalonolactone | 189.1 | 59.1 | 166 | 6 | 4 | Negative | 21.9 |
| Group 1 | 1-Methyladenosine_pos | 281.8 | 150 | 166 | 27 | 4 | Positive | 23.1 |
| Group 1 | 2-Aminooctanoic acid_pos | 160 | 55.3 | 166 | 21 | 4 | Positive | 15.4 |
| Group 1 | 2-Dehydro-D-gluconate | 193 | 103 | 166 | 14 | 4 | Negative | 10.6 |
| Group 1 | 2-Deoxyribose 5-phosphate | 213 | 79.1 | 166 | 40 | 4 | Negative | 22.2 |
| Group 1 | 2-Hydroxygluterate | 147.1 | 128.7 | 166 | 17 | 4 | Negative | 13.8 |
| Group 1 | 2-ketohaxanoic acid | 129 | 101.3 | 166 | 13 | 4 | Negative | 15.5 |
| Group 1 | 2-Methyl-1-butanol | 87.1 | 43 | 166 | 5 | 4 | Negative | 13.0 |
| Group 1 | 2-oxo-4-methylthiobutanoate | 147 | 99 | 166 | 13 | 4 | Negative | 23.3 |
| Group 1 | 2-Phosphoglyceric acid | 185 | 79 | 166 | 37 | 4 | Negative | 20.3 |
| Group 1 | 3-2-Hydroxyethylindole | 160.1 | 142.1 | 166 | 16 | 4 | Negative | 22.3 |
| Group 1 | 3-Hydroxyanthranilic acid | 152 | 107 | 166 | 23 | 4 | Negative | 21.2 |
| Group 1 | 3-Hydroxybenzoic acid | 137 | 93.1 | 166 | 10 | 4 | Negative | 19.0 |
| Group 1 | 3-Indoleacetic acid | 174.1 | 130 | 166 | 7 | 4 | Negative | 17.9 |
| Group 1 | 3-Methylphenylacetic acid | 149 | 105 | 166 | 12 | 4 | Negative | 20.5 |
| Group 1 | 3-S-methylthiopropionate | 119 | 47 | 166 | 15 | 4 | Negative | 22.4 |
| Group 1 | 4-Aminobenzoic acid | 136 | 92 | 166 | 8 | 4 | Negative | 13.8 |
| Group 1 | 4-Hydroxy-L-glutamic acid | 162 | 144 | 166 | 6 | 4 | Negative | 19.2 |
| Group 1 | 4-Hydroxybenzoic acid | 137 | 93 | 166 | 14 | 4 | Negative | 18.5 |
| Group 1 | 4-Hydroxyphenyl-pyruvic acid | 179 | 107 | 166 | 4 | 4 | Negative | 20.6 |
| Group 1 | 4-Pyridoxic acid | 182 | 138 | 166 | 12 | 4 | Negative | 13.2 |
| Group 1 | 5-Methoxytryptamine | 189.1 | 174 | 166 | 12 | 4 | Negative | 11.5 |
| Group 1 | 6-Hydroxynicotinic acid | 138 | 94.1 | 166 | 10 | 4 | Negative | 17.0 |
| Group 1 | 6-Phospho-D-gluconate | 275 | 97 | 166 | 13 | 4 | Negative | 13.2 |
| Group 1 | 6-Phospho-D-glucono-1,5-lactone | 257 | 97 | 166 | 22 | 4 | Negative | 16.6 |
| Group 1 | 7-Methylguanosine_pos | 298 | 166 | 166 | 24 | 4 | Positive | 19.4 |
| Group 1 | a-Ketoglutarate | 145 | 101 | 166 | 5 | 4 | Negative | 17.6 |
| Group 1 | Acadesine_pos | 259 | 110 | 166 | 24 | 4 | Positive | 22.9 |
| Group 1 | Acetoacetate | 101.1 | 57.2 | 166 | 14 | 4 | Negative | 22.9 |
| Group 1 | Acetoacetyl-CoA | 850.2 | 766.1 | 166 | 32 | 4 | Negative | 13.0 |
| Group 1 | Acetoacetyl-CoA_pos | 852 | 345 | 166 | 36 | 4 | Positive | 18.1 |
| Group 1 | Acetyl-CoA | 808 | 408 | 166 | 33 | 4 | Negative | 20.9 |
| Group 1 | Acetylcarnitine_pos | 204 | 85 | 166 | 19 | 4 | Positive | 20.3 |
| Group 1 | Acetylphosphate | 139 | 79 | 166 | 24 | 4 | Negative | 5.8 |
| Group 1 | Adenine_pos | 136 | 119 | 166 | 26 | 4 | Positive | 18.6 |
| Group 1 | Adenosine 5-phosphosulfate | 426 | 346 | 166 | 22 | 4 | Negative | 2.4 |
| Group 1 | Adenosine-C13 | 276 | 139 | 166 | 10 | 4 | Negative | 18.0 |
| Group 1 | Adenylosuccinic acid | 462 | 134.1 | 166 | 48 | 4 | Negative | 3.4 |
| Group 1 | Adipic acid | 145.1 | 101.1 | 166 | 11 | 4 | Negative | 21.0 |
| Group 1 | ADP-C13 | 436 | 159 | 166 | 28 | 4 | Negative | 22.1 |
| Group 1 | AICAR_pos | 339 | 110 | 166 | 32 | 4 | Positive | 21.2 |
| Group 1 | Allantoate | 175 | 132 | 166 | 14 | 4 | Negative | 10.9 |
| Group 1 | alpha-D(+)Mannose 1-phosphate | 259 | 97 | 166 | 14 | 4 | Negative | 17.9 |
| Group 2 | AMP | 346 | 79 | 166 | 38 | 4 | Negative | 14.6 |

TABLE 3-continued

Target metabolomics biomarkers to be detected in a method.

| Biomarker Group | Metabolomics Biomarker Name | Precursor (M/z) | Frament (M/z) | Fragmentor | Collision Energy | Dewll Time | Charge Status | Retention Time (min) |
|---|---|---|---|---|---|---|---|---|
| Group 1 | Anthranilate | 136 | 92 | 166 | 18 | 4 | Negative | 15.6 |
| Group 1 | Arabinose-5-phosphate | 229 | 97 | 166 | 8 | 4 | Negative | 22.3 |
| Group 2 | ATP | 506 | 159 | 166 | 38 | 4 | Negative | 18.6 |
| Group 1 | ATP-C13 | 516 | 159 | 166 | 38 | 4 | Negative | 11.0 |
| Group 1 | Atrolactic acid | 165 | 119 | 166 | 21 | 4 | Negative | 20.7 |
| Group 1 | Betaine aldehyde_pos | 102 | 58 | 166 | 21 | 4 | Positive | 21.8 |
| Group 2 | cAMP | 328 | 134 | 166 | 24 | 4 | Negative | 20.8 |
| Group 2 | cGMP | 344 | 150 | 166 | 24 | 4 | Negative | 22.8 |
| Group 1 | Chorismic acid | 225 | 189 | 166 | 6 | 4 | Negative | 15.3 |
| Group 1 | cis-Aconitate | 173.1 | 85 | 166 | 17 | 4 | Negative | 21.4 |
| Group 1 | Citramalic acid | 147 | 87 | 166 | 14 | 4 | Negative | 19.3 |
| Group 2 | Citrate | 191 | 87 | 166 | 16 | 4 | Negative | 17.2 |
| Group 1 | Creatine_pos | 132 | 90 | 166 | 14 | 4 | Positive | 22.8 |
| Group 1 | Cytidine | 242.1 | 109 | 166 | 8 | 4 | Negative | 15.6 |
| Group 1 | Cytosine_pos | 112.1 | 95 | 166 | 19 | 4 | Positive | 18.5 |
| Group 1 | D-+-Galactosamine | 238.1 | 159.9 | 166 | 8 | 4 | Negative | 19.9 |
| Group 1 | D-erythro-Dihydrosphingosine | 300.3 | 199 | 166 | 8 | 4 | Negative | 19.5 |
| Group 1 | D-erythrose-4-phosphate | 199 | 97 | 166 | 19 | 4 | Negative | 15.3 |
| Group 1 | D-glucarate | 209 | 85 | 166 | 17 | 4 | Negative | 7.8 |
| Group 1 | D-Gluconic acid | 195.1 | 129 | 166 | 10 | 4 | Negative | 18.6 |
| Group 1 | D-Glucosamine 6-phosphate | 258 | 79 | 166 | 48 | 4 | Negative | 17.4 |
| Group 1 | D-Glucosamine-1-phosphate_pos | 260.1 | 162.1 | 166 | 17 | 4 | Positive | 16.5 |
| Group 1 | D-Maltose | 341.1 | 179 | 166 | 4 | 4 | Negative | 15.6 |
| Group 1 | D-Mannose | 179.1 | 89 | 166 | 4 | 4 | Negative | 20.7 |
| Group 1 | D-pantothenic acid | 218 | 146.1 | 166 | 14 | 4 | Negative | 20.0 |
| Group 1 | D-Ribulose 1,5-biphosphate | 308.9 | 97 | 166 | 22 | 4 | Negative | 18.9 |
| Group 1 | D-Xylose | 149.1 | 89 | 166 | 4 | 4 | Negative | 11.8 |
| Group 1 | D-Xylulose-5-phosphate | 229 | 139 | 166 | 8 | 4 | Negative | 12.2 |
| Group 1 | dADP | 410 | 158.7 | 166 | 24 | 4 | Negative | 14.9 |
| Group 1 | dAMP_pos | 332.1 | 136 | 166 | 23 | 4 | Positive | 14.9 |
| Group 1 | dATP-C13 | 500 | 159 | 166 | 32 | 4 | Negative | 14.7 |
| Group 2 | dCDP | 386 | 79 | 166 | 36 | 4 | Negative | 19.9 |
| Group 1 | dCMP | 306 | 79 | 166 | 44 | 4 | Negative | 20.2 |
| Group 1 | dCMP_pos | 308 | 112 | 166 | 18 | 4 | Positive | 11.6 |
| Group 1 | Deoxyadenosine_pos | 252 | 136 | 166 | 22 | 4 | Positive | 16.7 |
| Group 1 | Deoxycholic acid | 391.2 | 345.2 | 166 | 36 | 4 | Negative | 19.1 |
| Group 1 | Deoxycytidine | 286.1 | 226 | 166 | 4 | 4 | Negative | 15.6 |
| Group 1 | Deoxyguanosine | 266.1 | 150 | 166 | 12 | 4 | Negative | 23.3 |
| Group 1 | Deoxyguanosine_pos | 268.1 | 152 | 166 | 17 | 4 | Positive | 18.3 |
| Group 1 | Deoxyribose-phosphate | 213 | 79 | 166 | 35 | 4 | Negative | 21.6 |
| Group 1 | Deoxyuridine | 227.1 | 184 | 166 | 6 | 4 | Negative | 4.7 |
| Group 1 | Dephospho-CoA | 686.2 | 339 | 166 | 37 | 4 | Negative | 16.6 |
| Group 1 | dGMP | 346 | 97 | 166 | 36 | 4 | Negative | 23.2 |
| Group 1 | Diiodothyronine_pos | 525.5 | 352.8 | 166 | 31 | 4 | Positive | 3.9 |
| Group 1 | Dimethylglycine_pos | 104 | 58 | 166 | 21 | 4 | Positive | 11.9 |
| Group 1 | DL-Glyceraldehyde 3-phosphate (G3P) | 169 | 97 | 166 | 14 | 4 | Negative | 6.6 |
| Group 1 | Epicatechin | 289.1 | 245 | 166 | 11 | 4 | Negative | 13.9 |
| Group 2 | Flavone_pos | 223 | 121 | 166 | 29 | 4 | Positive | 18.0 |
| Group 1 | Folate_pos | 442 | 295 | 166 | 18 | 4 | Positive | 11.7 |
| Group 1 | Fructose-1,6-bisphosphate | 338.9 | 241 | 166 | 12 | 4 | Negative | 23.4 |
| Group 1 | Fumarate | 115 | 71 | 166 | 13 | 4 | Negative | 17.4 |
| Group 1 | Galactonic acid | 195.1 | 129 | 166 | 11 | 4 | Negative | 22.4 |
| Group 1 | gamma-Aminobutyric acid (GABA) | 102 | 84.1 | 166 | 8 | 4 | Negative | 20.1 |
| Group 1 | gamma-Aminobutyric acid (GABA)_pos | 104 | 69 | 166 | 22 | 4 | Positive | 14.5 |
| Group 1 | GlcNAc-1P | 300 | 97 | 166 | 16 | 4 | Negative | 17.9 |
| Group 1 | Glucosamine_pos | 180 | 162 | 166 | 12 | 4 | Positive | 17.3 |
| Group 1 | Glucose-1-phosphate | 259 | 240.9 | 166 | 9 | 4 | Negative | 13.6 |
| Group 1 | Glycerate | 105 | 75.1 | 166 | 8 | 4 | Negative | 9.9 |
| Group 1 | Glycolate | 75 | 45.2 | 166 | 13 | 4 | Negative | 21.2 |
| Group 1 | Glyoxylate_PH | 163.1 | 92 | 166 | 20 | 4 | Negative | 13.4 |
| Group 1 | GMP_pos | 364 | 152 | 166 | 21 | 4 | Positive | 11.9 |
| Group 2 | GTP | 522.3 | 158.9 | 166 | 36 | 4 | Negative | 11.6 |
| Group 1 | Guanine_pos | 152.2 | 110 | 166 | 20 | 4 | Positive | 14.8 |
| Group 1 | Guanosine 5-diphosphate, 3-diphosphate | 602 | 504 | 166 | 24 | 4 | Negative | 10.8 |
| Group 1 | Hydroxyproline_pos | 132 | 68.2 | 166 | 19 | 4 | Positive | 13.7 |
| Group 1 | IDP | 427 | 158.9 | 166 | 28 | 4 | Negative | 15.9 |
| Group 1 | Imidazole_pos | 69 | 42.2 | 166 | 23 | 4 | Positive | 10.2 |
| Group 1 | IMP | 347 | 97 | 166 | 22 | 4 | Negative | 20.8 |
| Group 1 | IMP_pos | 349 | 137 | 166 | 21 | 4 | Positive | 13.9 |
| Group 1 | Indole_pos | 118 | 91 | 166 | 26 | 4 | Positive | 19.7 |
| Group 1 | Indoleacrylic acid | 186 | 142 | 166 | 20 | 4 | Negative | 22.0 |
| Group 1 | Indoline-2-carboxylate | 162.1 | 118 | 166 | 11 | 4 | Negative | 9.0 |
| Group 1 | Isopentenyl pyrophosphate | 245 | 209 | 166 | 4 | 4 | Negative | 17.9 |
| Group 1 | Ketoisovaleric acid | 115 | 71.2 | 166 | 4 | 4 | Negative | 19.7 |

TABLE 3-continued

Target metabolomics biomarkers to be detected in a method.

| Biomarker Group | Metabolomics Biomarker Name | Precursor (M/z) | Frament (M/z) | Fragmentor | Collision Energy | Dewll Time | Charge Status | Retention Time (min) |
|---|---|---|---|---|---|---|---|---|
| Group 1 | Kynurenic acid | 188 | 144 | 166 | 21 | 4 | Negative | 19.1 |
| Group 1 | L-Arabitol | 151 | 89 | 166 | 12 | 4 | Negative | 9.0 |
| Group 2 | L-Arginine | 173.1 | 156 | 166 | 8 | 4 | Negative | 4.7 |
| Group 1 | L-Arginino-succinate | 289 | 131.1 | 166 | 27 | 4 | Negative | 15.3 |
| Group 1 | L-Arginino-succinate__pos | 291 | 70 | 166 | 37 | 4 | Positive | 16.0 |
| Group 1 | L-Asparagine__pos | 133.1 | 74 | 166 | 19 | 4 | Positive | 10.2 |
| Group 1 | L-Canavanine | 175.1 | 118 | 166 | 8 | 4 | Negative | 21.3 |
| Group 1 | L-Carnitine | 220.1 | 146 | 166 | 4 | 4 | Negative | 16.4 |
| Group 1 | L-Cystathionine__pos | 223 | 134 | 166 | 13 | 4 | Positive | 14.0 |
| Group 1 | L-Glutathione | 306 | 143 | 166 | 19 | 4 | Negative | 20.3 |
| Group 1 | L-Glutathione__pos | 308.1 | 162 | 166 | 21 | 4 | Positive | 19.0 |
| Group 1 | L-Gluthathione (oxidized)__pos | 613 | 231 | 166 | 35 | 4 | Positive | 12.1 |
| Group 1 | L-Histidinol__pos | 142.1 | 95 | 166 | 20 | 4 | Positive | 19.5 |
| Group 1 | L-Homocystine | 267 | 132 | 166 | 8 | 4 | Negative | 9.2 |
| Group 1 | L-Hydroxyglutaric acid | 147 | 85.1 | 166 | 13 | 4 | Negative | 18.5 |
| Group 2 | L-Leucine | 130 | 45 | 166 | 16 | 4 | Negative | 19.1 |
| Group 1 | L-Methionine__pos | 150.1 | 133 | 166 | 12 | 4 | Positive | 20.0 |
| Group 1 | L-Proline | 114 | 68.1 | 166 | 12 | 4 | Negative | 23.4 |
| Group 2 | L-Threonine | 118 | 74.1 | 166 | 9 | 4 | Negative | 15.7 |
| Group 2 | L-Tryptophan | 203.1 | 116 | 166 | 14 | 4 | Negative | 12.6 |
| Group 1 | L-Tryptophan__pos | 205 | 146 | 166 | 18 | 4 | Positive | 18.4 |
| Group 2 | L-Tyrosine | 180 | 119 | 166 | 15 | 4 | Negative | 9.6 |
| Group 1 | L-Tyrosine__pos | 182.1 | 77 | 166 | 39 | 4 | Positive | 22.7 |
| Group 1 | Lipoate | 205 | 171 | 166 | 13 | 4 | Negative | 19.5 |
| Group 1 | Melibiose | 341.1 | 179 | 166 | 4 | 4 | Negative | 12.4 |
| Group 1 | Methionine sulfoxide__pos | 166 | 74 | 166 | 14 | 4 | Positive | 9.7 |
| Group 1 | Methylnicotinamide__pos | 137 | 94 | 166 | 20 | 4 | Positive | 17.3 |
| Group 1 | Mevalonic acid | 147.1 | 128.9 | 166 | 8 | 4 | Negative | 10.6 |
| Group 1 | Mevalonic acid 5-phosphate | 227 | 97 | 166 | 12 | 4 | Negative | 19.8 |
| Group 1 | myo-inositol | 179 | 161 | 166 | 17 | 4 | Negative | 20.9 |
| Group 1 | N-acetyl-glutamate | 188.1 | 128 | 166 | 10 | 4 | Negative | 21.2 |
| Group 1 | N-acetyl-L-alanine | 130 | 88 | 166 | 14 | 4 | Negative | 10.9 |
| Group 1 | N-acetyl-L-ornithine__pos | 175 | 115.1 | 166 | 16 | 4 | Positive | 19.3 |
| Group 1 | N-carbamoyl-L-aspartate__pos | 177.1 | 74 | 166 | 19 | 4 | Positive | 11.8 |
| Group 1 | NADPH__neg | 744 | 408 | 166 | 36 | 4 | Negative | 21.8 |
| Group 1 | Ng,NG-dimethyl-L-arginine__pos | 203 | 70 | 166 | 24 | 4 | Positive | 13.0 |
| Group 1 | Nicotinic acid mononucleotide (NaMN) | 334 | 289.9 | 166 | 4 | 4 | Negative | 3.3 |
| Group 1 | O-acetyl-L-serine | 148 | 106 | 166 | 14 | 4 | Positive | 10.2 |
| Group 1 | o-Phospho-L-Serine | 184 | 97 | 166 | 13 | 4 | Negative | 15.4 |
| Group 1 | o-Phospho-L-Serine__pos | 186 | 88 | 166 | 12 | 4 | Positive | 19.0 |
| Group 1 | Octulose-1,8-bisphosphate (OBP) | 399 | 97 | 166 | 37 | 4 | Negative | 20.8 |
| Group 1 | Octulose-monophosphate (O8P-O1P) | 319 | 97 | 166 | 22 | 4 | Negative | 8.9 |
| Group 1 | Orotate | 155 | 111 | 166 | 15 | 4 | Negative | 17.8 |
| Group 1 | Oxamic acid | 88 | 42 | 166 | 12 | 4 | Negative | 22.3 |
| Group 1 | Phenyllactic acid | 165 | 103.1 | 166 | 21 | 4 | Negative | 22.5 |
| Group 1 | Phenylpyruvate | 163 | 91.1 | 166 | 6 | 4 | Negative | 17.4 |
| Group 1 | Phosphorylcholine | 184 | 125 | 166 | 23 | 4 | Positive | 20.7 |
| Group 1 | Prephenate | 225 | 101 | 166 | 9 | 4 | Negative | 11.6 |
| Group 1 | Purine__pos | 121 | 94 | 166 | 25 | 4 | Positive | 16.5 |
| Group 1 | Putrescine__pos | 89 | 72 | 166 | 12 | 4 | Positive | 23.0 |
| Group 1 | Pyridoxal 5-phosphate | 246 | 79 | 166 | 30 | 4 | Negative | 15.8 |
| Group 1 | Pyridoxal hydrochloride | 166.1 | 138 | 166 | 12 | 4 | Negative | 15.8 |
| Group 1 | Pyroglutamic acid | 128 | 82.1 | 166 | 19 | 4 | Negative | 16.7 |
| Group 1 | Pyrophosphate | 176.8 | 158.6 | 166 | 16 | 4 | Negative | 22.5 |
| Group 1 | Pyruvate | 87 | 43 | 166 | 4 | 4 | Negative | 23.0 |
| Group 1 | Pyruvate__PH | 177.1 | 92 | 166 | 14 | 4 | Negative | 20.4 |
| Group 1 | Riboflavin | 375.1 | 255 | 166 | 14 | 4 | Negative | 14.9 |
| Group 1 | S-2-Aminoethyl-L-cysteine | 163.1 | 33.2 | 166 | 28 | 4 | Negative | 15.4 |
| Group 2 | S-adenosyl-L-homoCysteine | 383.1 | 248 | 166 | 13 | 4 | Negative | 21.9 |
| Group 1 | S-adenosyl-L-homoCysteine__pos | 385.1 | 136 | 166 | 21 | 4 | Positive | 9.1 |
| Group 1 | S-methyl-5-thioadenosine__pos | 298 | 136 | 166 | 29 | 4 | Positive | 17.6 |
| Group 1 | Shikimate | 173 | 111 | 166 | 7 | 4 | Negative | 10.4 |
| Group 1 | sn-Glycerol-3-phosphate | 171 | 79 | 166 | 15 | 4 | Negative | 23.5 |
| Group 1 | Spermidine__pos | 146 | 112 | 166 | 15 | 4 | Positive | 1.7 |
| Group 1 | Spermine__pos | 202.1 | 129.1 | 166 | 19 | 4 | Positive | 7.2 |
| Group 1 | Succinate | 117 | 99 | 166 | 8 | 4 | Negative | 22.4 |
| Group 1 | Taurine | 124 | 80 | 166 | 24 | 4 | Negative | 18.8 |
| Group 1 | TDP | 401 | 97 | 166 | 25 | 4 | Negative | 17.0 |
| Group 1 | Thiamine pyrophosphate | 423.1 | 302 | 166 | 21 | 4 | Negative | 14.9 |
| Group 1 | Thiamine__pos | 265 | 122 | 166 | 19 | 4 | Positive | 13.0 |
| Group 1 | Thiamine-phosphate__pos | 345.2 | 122 | 166 | 15 | 4 | Positive | 12.3 |
| Group 1 | Thymine__pos | 127.1 | 110 | 166 | 19 | 4 | Positive | 21.3 |
| Group 1 | trans-Aconitate | 173 | 129 | 166 | 4 | 4 | Negative | 16.2 |
| Group 1 | trans-trans Muconic acid | 141 | 53.3 | 166 | 8 | 4 | Negative | 8.2 |

TABLE 3-continued

Target metabolomics biomarkers to be detected in a method.

| Biomarker Group | Metabolomics Biomarker Name | Precursor (M/z) | Frament (M/z) | Fragmentor | Collision Energy | Dewll Time | Charge Status | Retention Time (min) |
|---|---|---|---|---|---|---|---|---|
| Group 1 | trans, trans-Farnesyl diphosphate | 381 | 79 | 166 | 23 | 4 | Negative | 18.3 |
| Group 1 | UDP-D-glucose | 565 | 323 | 166 | 24 | 4 | Negative | 15.2 |
| Group 1 | Urea_pos | 61.1 | 44.2 | 166 | 25 | 4 | Positive | 21.8 |
| Group 1 | Vanillic acid | 167 | 123 | 166 | 9 | 4 | Negative | 18.9 |
| Group 1 | Xanthosine-5-phosphate_pos | 365 | 97 | 166 | 13 | 4 | Positive | 20.6 |
| Group 1 | Xanthurenic acid | 204 | 160 | 166 | 19 | 4 | Negative | 9.5 |
| Group 1 | Xylitol | 151.1 | 89 | 166 | 8 | 4 | Negative | 19.2 |

Step 2. According to the retention time of each divider in group 2, and the retention time of each target molecule in group 1, we substantially separate the detection of the targets from group 1 into a certain number of detection segments which are divided/separated by the metabolite dividers from group 2, and create the table (Table 4) below. The actual detection time for each molecule of interest and for each divider is used to establish the detection schedule table (Table 4). The actual detection time may change with a different HPLC or running a different gradient HPLC method, but the relationship (the relative positions of the analytes) represented on the table is stable which has been proven by repeated assays under different HPLC methods.

TABLE 4

Detection Schedule after implementing the BF-Quant strategy

| | Biomarker Group | Metabolomics Biomarker Name | Retention Time (min) |
|---|---|---|---|
| Detection Segment 1 | Group 1 | Spermidine_pos | 1.7 |
| | Group 1 | Adenosine 5-phosphosulfate | 2.4 |
| | Group 1 | Nicotinic acid mononucleotide (NaMN) | 3.3 |
| | Group 1 | Adenylosuccinic acid | 3.4 |
| | Group 1 | Diiodothyronine_pos | 3.9 |
| | Group 2 | L-Arginine | 4.7 |
| Detection Segment 2 | Group 1 | Deoxyuridine | 4.7 |
| | Group 1 | Acetylphosphate | 5.8 |
| | Group 1 | DL-Glyceraldehyde 3-phosphate (G3P) | 6.6 |
| | Group 1 | Spermine_pos | 7.2 |
| | Group 1 | D-glucarate | 7.8 |
| | Group 1 | trans-trans Muconic acid | 8.2 |
| | Group 1 | Octulose-monophosphate (O8P-O1P) | 8.9 |
| | Group 1 | Indoline-2-carboxylate | 9.0 |
| | Group 1 | L-Arabitol | 9.0 |
| | Group 1 | S-adenosyl-L-homoCysteine_pos | 9.1 |
| | Group 1 | L-Homocystine | 9.2 |
| | Group 1 | Xanthurenic acid | 9.5 |
| | Group 2 | L-Tyrosine | 9.6 |
| Detection Segment 3 | Group 1 | Methionine sulfoxide_pos | 9.7 |
| | Group 1 | Glycerate | 9.9 |
| | Group 1 | Imidazole_pos | 10.2 |
| | Group 1 | O-acetyl-L-serine | 10.2 |
| | Group 1 | L-Asparagine_pos | 10.2 |
| | Group 1 | Shikimate | 10.4 |
| | Group 1 | 2-Dehydro-D-gluconate | 10.6 |
| | Group 1 | Mevalonic acid | 10.6 |
| | Group 1 | Guanosine 5-diphosphate,3-diphosphate | 10.8 |
| | Group 1 | N-acetyl-L-alanine | 10.9 |
| | Group 1 | Allantoate | 10.9 |
| | Group 1 | ATP-C13 | 11.0 |
| | Group 1 | 5-Methoxytryptamine | 11.5 |
| | Group 2 | GTP | 11.6 |
| Detection Segment 4 | Group 1 | dCMP_pos | 11.6 |
| | Group 1 | Prephenate | 11.6 |
| | Group 1 | Folate_pos | 11.7 |
| | Group 1 | D-Xylose | 11.8 |
| | Group 1 | N-carbamoyl-L-aspartate_pos | 11.8 |
| | Group 1 | Dimethylglycine_pos | 11.9 |
| | Group 1 | GMP_pos | 11.9 |
| | Group 1 | L-Gluthathione (oxidized)_pos | 12.1 |
| | Group 1 | D-Xylulose-5-phosphate | 12.2 |
| | Group 1 | Thiamine-phosphate_pos | 12.3 |
| | Group 1 | Melibiose | 12.4 |
| | Group 2 | L-Tryptophan | 12.6 |

TABLE 4-continued

Detection Schedule after implementing the BF-Quant strategy

| | Biomarker Group | Metabolomics Biomarker Name | Retention Time (min) |
|---|---|---|---|
| Detection Segment 5 | Group 1 | Ng,NG-dimethyl-L-arginine_pos | 13.0 |
| | Group 1 | Thiamine_pos | 13.0 |
| | Group 1 | Acetoacetyl-CoA | 13.0 |
| | Group 1 | 2-Methyl-1-butanol | 13.0 |
| | Group 1 | 4-Pyridoxic acid | 13.2 |
| | Group 1 | 6-Phospho-D-gluconate | 13.2 |
| | Group 1 | Glyoxylate_PH | 13.4 |
| | Group 1 | Glucose-1-phosphate | 13.6 |
| | Group 1 | Hydroxyproline_pos | 13.7 |
| | Group 1 | 2-Hydroxygluterate | 13.8 |
| | Group 1 | 4-Aminobenzoic acid | 13.8 |
| | Group 1 | Epicatechin | 13.9 |
| | Group 1 | IMP_pos | 13.9 |
| | Group 1 | L-Cystathionine_pos | 14.0 |
| | Group 1 | gamma-Aminobutyric acid (GABA)_pos | 14.5 |
| | Group 2 | AMP | 14.6 |
| Detection Segment 6 | Group 1 | dATP-C13 | 14.7 |
| | Group 1 | Guanine_pos | 14.8 |
| | Group 1 | dADP | 14.9 |
| | Group 1 | dAMP_pos | 14.9 |
| | Group 1 | Riboflavin | 14.9 |
| | Group 1 | Thiamine pyrophosphate | 14.9 |
| | Group 1 | UDP-D-glucose | 15.2 |
| | Group 1 | Chorismic acid | 15.3 |
| | Group 1 | D-erythrose-4-phosphate | 15.3 |
| | Group 1 | L-Arginino-succinate | 15.3 |
| | Group 1 | S-2-Aminoethyl-L-cysteine | 15.4 |
| | Group 1 | 2-Aminooctanoic acid_pos | 15.4 |
| | Group 1 | o-Phospho-L-Serine | 15.4 |
| | Group 1 | 2-ketohaxanoic acid | 15.5 |
| | Group 1 | Cytidine | 15.6 |
| | Group 1 | Deoxycytidine | 15.6 |
| | Group 1 | D-Maltose | 15.6 |
| | Group 1 | Anthranilate | 15.6 |
| | Group 2 | L-Threonine | 15.7 |
| Detection Segment 7 | Group 1 | Pyridoxal hydrochloride | 15.8 |
| | Group 1 | Pyridoxal 5-phosphate | 15.8 |
| | Group 1 | IDP | 15.9 |
| | Group 1 | L-Arginino-succinate_pos | 16.0 |
| | Group 1 | trans-Aconitate | 16.2 |
| | Group 1 | L-Carnitine | 16.4 |
| | Group 1 | D-Glucosamine-1-phosphate_pos | 16.5 |
| | Group 1 | Purine_pos | 16.5 |
| | Group 1 | Dephospho-CoA | 16.6 |
| | Group 1 | 6-Phospho-D-glucono-1,5-lactone | 16.6 |
| | Group 1 | Pyroglutamic acid | 16.7 |
| | Group 1 | Deoxyadenosine_pos | 16.7 |
| | Group 1 | 6-Hydroxynicotinic acid | 17.0 |
| | Group 1 | TDP | 17.0 |
| | Group 2 | Citrate | 17.2 |
| Detection Segment 8 | Group 1 | Methylnicotinamide_pos | 17.3 |
| | Group 1 | Glucosamine_pos | 17.3 |
| | Group 1 | D-Glucosamine 6-phosphate | 17.4 |
| | Group 1 | Fumarate | 17.4 |
| | Group 1 | Phenylpyruvate | 17.4 |
| | Group 1 | a-Ketoglutarate | 17.6 |
| | Group 1 | S-methyl-5-thioadenosine_pos | 17.6 |
| | Group 1 | Orotate | 17.8 |
| | Group 1 | GlcNAc-1P | 17.9 |
| | Group 1 | alpha-D(+)Mannose 1-phosphate | 17.9 |
| | Group 1 | 3-Indoleacetic acid | 17.9 |
| | Group 1 | Isopentenyl pyrophosphate | 17.9 |
| | Group 1 | Adenosine-C13 | 18.0 |
| | Group 2 | Flavone_pos | 18.0 |
| Detection Segment 9 | Group 1 | Acetoacetyl-CoA_pos | 18.1 |
| | Group 1 | Deoxyguanosine_pos | 18.3 |
| | Group 1 | trans, trans-Farnesyl diphosphate | 18.3 |
| | Group 1 | L-Tryptophan_pos | 18.4 |
| | Group 1 | Cytosine_pos | 18.5 |
| | Group 1 | 4-Hydroxybenzoic acid | 18.5 |
| | Group 1 | L-Hydroxyglutaric acid | 18.5 |
| | Group 1 | Adenine_pos | 18.6 |
| | Group 2 | ATP | 18.6 |

TABLE 4-continued

Detection Schedule after implementing the BF-Quant strategy

| | Biomarker Group | Metabolomics Biomarker Name | Retention Time (min) |
|---|---|---|---|
| Detection Segment 10 | Group 1 | D-Gluconic acid | 18.6 |
| | Group 1 | Taurine | 18.8 |
| | Group 1 | D-Ribulose 1,5-biphosphate | 18.9 |
| | Group 1 | Vanillic acid | 18.9 |
| | Group 1 | L-Glutathione__pos | 19.0 |
| | Group 1 | 3-Hydroxybenzoic acid | 19.0 |
| | Group 1 | o-Phospho-L-Serine__pos | 19.0 |
| | Group 1 | Kynurenic acid | 19.1 |
| | Group 2 | L-Leucine | 19.1 |
| Detection Segment 11 | Group 1 | Deoxycholic acid | 19.1 |
| | Group 1 | 4-Hydroxy-L-glutamic acid | 19.2 |
| | Group 1 | Xylitol | 19.2 |
| | Group 1 | Citramalic acid | 19.3 |
| | Group 1 | N-acetyl-L-ornithine__pos | 19.3 |
| | Group 1 | 7-Methylguanosine__pos | 19.4 |
| | Group 1 | L-Histidinol__pos | 19.5 |
| | Group 1 | Lipoate | 19.5 |
| | Group 1 | D-erythro-Dihydrosphingosine | 19.5 |
| | Group 1 | Ketoisovaleric acid | 19.7 |
| | Group 1 | Indole__pos | 19.7 |
| | Group 1 | Mevalonic acid 5-phosphate | 19.8 |
| | Group 2 | dCDP | 19.9 |
| Detection Segment 12 | Group 1 | D-+-Galactosamine | 19.9 |
| | Group 1 | D-pantothenic acid | 20.0 |
| | Group 1 | L-Methionine__pos | 20.0 |
| | Group 1 | gamma-Aminobutyric acid (GABA) | 20.1 |
| | Group 1 | dCMP | 20.2 |
| | Group 1 | 2-Phosphoglyceric acid | 20.3 |
| | Group 1 | Acetylcarnitine__pos | 20.3 |
| | Group 1 | L-Glutathione | 20.3 |
| | Group 1 | Pyruvate__PH | 20.4 |
| | Group 1 | 3-Methylphenylacetic acid | 20.5 |
| | Group 1 | 4-Hydroxyphenyl-pyruvic acid | 20.6 |
| | Group 1 | Xanthosine-5-phosphate__pos | 20.6 |
| | Group 1 | Atrolactic acid | 20.7 |
| | Group 1 | Phosphorylcholine | 20.7 |
| | Group 1 | D-Mannose | 20.7 |
| | Group 1 | Octulose-1,8-bisphosphate (OBP) | 20.8 |
| | Group 1 | IMP | 20.8 |
| | Group 2 | cAMP | 20.8 |
| Detection Segment 13 | Group 1 | myo-inositol | 20.9 |
| | Group 1 | Acetyl-CoA | 20.9 |
| | Group 1 | Adipic acid | 21.0 |
| | Group 1 | N-acetyl-glutamate | 21.2 |
| | Group 1 | 3-Hydroxyanthranilic acid | 21.2 |
| | Group 1 | Glycolate | 21.2 |
| | Group 1 | AICAR__pos | 21.2 |
| | Group 1 | L-Canavanine | 21.3 |
| | Group 1 | Thymine__pos | 21.3 |
| | Group 1 | cis-Aconitate | 21.4 |
| | Group 1 | Deoxyribose-phosphate | 21.6 |
| | Group 1 | NADPH__neg | 21.8 |
| | Group 1 | Betaine aldehyde__pos | 21.8 |
| | Group 1 | Urea__pos | 21.8 |
| | Group 1 | ±-Mevalonolactone | 21.9 |
| | Group 2 | S-adenosyl-L-homoCysteine | 21.9 |
| Detection Segment 14 | Group 1 | Indoleacrylic acid | 22.0 |
| | Group 1 | ADP-C13 | 22.1 |
| | Group 1 | 2-Deoxyribose 5-phosphate | 22.2 |
| | Group 1 | 3-2-Hydroxyethylindole | 22.3 |
| | Group 1 | Oxamic acid | 22.3 |
| | Group 1 | Arabinose-5-phosphate | 22.3 |
| | Group 1 | Galactonic acid | 22.4 |
| | Group 1 | 3-S-methylthiopropionate | 22.4 |
| | Group 1 | Succinate | 22.4 |
| | Group 1 | Pyrophosphate | 22.5 |
| | Group 1 | Phenyllactic acid | 22.5 |
| | Group 1 | L-Tyrosine__pos | 22.7 |
| | Group 2 | cGMP | 22.8 |
| Detection Segment 15 | Group 1 | Creatine__pos | 22.8 |
| | Group 1 | Acadesine__pos | 22.9 |
| | Group 1 | Acetoacetate | 22.9 |
| | Group 1 | Putrescine__pos | 23.0 |
| | Group 1 | Pyruvate | 23.0 |
| | Group 1 | 1-Methyladenosine__pos | 23.1 |

TABLE 4-continued

Detection Schedule after implementing the BF-Quant strategy

| Biomarker Group | Metabolomics Biomarker Name | Retention Time (min) |
|---|---|---|
| Group 1 | dGMP | 23.2 |
| Group 1 | Deoxyguanosine | 23.3 |
| Group 1 | 2-oxo-4-methylthiobutanoate | 23.3 |
| Group 1 | L-Proline | 23.4 |
| Group 1 | Fructose-1,6-bisphosphate | 23.4 |
| Group 1 | sn-Glycerol-3-phosphate | 23.5 |

Step 3. A body fluid metabolomics biomarker detection and quantification platform is therefore established through the BF-Quant. Detailed schedule of the detection of each biomarker is shown in Table 4. The transitions (the actual detection parameters to be implemented by the instrument) of each target (Table 3) can be compiled and load to instrument according to their detection schedules outlined in Table 4.

Example 3. Detecting and Quantifying a Large Number of Lipidomics Biomarkers

There are about 200 to 300 lipids that are routinely detected and quantified in clinical settings. However, this only represent a very small portion of the overall lipidome pool that are present in human body fluid systems. BF-Quant could be used to detect a large number or essentially un-limited number of lipids. To build a high-throughput detection method for lipidomics biomarkers we conducted the following three steps:

Step 1. Through the analysis of body fluid sample, we identified the following two groups of lipids where group 1 are lipidomics biomarkers that are of clinical interest, and group 2 are lipid dividers with excellent detectability observed from the mass spectrometry analysis. The list of biomarkers could be from our own detection or from literatures or from databases. In the following table, for each lipidomics biomarker, its specific detection time was validated and indicated on the table. The validated detection time for each lipid can be observed from literature and can be obtained by analyzing each metabolite through the same gradient of organic solvents individually. The key is to establish the relationship in retention times for all the analytes, including the targets of interest (i.e. lipidomics biomarkers representing disease statuses) and the dividers (i.e., highly stable and highly detectable lipidomics biomarkers in Group 2 in Table 5).

TABLE 5

Target lipidomics biomarkers to be detected in a method.

| Group ID | Lipid Name | Precursor (M/z) | Product (M/z) | Collision Energy (eV) | Retention Time | IonMode |
|---|---|---|---|---|---|---|
| Group 1 | DAG 12:0-12:0 | 474.4 | 257.2 | 16.1 | 21.1 | Positive |
| Group 1 | DAG 12:0-14:0 | 502.4 | 257.2 | 19.4 | 21.8 | Positive |
| Group 1 | DAG 12:0-14:0 | 502.4 | 285.3 | 10.3 | 27.0 | Positive |
| Group 1 | DAG 12:0-14:1 | 500.4 | 257.2 | 0.9 | 19.7 | Positive |
| Group 1 | DAG 12:0-14:1 | 500.4 | 283.3 | 7.2 | 23.8 | Positive |
| Group 1 | DAG 12:0-16:0 | 530.5 | 257.2 | 1.0 | 19.8 | Positive |
| Group 1 | DAG 12:0-16:0 | 530.5 | 313.3 | 3.2 | 24.8 | Positive |
| Group 1 | DAG 12:0-16:1 | 528.5 | 257.2 | 5.7 | 22.6 | Positive |
| Group 1 | DAG 12:0-16:1 | 528.5 | 311.3 | 7.6 | 20.8 | Positive |
| Group 1 | DAG 12:0-18:0 | 558.5 | 257.2 | 17.7 | 23.9 | Positive |
| Group 1 | DAG 12:0-18:0 | 558.5 | 341.3 | 3.8 | 27.4 | Positive |
| Group 1 | DAG 12:0-18:1 | 556.5 | 257.2 | 19.5 | 24.9 | Positive |
| Group 1 | DAG 12:0-18:1 | 556.5 | 339.3 | 13.1 | 24.6 | Positive |
| Group 1 | DAG 12:0-18:2 | 554.5 | 257.2 | 2.8 | 21.9 | Positive |
| Group 1 | DAG 12:0-18:2 | 554.5 | 337.3 | 11.3 | 25.9 | Positive |
| Group 1 | DAG 12:0-18:3 | 552.5 | 257.2 | 13.0 | 22.7 | Positive |
| Group 1 | DAG 12:0-18:3 | 552.5 | 335.3 | 16.7 | 19.5 | Positive |
| Group 1 | DAG 12:0-18:4 | 550.4 | 257.2 | 5.4 | 21.2 | Positive |
| Group 1 | DAG 12:0-18:4 | 550.4 | 333.3 | 0.1 | 25.2 | Positive |
| Group 1 | DAG 12:0-20:0 | 586.5 | 257.2 | 8.1 | 21.9 | Positive |
| Group 1 | DAG 12:0-20:0 | 586.5 | 369.4 | 5.9 | 20.6 | Positive |
| Group 1 | DAG 12:0-20:1 | 584.5 | 257.2 | 13.9 | 20.3 | Positive |
| Group 1 | DAG 12:0-20:1 | 584.5 | 367.3 | 4.3 | 26.8 | Positive |
| Group 1 | DAG 12:0-20:2 | 582.5 | 257.2 | 8.3 | 20.3 | Positive |
| Group 1 | DAG 12:0-20:2 | 582.5 | 365.3 | 3.5 | 22.7 | Positive |
| Group 1 | DAG 12:0-20:3 | 580.5 | 257.2 | 14.6 | 20.2 | Positive |
| Group 1 | DAG 12:0-20:3 | 580.5 | 363.3 | 7.2 | 22.7 | Positive |
| Group 1 | DAG 12:0-20:4 | 578.5 | 257.2 | 13.3 | 21.4 | Positive |
| Group 1 | DAG 12:0-20:4 | 578.5 | 361.3 | 16.6 | 22.2 | Positive |
| Group 1 | DAG 12:0-20:5 | 576.5 | 257.2 | 0.4 | 28.1 | Positive |
| Group 2 | DAG 12:0-20:5 | 576.5 | 359.3 | 9.4 | 25.0 | Positive |
| Group 1 | DAG 12:0-22:0 | 614.6 | 257.2 | 10.6 | 28.9 | Positive |
| Group 1 | DAG 12:0-22:4 | 606.5 | 389.3 | 8.4 | 25.1 | Positive |
| Group 1 | DAG 12:0-22:5 | 604.5 | 257.2 | 1.1 | 28.4 | Positive |

TABLE 5-continued

Target lipidomics biomarkers to be detected in a method.

| Group ID | Lipid Name | Precursor (M/z) | Product (M/z) | Collision Energy (eV) | Retention Time | IonMode |
|---|---|---|---|---|---|---|
| Group 1 | DAG 12:0-22:5 | 604.5 | 387.3 | 13.4 | 24.9 | Positive |
| Group 1 | DAG 12:0-22:6 | 602.5 | 257.2 | 12.4 | 25.6 | Positive |
| Group 1 | DAG 12:0-22:6 | 602.5 | 385.3 | 10.9 | 22.6 | Positive |
| Group 1 | DAG 14:0-14:0 | 530.5 | 285.3 | 14.6 | 28.0 | Positive |
| Group 1 | DAG 14:0-14:1 | 528.5 | 283.3 | 12.2 | 27.5 | Positive |
| Group 1 | DAG 14:0-14:1 | 528.5 | 285.3 | 19.4 | 21.8 | Positive |
| Group 1 | DAG 14:0-16:0 | 558.5 | 285.3 | 15.8 | 20.9 | Positive |
| Group 1 | DAG 14:0-16:0 | 558.5 | 313.3 | 4.7 | 27.2 | Positive |
| Group 1 | DAG 14:0-16:1 | 556.5 | 285.3 | 14.2 | 28.6 | Positive |
| Group 1 | DAG 14:0-16:1 | 556.5 | 311.3 | 18.3 | 25.1 | Positive |
| Group 1 | DAG 14:0-18:0 | 586.5 | 285.3 | 16.5 | 22.9 | Positive |
| Group 1 | DAG 14:0-18:0 | 586.5 | 341.3 | 4.8 | 24.9 | Positive |
| Group 1 | DAG 14:0-18:1 | 584.5 | 285.3 | 11.0 | 23.3 | Positive |
| Group 1 | DAG 14:0-18:1 | 584.5 | 339.3 | 6.3 | 22.7 | Positive |
| Group 1 | DAG 14:0-18:2 | 582.5 | 285.3 | 15.3 | 29.5 | Positive |
| Group 1 | DAG 14:0-18:2 | 582.5 | 337.3 | 2.8 | 21.9 | Positive |
| Group 1 | DAG 14:0-18:3 | 580.5 | 285.3 | 9.3 | 24.2 | Positive |
| Group 1 | DAG 14:0-18:3 | 580.5 | 335.3 | 8.8 | 24.3 | Positive |
| Group 1 | DAG 14:0-18:4 | 578.5 | 285.3 | 5.0 | 27.5 | Positive |
| Group 1 | DAG 14:0-18:4 | 578.5 | 333.3 | 0.4 | 27.6 | Positive |
| Group 1 | DAG 14:0-20:0 | 614.6 | 285.3 | 8.6 | 28.9 | Positive |
| Group 1 | DAG 14:0-20:0 | 614.6 | 369.4 | 7.6 | 27.5 | Positive |
| Group 1 | DAG 14:0-20:1 | 612.6 | 285.3 | 1.5 | 19.9 | Positive |
| Group 1 | DAG 14:0-20:1 | 612.6 | 367.3 | 7.0 | 26.9 | Positive |
| Group 1 | DAG 14:0-20:2 | 610.5 | 285.3 | 2.9 | 20.7 | Positive |
| Group 1 | DAG 14:0-20:2 | 610.5 | 365.3 | 3.1 | 19.8 | Positive |
| Group 1 | DAG 14:0-20:3 | 608.5 | 285.3 | 13.7 | 25.8 | Positive |
| Group 1 | DAG 14:0-20:3 | 608.5 | 363.3 | 19.3 | 27.2 | Positive |
| Group 1 | DAG 14:0-20:4 | 606.5 | 285.3 | 19.5 | 28.1 | Positive |
| Group 2 | DAG 14:0-20:4 | 606.5 | 361.3 | 6.6 | 28.4 | Positive |
| Group 1 | DAG 14:0-20:5 | 604.5 | 285.3 | 17.8 | 20.1 | Positive |
| Group 1 | DAG 14:0-20:5 | 604.5 | 359.3 | 13.7 | 24.8 | Positive |
| Group 1 | DAG 14:0-22:0 | 642.6 | 285.3 | 10.0 | 24.0 | Positive |
| Group 1 | DAG 14:0-22:0 | 642.6 | 397.4 | 13.5 | 28.9 | Positive |
| Group 1 | DAG 14:0-22:1 | 640.6 | 285.3 | 0.9 | 22.3 | Positive |
| Group 1 | DAG 14:0-22:1 | 640.6 | 395.4 | 15.2 | 29.1 | Positive |
| Group 1 | DAG 14:0-22:2 | 638.6 | 285.3 | 6.5 | 26.4 | Positive |
| Group 1 | DAG 14:0-22:2 | 638.6 | 393.4 | 2.1 | 28.7 | Positive |
| Group 1 | DAG 14:0-22:3 | 636.6 | 285.3 | 5.5 | 20.5 | Positive |
| Group 1 | DAG 14:0-22:3 | 636.6 | 391.3 | 6.8 | 25.1 | Positive |
| Group 1 | DAG 14:0-22:4 | 634.5 | 285.3 | 17.2 | 21.5 | Positive |
| Group 1 | DAG 14:0-22:4 | 634.5 | 389.3 | 13.5 | 22.4 | Positive |
| Group 1 | DAG 14:0-22:5 | 632.5 | 285.3 | 18.4 | 29.1 | Positive |
| Group 1 | DAG 14:0-22:5 | 632.5 | 387.3 | 12.6 | 24.3 | Positive |
| Group 2 | DAG 14:0-22:6 | 630.5 | 285.3 | 15.7 | 22.2 | Positive |
| Group 1 | DAG 14:0-22:6 | 630.5 | 385.3 | 12.3 | 28.8 | Positive |
| Group 1 | DAG 14:1-14:1 | 526.4 | 283.3 | 11.6 | 26.2 | Positive |
| Group 1 | DAG 14:1-16:0 | 556.5 | 283.3 | 19.5 | 27.5 | Positive |
| Group 1 | DAG 14:1-16:0 | 556.5 | 313.3 | 12.0 | 25.9 | Positive |
| Group 1 | DAG 14:1-16:1 | 554.5 | 283.3 | 14.8 | 19.9 | Positive |
| Group 1 | DAG 14:1-16:1 | 554.5 | 311.3 | 12.8 | 20.3 | Positive |
| Group 1 | DAG 14:1-18:0 | 584.5 | 283.3 | 7.3 | 27.9 | Positive |
| Group 1 | DAG 14:1-18:0 | 584.5 | 341.3 | 19.2 | 27.3 | Positive |
| Group 1 | DAG 14:1-18:1 | 582.5 | 283.3 | 9.8 | 24.9 | Positive |
| Group 1 | DAG 14:1-18:1 | 582.5 | 339.3 | 9.2 | 21.2 | Positive |
| Group 1 | DAG 14:1-18:2 | 580.5 | 283.3 | 19.9 | 20.8 | Positive |
| Group 1 | DAG 14:1-18:2 | 580.5 | 337.3 | 2.3 | 29.2 | Positive |
| Group 1 | DAG 14:1-18:3 | 578.5 | 283.3 | 6.7 | 24.6 | Positive |
| Group 1 | DAG 14:1-18:3 | 578.5 | 335.3 | 13.8 | 25.3 | Positive |
| Group 1 | DAG 14:1-18:4 | 576.5 | 283.3 | 8.6 | 21.9 | Positive |
| Group 2 | PA 20:3-22:3 | 775.5 | 333.2 | 3.5 | 44.0 | Negative |
| Group 1 | DAG 14:1-18:4 | 576.5 | 333.3 | 6.7 | 27.6 | Positive |
| Group 1 | DAG 14:1-20:0 | 612.6 | 283.3 | 16.9 | 24.4 | Positive |
| Group 1 | PA 20:3-22:4 | 773.5 | 305.2 | 14.8 | 42.9 | Negative |
| Group 1 | DAG 14:1-20:0 | 612.6 | 369.4 | 16.1 | 26.4 | Positive |
| Group 1 | PA 20:3-22:4 | 773.5 | 331.2 | 37.0 | 40.9 | Negative |
| Group 1 | DAG 14:1-20:1 | 610.5 | 283.3 | 4.2 | 22.7 | Positive |
| Group 1 | PA 20:3-22:5 | 771.5 | 305.2 | 12.0 | 40.9 | Negative |
| Group 1 | DAG 14:1-20:1 | 610.5 | 367.3 | 13.9 | 25.8 | Positive |
| Group 1 | PA 20:3-22:5 | 771.5 | 329.2 | 5.8 | 40.3 | Negative |
| Group 1 | DAG 14:1-20:2 | 608.5 | 283.3 | 17.1 | 28.7 | Positive |
| Group 1 | PA 20:3-22:6 | 769.5 | 305.2 | 28.2 | 41.1 | Negative |
| Group 2 | DAG 14:1-20:2 | 608.5 | 365.3 | 6.7 | 23.3 | Positive |
| Group 1 | PA 20:3-22:6 | 769.5 | 327.2 | 11.4 | 44.9 | Negative |
| Group 2 | DAG 14:1-20:3 | 606.5 | 283.3 | 4.1 | 20.7 | Positive |

TABLE 5-continued

Target lipidomics biomarkers to be detected in a method.

| Group ID | Lipid Name | Precursor (M/z) | Product (M/z) | Collision Energy (eV) | Retention Time | IonMode |
|---|---|---|---|---|---|---|
| Group 1 | PA 20:4-20:4 | 743.5 | 303.2 | 8.6 | 37.4 | Negative |
| Group 1 | DAG 14:1-20:3 | 606.5 | 363.3 | 11.6 | 21.4 | Positive |
| Group 1 | PA 20:4-20:5 | 741.5 | 301.2 | 8.1 | 39.0 | Negative |
| Group 1 | DAG 14:1-20:4 | 604.5 | 283.3 | 13.3 | 23.4 | Positive |
| Group 1 | PA 20:4-20:5 | 741.5 | 303.2 | 16.5 | 37.1 | Negative |
| Group 1 | DAG 14:1-20:4 | 604.5 | 361.3 | 3.1 | 28.5 | Positive |
| Group 1 | PA 20:4-22:0 | 779.6 | 303.2 | 3.9 | 43.9 | Negative |
| Group 1 | DAG 14:1-20:5 | 602.5 | 283.3 | 13.9 | 22.3 | Positive |
| Group 1 | PA 20:4-22:0 | 779.6 | 339.2 | 19.3 | 36.5 | Negative |
| Group 1 | DAG 14:1-20:5 | 602.5 | 359.3 | 16.4 | 27.8 | Positive |
| Group 1 | PA 20:4-22:1 | 777.5 | 303.2 | 23.1 | 37.9 | Negative |
| Group 1 | DAG 14:1-22:0 | 640.6 | 283.3 | 14.1 | 27.0 | Positive |
| Group 1 | PA 20:4-22:1 | 777.5 | 337.2 | 2.1 | 38.3 | Negative |
| Group 1 | DAG 14:1-22:0 | 640.6 | 397.4 | 0.7 | 19.9 | Positive |
| Group 1 | PA 20:4-22:2 | 775.5 | 303.2 | 7.1 | 43.1 | Negative |
| Group 2 | PA 20:4-22:2 | 775.5 | 335.2 | 29.9 | 36.8 | Negative |
| Group 1 | DAG 14:1-22:1 | 638.6 | 283.3 | 17.8 | 19.8 | Positive |
| Group 1 | DAG 14:1-22:1 | 638.6 | 395.4 | 18.7 | 19.8 | Positive |
| Group 1 | PA 20:4-22:3 | 773.5 | 303.2 | 24.6 | 42.8 | Negative |
| Group 1 | DAG 14:1-22:2 | 636.6 | 283.3 | 8.6 | 27.5 | Positive |
| Group 1 | PA 20:4-22:3 | 773.5 | 333.2 | 26.9 | 37.7 | Negative |
| Group 1 | DAG 14:1-22:2 | 636.6 | 393.4 | 12.7 | 28.1 | Positive |
| Group 1 | PA 20:4-22:4 | 771.5 | 303.2 | 33.0 | 36.4 | Negative |
| Group 1 | DAG 14:1-22:3 | 634.5 | 283.3 | 4.9 | 20.2 | Positive |
| Group 1 | PA 20:4-22:4 | 771.5 | 331.2 | 29.5 | 43.4 | Negative |
| Group 2 | DAG 14:1-22:3 | 634.5 | 391.3 | 1.5 | 27.1 | Positive |
| Group 1 | PA 20:4-22:5 | 769.5 | 303.2 | 4.6 | 45.7 | Negative |
| Group 1 | DAG 14:1-22:4 | 632.5 | 283.3 | 15.9 | 24.6 | Positive |
| Group 1 | PA 20:4-22:5 | 769.5 | 329.2 | 17.8 | 44.6 | Negative |
| Group 1 | DAG 14:1-22:4 | 632.5 | 389.3 | 13.7 | 25.0 | Positive |
| Group 1 | PA 20:4-22:6 | 767.5 | 303.2 | 16.0 | 45.7 | Negative |
| Group 1 | DAG 14:1-22:5 | 630.5 | 283.3 | 7.7 | 25.3 | Positive |
| Group 1 | PA 20:4-22:6 | 767.5 | 327.2 | 32.7 | 41.8 | Negative |
| Group 1 | DAG 14:1-22:5 | 630.5 | 387.3 | 0.8 | 23.2 | Positive |
| Group 1 | PA 20:5-20:5 | 739.4 | 301.2 | 2.7 | 44.2 | Negative |
| Group 2 | PA 20:5-22:0 | 777.5 | 301.2 | 35.6 | 41.1 | Negative |
| Group 1 | DAG 14:1-22:6 | 628.5 | 283.3 | 3.0 | 20.9 | Positive |
| Group 1 | DAG 14:1-22:6 | 628.5 | 385.3 | 14.2 | 26.2 | Positive |
| Group 1 | PA 20:5-22:0 | 777.5 | 339.2 | 26.2 | 39.2 | Negative |
| Group 1 | DAG 16:0-16:0 | 586.5 | 313.3 | 18.8 | 22.2 | Positive |
| Group 1 | PA 20:5-22:1 | 775.5 | 301.2 | 33.6 | 39.0 | Negative |
| Group 1 | DAG 16:0-16:1 | 584.5 | 311.3 | 1.3 | 28.5 | Positive |
| Group 1 | PA 20:5-22:1 | 775.5 | 337.2 | 36.5 | 45.5 | Negative |
| Group 1 | DAG 16:0-16:1 | 584.5 | 313.3 | 9.2 | 19.9 | Positive |
| Group 1 | PA 20:5-22:2 | 773.5 | 301.2 | 28.5 | 44.6 | Negative |
| Group 1 | DAG 16:0-18:0 | 614.6 | 313.3 | 19.9 | 23.2 | Positive |
| Group 1 | PA 20:5-22:2 | 773.5 | 335.2 | 35.7 | 42.3 | Negative |
| Group 1 | DAG 16:0-18:0 | 614.6 | 341.3 | 6.7 | 19.6 | Positive |
| Group 1 | PA 20:5-22:3 | 771.5 | 301.2 | 12.8 | 43.9 | Negative |
| Group 1 | DAG 16:0-18:1 | 612.6 | 313.3 | 16.8 | 23.0 | Positive |
| Group 1 | PA 20:5-22:3 | 771.5 | 333.2 | 14.1 | 45.1 | Negative |
| Group 1 | DAG 16:0-18:1 | 612.6 | 339.3 | 9.8 | 21.7 | Positive |
| Group 1 | PA 20:5-22:4 | 769.5 | 301.2 | 1.2 | 44.5 | Negative |
| Group 1 | DAG 16:0-18:2 | 610.5 | 313.3 | 15.2 | 26.5 | Positive |
| Group 1 | PA 20:5-22:4 | 769.5 | 331.2 | 28.9 | 42.0 | Negative |
| Group 1 | DAG 16:0-18:2 | 610.5 | 337.3 | 9.9 | 24.8 | Positive |
| Group 1 | DAG 16:0-18:3 | 608.5 | 313.3 | 7.6 | 21.5 | Positive |
| Group 1 | DAG 16:0-18:3 | 608.5 | 335.3 | 10.9 | 22.7 | Positive |
| Group 1 | DAG 16:0-18:4 | 606.5 | 313.3 | 7.7 | 24.2 | Positive |
| Group 1 | DAG 16:0-18:4 | 606.5 | 333.3 | 18.2 | 28.1 | Positive |
| Group 1 | PA 12:0-12:0 | 535.3 | 199.3 | 25.3 | 36.6 | Negative |
| Group 1 | PA 12:0-14:0 | 563.4 | 199.3 | 25.0 | 39.8 | Negative |
| Group 1 | PA 12:0-14:0 | 563.4 | 227.3 | 15.8 | 37.2 | Negative |
| Group 1 | PA 12:0-14:1 | 561.4 | 199.3 | 14.3 | 44.5 | Negative |
| Group 1 | PA 12:0-14:1 | 561.4 | 225.3 | 16.3 | 36.5 | Negative |
| Group 1 | PA 12:0-16:0 | 591.4 | 199.3 | 39.1 | 45.3 | Negative |
| Group 1 | PA 12:0-16:0 | 591.4 | 255.3 | 19.6 | 43.6 | Negative |
| Group 1 | PA 12:0-16:1 | 589.4 | 199.3 | 39.7 | 44.2 | Negative |
| Group 1 | PA 12:0-16:1 | 589.4 | 253.3 | 30.2 | 36.5 | Negative |
| Group 1 | PA 12:0-18:0 | 619.4 | 199.3 | 2.4 | 45.8 | Negative |
| Group 1 | PA 12:0-18:0 | 619.4 | 283.3 | 26.4 | 44.9 | Negative |
| Group 1 | PA 12:0-18:1 | 617.4 | 199.3 | 13.5 | 42.8 | Negative |
| Group 1 | PA 12:0-18:1 | 617.4 | 281.3 | 32.5 | 41.9 | Negative |
| Group 1 | PA 12:0-18:2 | 615.4 | 199.3 | 18.5 | 40.7 | Negative |
| Group 1 | PA 12:0-18:2 | 615.4 | 279.3 | 16.2 | 39.4 | Negative |

TABLE 5-continued

Target lipidomics biomarkers to be detected in a method.

| Group ID | Lipid Name | Precursor (M/z) | Product (M/z) | Collision Energy (eV) | Retention Time | IonMode |
|---|---|---|---|---|---|---|
| Group 1 | PA 12:0-18:3 | 613.4 | 199.3 | 28.5 | 36.9 | Negative |
| Group 1 | PA 12:0-18:3 | 613.4 | 277.3 | 14.9 | 43.5 | Negative |
| Group 1 | PA 12:0-18:4 | 611.4 | 199.3 | 19.0 | 43.7 | Negative |
| Group 1 | PA 12:0-18:4 | 611.4 | 275.3 | 18.4 | 39.4 | Negative |
| Group 1 | PA 12:0-20:0 | 647.5 | 199.3 | 27.2 | 44.7 | Negative |
| Group 1 | PA 12:0-20:0 | 647.5 | 311.2 | 37.1 | 38.7 | Negative |
| Group 1 | PA 12:0-20:1 | 645.5 | 199.3 | 13.3 | 42.7 | Negative |
| Group 1 | PA 12:0-20:1 | 645.5 | 309.2 | 32.7 | 45.7 | Negative |
| Group 1 | PA 12:0-20:2 | 643.4 | 199.3 | 6.7 | 44.5 | Negative |
| Group 1 | PA 12:0-20:2 | 643.4 | 307.2 | 35.8 | 40.4 | Negative |
| Group 1 | PA 12:0-20:3 | 641.4 | 199.3 | 8.8 | 45.1 | Negative |
| Group 1 | PA 12:0-20:3 | 641.4 | 305.2 | 18.5 | 45.8 | Negative |
| Group 1 | PA 12:0-20:4 | 639.4 | 199.3 | 34.5 | 44.9 | Negative |
| Group 1 | PA 12:0-20:4 | 639.4 | 303.2 | 29.1 | 44.8 | Negative |
| Group 1 | PA 12:0-20:5 | 637.4 | 199.3 | 29.6 | 40.0 | Negative |

Step 2. According to the retention time of each divider in group 2, and the retention time of each target molecule in group 1, we substantially separate the detection of the targets from group 1 into a certain number of detection segments which are divided/separated by the lipid biomarker dividers from group 2, and create the table (Table 6) below. The actual detection time for each molecule of interest and for each divider is used to establish the detection schedule table (Table 6). The actual detection time may change with a different HPLC or running a different gradient HPLC method, but the relationship (the relative positions of the analytes) represented on the table is stable which has been proven by repeated assays under different HPLC methods.

TABLE 6

Detection schedule after implementing the BF-Quant strategy.

| | Group ID | Lipid Name | IonMode |
|---|---|---|---|
| Detection Segment 1 | Group 1 | DAG 12:0-18:3 | Positive |
| | Group 1 | DAG 16:0-18:0 | Positive |
| | Group 1 | DAG 12:0-14:1 | Positive |
| | Group 1 | DAG 14:1-22:1 | Positive |
| | Group 1 | DAG 12:0-16:0 | Positive |
| | Group 1 | DAG 14:0-20:2 | Positive |
| | Group 1 | DAG 14:1-22:1 | Positive |
| | Group 1 | DAG 14:1-16:1 | Positive |
| | Group 1 | DAG 16:0-16:1 | Positive |
| | Group 1 | DAG 14:1-22:0 | Positive |
| | Group 1 | DAG 14:0-20:1 | Positive |
| | Group 1 | DAG 14:0-20:5 | Positive |
| | Group 1 | DAG 14:1-22:3 | Positive |
| | Group 1 | DAG 12:0-20:3 | Positive |
| | Group 1 | DAG 14:1-16:1 | Positive |
| | Group 1 | DAG 12:0-20:1 | Positive |
| | Group 1 | DAG 12:0-20:2 | Positive |
| | Group 1 | DAG 14:0-22:3 | Positive |
| | Group 1 | DAG 12:0-20:0 | Positive |
| | Group 1 | DAG 14:0-20:2 | Positive |
| | Group 2 | DAG 14:1-20:3 | Positive |
| Detection Segment 2 | Group 1 | DAG 12:0-16:1 | Positive |
| | Group 1 | DAG 14:1-18:2 | Positive |
| | Group 1 | DAG 14:1-22:6 | Positive |
| | Group 1 | DAG 14:0-16:0 | Positive |
| | Group 1 | DAG 12:0-12:0 | Positive |
| | Group 1 | DAG 12:0-18:4 | Positive |
| | Group 1 | DAG 14:1-18:1 | Positive |
| | Group 1 | DAG 12:0-20:4 | Positive |
| | Group 1 | DAG 14:1-20:3 | Positive |
| | Group 1 | DAG 16:0-18:3 | Positive |
| | Group 1 | DAG 14:0-22:4 | Positive |
| | Group 1 | DAG 16:0-18:1 | Positive |

TABLE 6-continued

Detection schedule after implementing the BF-Quant strategy.

| | Group ID | Lipid Name | IonMode |
|---|---|---|---|
| | Group 1 | DAG 12:0-14:0 | Positive |
| | Group 1 | DAG 14:0-14:1 | Positive |
| | Group 1 | DAG 12:0-20:0 | Positive |
| | Group 1 | DAG 14:0-18:2 | Positive |
| | Group 1 | DAG 14:1-18:4 | Positive |
| | Group 1 | DAG 12:0-18:2 | Positive |
| | Group 2 | DAG 14:0-22:6 | Positive |
| Detection Segment 3 | Group 1 | DAG 16:0-16:0 | Positive |
| | Group 1 | DAG 12:0-20:4 | Positive |
| | Group 1 | DAG 14:1-20:5 | Positive |
| | Group 1 | DAG 14:0-22:1 | Positive |
| | Group 1 | DAG 14:0-22:4 | Positive |
| | Group 1 | DAG 12:0-16:1 | Positive |
| | Group 1 | DAG 12:0-22:6 | Positive |
| | Group 1 | DAG 16:0-18:3 | Positive |
| | Group 1 | DAG 12:0-20:2 | Positive |
| | Group 1 | DAG 14:1-20:1 | Positive |
| | Group 1 | DAG 12:0-20:3 | Positive |
| | Group 1 | DAG 14:0-18:1 | Positive |
| | Group 1 | DAG 12:0-18:3 | Positive |
| | Group 1 | DAG 14:0-18:0 | Positive |
| | Group 1 | DAG 16:0-18:1 | Positive |
| | Group 1 | DAG 16:0-18:0 | Positive |
| | Group 1 | DAG 14:1-22:5 | Positive |
| | Group 2 | DAG 14:1-20:2 | Positive |
| Detection Segment 4 | Group 1 | DAG 14:0-18:1 | Positive |
| | Group 1 | DAG 14:1-20:4 | Positive |
| | Group 1 | DAG 12:0-14:1 | Positive |
| | Group 1 | DAG 12:0-18:0 | Positive |
| | Group 1 | DAG 14:0-22:0 | Positive |
| | Group 1 | DAG 16:0-18:4 | Positive |
| | Group 1 | DAG 14:0-18:3 | Positive |
| | Group 1 | DAG 14:0-22:5 | Positive |
| | Group 1 | DAG 14:0-18:3 | Positive |
| | Group 1 | DAG 14:1-20:0 | Positive |
| | Group 1 | DAG 14:1-18:3 | Positive |
| | Group 1 | DAG 14:1-22:4 | Positive |
| | Group 1 | DAG 12:0-18:1 | Positive |
| | Group 1 | DAG 14:0-20:5 | Positive |
| | Group 1 | DAG 16:0-18:2 | Positive |
| | Group 1 | DAG 12:0-16:0 | Positive |
| | Group 1 | DAG 14:1-18:1 | Positive |
| | Group 1 | DAG 14:0-18:0 | Positive |
| | Group 1 | DAG 12:0-22:5 | Positive |
| | Group 1 | DAG 12:0-18:1 | Positive |
| | Group 1 | DAG 14:1-22:4 | Positive |
| | Group 2 | DAG 12:0-20:5 | Positive |
| Detection Segment 5 | Group 1 | DAG 14:0-16:1 | Positive |
| | Group 1 | DAG 12:0-22:4 | Positive |
| | Group 1 | DAG 14:0-22:3 | Positive |

TABLE 6-continued

Detection schedule after implementing the BF-Quant strategy.

| | Group ID | Lipid Name | IonMode |
|---|---|---|---|
| | Group 1 | DAG 12:0-18:4 | Positive |
| | Group 1 | DAG 14:1-18:3 | Positive |
| | Group 1 | DAG 14:1-22:5 | Positive |
| | Group 1 | DAG 12:0-22:6 | Positive |
| | Group 1 | DAG 14:0-20:3 | Positive |
| | Group 1 | DAG 14:1-20:1 | Positive |
| | Group 1 | DAG 14:1-16:0 | Positive |
| | Group 1 | DAG 12:0-18:2 | Positive |
| | Group 1 | DAG 14:1-22:6 | Positive |
| | Group 1 | DAG 14:1-14:1 | Positive |
| | Group 1 | DAG 14:1-20:0 | Positive |
| | Group 1 | DAG 14:0-22:2 | Positive |
| | Group 1 | DAG 16:0-18:2 | Positive |
| | Group 1 | DAG 12:0-20:1 | Positive |
| | Group 1 | DAG 14:0-20:1 | Positive |
| | Group 1 | DAG 12:0-14:0 | Positive |
| | Group 1 | DAG 14:1-22:0 | Positive |
| | Group 2 | DAG 14:1-22:3 | Positive |
| Detection Segment 6 | Group 1 | DAG 14:0-16:0 | Positive |
| | Group 1 | DAG 14:0-20:3 | Positive |
| | Group 1 | DAG 14:1-18:0 | Positive |
| | Group 1 | DAG 12:0-18:0 | Positive |
| | Group 1 | DAG 14:0-14:1 | Positive |
| | Group 1 | DAG 14:1-16:0 | Positive |
| | Group 1 | DAG 14:0-18:4 | Positive |
| | Group 1 | DAG 14:0-20:0 | Positive |
| | Group 1 | DAG 14:1-22:2 | Positive |
| | Group 1 | DAG 14:0-18:4 | Positive |
| | Group 1 | DAG 14:1-18:4 | Positive |
| | Group 1 | DAG 14:1-20:5 | Positive |
| | Group 1 | DAG 14:1-18:0 | Positive |
| | Group 1 | DAG 14:0-14:0 | Positive |
| | Group 1 | DAG 14:1-22:2 | Positive |
| | Group 1 | DAG 14:0-20:4 | Positive |
| | Group 1 | DAG 16:0-18:4 | Positive |
| | Group 1 | DAG 12:0-20:5 | Positive |
| | Group 2 | DAG 14:0-20:4 | Positive |
| Detection Segment 7 | Group 1 | DAG 12:0-22:5 | Positive |
| | Group 1 | DAG 16:0-16:1 | Positive |
| | Group 1 | DAG 14:1-20:4 | Positive |
| | Group 1 | DAG 14:0-16:1 | Positive |
| | Group 1 | DAG 14:0-22:2 | Positive |
| | Group 1 | DAG 14:1-20:2 | Positive |
| | Group 1 | DAG 14:0-22:6 | Positive |
| | Group 1 | DAG 14:0-22:0 | Positive |
| | Group 1 | DAG 14:0-20:0 | Positive |
| | Group 1 | DAG 12:0-22:0 | Positive |
| | Group 1 | DAG 14:0-22:1 | Positive |
| | Group 1 | DAG 14:0-22:5 | Positive |
| | Group 1 | DAG 14:1-18:2 | Positive |
| | Group 1 | DAG 14:0-18:2 | Positive |
| | Group 1 | PA 20:4-22:4 | Negative |
| | Group 1 | PA 20:4-22:0 | Negative |
| | Group 1 | PA 12:0-16:1 | Negative |
| | Group 1 | PA 12:0-14:1 | Negative |
| | Group 1 | PA 12:0-12:0 | Negative |
| | Group 2 | PA 20:4-22:2 | Negative |
| Detection Segment 8 | Group 1 | PA 12:0-18:3 | Negative |
| | Group 1 | PA 20:4-20:5 | Negative |
| | Group 1 | PA 12:0-14:0 | Negative |
| | Group 1 | PA 20:4-20:4 | Negative |
| | Group 1 | PA 20:4-22:3 | Negative |
| | Group 1 | PA 20:4-22:1 | Negative |
| | Group 1 | PA 20:4-22:1 | Negative |
| | Group 1 | PA 12:0-20:0 | Negative |
| | Group 1 | PA 20:4-20:5 | Negative |
| | Group 1 | PA 20:5-22:1 | Negative |
| | Group 1 | PA 20:5-22:0 | Negative |
| | Group 1 | PA 12:0-18:4 | Negative |
| | Group 1 | PA 12:0-18:2 | Negative |
| | Group 1 | PA 12:0-14:0 | Negative |
| | Group 1 | PA 12:0-20:5 | Negative |
| | Group 1 | PA 20:3-22:5 | Negative |
| | Group 1 | PA 12:0-20:2 | Negative |
| | Group 1 | PA 12:0-18:2 | Negative |
| | Group 1 | PA 20:3-22:4 | Negative |
| | Group 1 | PA 20:3-22:5 | Negative |
| | Group 2 | PA 20:5-22:0 | Negative |
| Detection Segment 9 | Group 1 | PA 20:3-22:6 | Negative |
| | Group 1 | PA 20:4-22:6 | Negative |
| | Group 1 | PA 12:0-18:1 | Negative |
| | Group 1 | PA 20:5-22:4 | Negative |
| | Group 1 | PA 20:5-22:2 | Negative |
| | Group 1 | PA 12:0-20:1 | Negative |
| | Group 1 | PA 12:0-18:1 | Negative |
| | Group 1 | PA 20:4-22:3 | Negative |
| | Group 1 | PA 20:3-22:4 | Negative |
| | Group 1 | PA 20:4-22:2 | Negative |
| | Group 1 | PA 20:4-22:4 | Negative |
| | Group 1 | PA 12:0-18:3 | Negative |
| | Group 1 | PA 12:0-16:0 | Negative |
| | Group 1 | PA 12:0-18:4 | Negative |
| | Group 1 | PA 20:4-22:0 | Negative |
| | Group 1 | PA 20:5-22:3 | Negative |
| | Group 2 | PA 20:3-22:3 | Negative |
| Detection Segment 10 | Group 1 | PA 12:0-16:1 | Negative |
| | Group 1 | PA 20:5-20:5 | Negative |
| | Group 1 | PA 12:0-20:2 | Negative |
| | Group 1 | PA 20:5-22:4 | Negative |
| | Group 1 | PA 12:0-14:1 | Negative |
| | Group 1 | PA 20:4-22:5 | Negative |
| | Group 1 | PA 20:5-22:2 | Negative |
| | Group 1 | PA 12:0-20:0 | Negative |
| | Group 1 | PA 12:0-20:4 | Negative |
| | Group 1 | PA 20:3-22:6 | Negative |
| | Group 1 | PA 12:0-20:4 | Negative |
| | Group 1 | PA 12:0-18:0 | Negative |
| | Group 1 | PA 12:0-20:3 | Negative |
| | Group 1 | PA 20:5-22:3 | Negative |
| | Group 1 | PA 12:0-16:0 | Negative |
| | Group 1 | PA 20:5-22:1 | Negative |
| | Group 1 | PA 20:4-22:5 | Negative |
| | Group 1 | PA 12:0-20:1 | Negative |
| | Group 1 | PA 20:4-22:6 | Negative |
| | Group 1 | PA 12:0-18:0 | Negative |
| | Group 1 | PA 12:0-20:3 | Negative |

Step 3. A body fluid lipidomics biomarker detection and quantification platform is therefore-established through the BF-Quant. Detailed schedule of the detection of each biomarker is shown in Table 6. The transitions (the actual detection parameters to be implemented by the instrument) of each target (Table 5) can be compiled and load to instrument according to their detection schedules outlined in Table 6.

Example 4. Detecting and Quantifying a Large Number of Genomics Biomarkers

Next generation sequencing is the most frequently used method to identify genomic mutations of clinical interest. In addition, genomics mutations can also be detected through mass spectrometry. It usually requires a preamplification of the genomics regions that may contain variants that are of interest. However, mass spectrometry is limited in its throughput in the total number of nucleic acid sequences one method can analyze. BF-Quant of the present invention could be used to detect a large number or essentially un-limited number of nucleic acid variants. To build a high-throughput detection method for genomics biomarkers we conducted the following three steps:

Step 1. Through the analysis of body fluid sample, we identified the following two groups of nucleic acid sequences where group 1 are genomics biomarkers that are of clinical interest, and group 2 are genomics dividers with excellent detectability through excessive amplification and can be easily observed from the mass spectrometry analysis. These biomarkers represented the hotspot mutations of human cancers. They are frequently mutated across different types of human cancers. The dividers are chosen from the WT sequences of human genome database, therefore they are presented in most, if not all, human. The list of biomarkers could be from our own detection or from literatures or from databases. In the following table, for each genomic biomarker, its specific detection time was validated and indicated on the table. The validated detection time for each nucleic acid sequence can be observed from literature and can be obtained by analyzing each nucleic acid sequence through the same gradient of mobile phase individually. The key is to establish the relationship in retention times for all the analytes, including the target of interest (i.e. genomics biomarkers representing a disease status) and the dividers (i.e. highly stable and highly detectable genomics biomarkers in Group 2 in Table 7).

TABLE 7

Target genomics biomarkers to be detected in a method.

| Group ID | Genomic location of the target sequence | Collision Energy | Precursor (M/z) | Product (M/z) | Retention Time |
|---|---|---|---|---|---|
| Group 1 | chr17: 12069724-12069849 | 21.3 | 77281.04 | 10116 | 23.5 |
| Group 1 | chr20: 53185283-53185676 | 35.2 | 242894.32 | 17705 | 33.5 |
| Group 1 | chr3: 10149787-10154072 | 10.9 | 2647994.64 | 971705 | 54.0 |
| Group 1 | chr20: 32358344-32358832 | 22.5 | 301600.52 | 138723 | 35.2 |
| Group 1 | chr17: 49646116-49646641 | 69.1 | 324465.04 | 69313 | 35.6 |
| Group 1 | chrX: 53374149-53380186 | 20.2 | 3730660.56 | 1588362 | 57.2 |
| Group 1 | chrX: 53412900-53413138 | 8.1 | 147110.52 | 47235 | 28.7 |
| Group 1 | chr17: 7673207-7673339 | 39.5 | 81606.76 | 23094 | 24.1 |
| Group 1 | chr12: 51951667-51951834 | 3.4 | 103235.36 | 48282 | 25.8 |
| Group 1 | chrX: 71463824-71466005 | 18.2 | 1347806.8 | 635382 | 47.9 |
| Group 1 | chr3: 30623199-30623273 | 28.6 | 45765.08 | 13730 | 18.6 |
| Group 1 | chr7: 140924566-140924764 | 37.1 | 122392.12 | 43501 | 27.6 |
| Group 1 | chr2: 25281452-25282711 | 71.5 | 778047.68 | 318996 | 43.7 |
| Group 1 | chr16: 67562407-67562724 | 42.2 | 195929.36 | 56891 | 31.7 |
| Group 1 | chr20: 52972407-52973333 | 1.4 | 572267 | 243700 | 41.0 |
| Group 1 | chr20: 32372164-32372549 | 56.4 | 237950.64 | 47851 | 33.5 |
| Group 1 | chr2: 147844517-147844706 | 40.3 | 116830.48 | 12640 | 27.2 |
| Group 1 | chr3: 89399318-89400345 | 13.4 | 634680.96 | 96410 | 41.3 |
| Group 1 | chr17: 7668402-7669690 | 36.3 | 795968.52 | 7784 | 43.6 |
| Group 1 | chr16: 68833290-68835542 | 3.8 | 1391681.96 | 235841 | 48.0 |
| Group 1 | chr9: 117712389-117717491 | 91.2 | 3152867.96 | 915545 | 55.8 |
| Group 1 | chr21: 34821277-34821696 | 1.3 | 258961.28 | 34869 | 33.9 |
| Group 1 | chr16: 67029147-67029485 | 26.6 | 208906.52 | 42376 | 31.6 |
| Group 1 | chr17: 7675053-7675493 | 1.2 | 271938.44 | 50572 | 34.7 |
| Group 1 | chr2: 147844803-147845207 | 45.1 | 249691.88 | 68477 | 33.6 |
| Group 1 | chr17: 43044295-43045802 | 77.2 | 931301.76 | 29724 | 45.1 |
| Group 1 | chr11: 45885496-45885921 | 32.8 | 262669.04 | 31012 | 34.4 |
| Group 1 | chrX: 53191321-53193332 | 45.5 | 1242753.6 | 363643 | 47.2 |
| Group 1 | chr2: 25252194-25252315 | 33.2 | 74809.2 | 1177 | 22.7 |
| Group 1 | chr17: 16030094-16032483 | 10.7 | 1476342.48 | 420214 | 48.6 |
| Group 1 | chr12: 49039435-49039617 | 53.7 | 112504.76 | 16859 | 27.0 |
| Group 2 | chr9: 21994139-21994491 | 4.8 | 217557.96 | 66332 | 32.7 |
| Group 1 | chr17: 49677933-49678163 | 45.2 | 142166.84 | 17849 | 28.6 |
| Group 1 | chr1: 202015209-202017188 | 57.6 | 1222978.88 | 552664 | 47.3 |
| Group 1 | chr19: 1223638-1226446 | 16.2 | 1735267.72 | 861692 | 50.2 |
| Group 1 | chr21: 43107451-43107606 | 48.6 | 95819.84 | 18637 | 25.6 |
| Group 1 | chr20: 53487144-53495330 | 60.9 | 5058656.6 | 1340039 | 59.5 |
| Group 1 | chr16: 68737225-68737463 | 44.2 | 147110.52 | 53572 | 29.3 |
| Group 1 | chrX: 41232387-41236579 | 66.5 | 2590524.36 | 215162 | 54.2 |
| Group 1 | chr13: 32398162-32399672 | 52.5 | 933155.64 | 297690 | 44.9 |
| Group 1 | chr7: 55205256-55211569 | 18.6 | 3901217.52 | 1109075 | 57.8 |
| Group 1 | chr19: 10502697-10502805 | 29.3 | 66775.72 | 8696 | 22.4 |
| Group 1 | chr16: 67571148-67571264 | 25.1 | 71719.4 | 24973 | 22.9 |
| Group 1 | chr12: 77830905-77831704 | 66.3 | 493786.08 | 151153 | 39.4 |
| Group 1 | chr9: 21967752-21968242 | 26.9 | 302836.44 | 93364 | 35.5 |
| Group 1 | chr11: 45900138-45900452 | 39.7 | 194075.48 | 23245 | 31.1 |
| Group 1 | chr6: 36677793-36677933 | 38.3 | 86550.44 | 38373 | 24.5 |
| Group 1 | chr19: 35719784-35721804 | 3.8 | 1248315.24 | 606933 | 47.7 |
| Group 2 | chr6: 36685751-36687339 | 16.9 | 981356.52 | 85097 | 45.6 |
| Group 1 | chr17: 16064068-16064187 | 6.5 | 73573.28 | 10135 | 23.2 |
| Group 1 | chr7: 55170307-55171045 | 7.8 | 456090.52 | 140100 | 38.7 |
| Group 1 | chr17: 65538203-65538343 | 9.2 | 86550.44 | 37255 | 24.7 |
| Group 1 | chr14: 22971177-22973568 | 3.2 | 1477578.4 | 366649 | 48.7 |
| Group 1 | chrX: 44873173-44873712 | 8.1 | 333116.48 | 35483 | 35.6 |
| Group 1 | chr12: 114682812-114684164 | 85.2 | 835517.96 | 68989 | 43.8 |
| Group 1 | chr3: 30691420-30694142 | 49.3 | 1682123.16 | 169598 | 49.9 |
| Group 1 | chr16: 67098710-67101058 | 71.2 | 1451006.12 | 192217 | 48.7 |
| Group 1 | chr22: 41092610-41093098 | 35.6 | 301600.52 | 19593 | 35.4 |
| Group 1 | chr8: 22692791-22693302 | 56.0 | 315813.6 | 140108 | 35.9 |
| Group 1 | chr12: 49037125-49038989 | 88.8 | 1151913.48 | 434074 | 47.1 |
| Group 1 | chr12: 51993985-51997079 | 56.2 | 1912004.28 | 674443 | 51.4 |
| Group 1 | chr10: 62090862-62096948 | 76.4 | 3760940.6 | 1346841 | 57.1 |
| Group 1 | chr3: 177051504-177051726 | 2.9 | 137223.16 | 32894 | 28.5 |

TABLE 7-continued

Target genomics biomarkers to be detected in a method.

| Group ID | Genomic location of the target sequence | Collision Energy | Precursor (M/z) | Product (M/z) | Retention Time |
|---|---|---|---|---|---|
| Group 1 | chrX: 45111382-45112779 | 1.0 | 863326.16 | 273468 | 44.7 |
| Group 1 | chr9: 21974404-21975133 | 43.1 | 450528.88 | 221089 | 38.3 |
| Group 1 | chr17: 49598884-49600522 | 18.6 | 1012254.52 | 28495 | 45.7 |
| Group 1 | chr8: 22687658-22691482 | 18.0 | 2363115.08 | 731306 | 53.1 |
| Group 1 | chrX: 123960560-123960866 | 56.9 | 189131.8 | 89704 | 30.8 |
| Group 1 | chr7: 142855014-142855385 | 38.1 | 229299.2 | 78144 | 33.2 |
| Group 1 | chr12: 49059613-49060152 | 60.2 | 333116.48 | 41864 | 35.8 |
| Group 1 | chr7: 140734012-140734770 | 41.5 | 468449.72 | 200997 | 38.9 |
| Group 1 | chr1: 26696031-26697540 | 2.4 | 932537.68 | 76527 | 44.9 |
| Group 1 | chr11: 32434700-32435558 | 55.4 | 530245.72 | 44542 | 40.0 |
| Group 1 | chr1: 26779023-26782110 | 79.6 | 1907678.56 | 935691 | 51.3 |
| Group 1 | chrX: 71375167-71375286 | 12.0 | 73573.28 | 8745 | 23.0 |
| Group 1 | chr17: 58330884-58332508 | 85.9 | 1003603.08 | 212087 | 45.8 |
| Group 1 | chr12: 49031175-49033964 | 70.4 | 1723526.48 | 483130 | 50.4 |
| Group 1 | chr17: 65560825-65560899 | 20.9 | 45765.08 | 17098 | 18.6 |
| Group 1 | chr19: 33299934-33302524 | 0.0 | 1600552.44 | 356029 | 49.5 |
| Group 1 | chr9: 117708199-117708318 | 9.4 | 73573.28 | 2272 | 23.2 |
| Group 1 | chr20: 32432880-32432985 | 10.5 | 64921.84 | 15059 | 21.7 |
| Group 1 | chr21: 34886843-34888690 | 82.2 | 1141408.16 | 68525 | 46.4 |
| Group 1 | chr3: 121431426-121432417 | 48.5 | 612434.4 | 205379 | 41.6 |
| Group 1 | chr9: 136522850-136523188 | 2.7 | 208906.52 | 48466 | 32.2 |
| Group 1 | chr11: 32417577-32417654 | 26.6 | 47618.96 | 15601 | 19.1 |
| Group 1 | chr12: 40293545-40293663 | 13.2 | 72955.32 | 31632 | 23.1 |
| Group 1 | chr7: 152151442-152151581 | 44.1 | 85932.48 | 15427 | 24.5 |
| Group 1 | chr7: 140777991-140778075 | 32.5 | 51944.68 | 14620 | 19.7 |
| Group 1 | chr15: 75409836-75409991 | 29.9 | 95819.84 | 43037 | 25.3 |
| Group 1 | chr19: 47000331-47005077 | 11.0 | 2932874.2 | 657563 | 54.6 |
| Group 1 | chr5: 112755075-112755094 | 9.6 | 11777.28 | 1488 | 7.1 |
| Group 1 | chr3: 89449225-89449374 | 48.1 | 92112.08 | 23567 | 24.7 |
| Group 1 | chrX: 77557451-77557645 | 11.0 | 119920.28 | 15029 | 27.3 |
| Group 1 | chr10: 110584183-110584396 | 22.2 | 131661.52 | 18180 | 27.9 |
| Group 1 | chr3: 142515395-142515515 | 40.3 | 74191.24 | 9454 | 23.0 |
| Group 1 | chr1: 6199370-6199619 | 21.5 | 153908.08 | 11922 | 29.4 |
| Group 1 | chr3: 142578646-142578826 | 7.2 | 111268.84 | 48341 | 26.8 |
| Group 2 | chr3: 121509561-121509703 | 19.9 | 87786.36 | 27017 | 24.5 |
| Group 1 | chr3: 41234139-41234297 | 11.1 | 97673.72 | 40306 | 25.0 |
| Group 1 | chr3: 142497013-142497192 | 39.2 | 110650.88 | 29175 | 26.1 |
| Group 1 | chr4: 105261759-105261848 | 3.2 | 55034.48 | 8752 | 20.5 |
| Group 1 | chrX: 77600434-77600564 | 13.3 | 80370.84 | 12435 | 24.0 |
| Group 1 | chr12: 112472944-112473040 | 14.0 | 59360.2 | 21103 | 21.3 |
| Group 1 | chr4: 54289009-54289114 | 29.3 | 64921.84 | 9125 | 22.1 |
| Group 1 | chr13: 32376670-32376791 | 6.8 | 74809.2 | 23599 | 22.9 |
| Group 1 | chr1: 11212796-11212908 | 1.1 | 69247.56 | 1529 | 22.3 |
| Group 1 | chr17: 65536869-65537063 | 11.5 | 119920.28 | 45654 | 26.7 |
| Group 1 | chr1: 161176912-161177106 | 1.9 | 119920.28 | 28271 | 27.4 |
| Group 1 | chr7: 152187715-152187847 | 5.8 | 81606.76 | 13390 | 23.9 |
| Group 1 | chr3: 121485041-121485184 | 42.4 | 88404.32 | 27005 | 24.2 |
| Group 1 | chr12: 40303948-40304134 | 6.0 | 114976.6 | 30908 | 27.0 |
| Group 1 | chr4: 54230504-54230606 | 20.8 | 63067.96 | 29765 | 22.0 |
| Group 1 | chr15: 75410134-75410286 | 45.9 | 93965.96 | 39868 | 24.6 |
| Group 1 | chr11: 108246964-108247127 | 16.9 | 100763.52 | 26796 | 25.7 |
| Group 1 | chr1: 11228668-11228918 | 29.4 | 154526.04 | 57538 | 29.7 |
| Group 1 | chr5: 38503976-38504121 | 46.4 | 89640.24 | 44487 | 24.4 |
| Group 1 | chr17: 49619234-49619385 | 10.3 | 93348 | 20387 | 25.0 |
| Group 1 | chr19: 35719469-35719541 | 17.4 | 44529.16 | 9413 | 18.7 |
| Group 1 | chr13: 32319077-32319325 | 15.6 | 153290.12 | 32930 | 29.5 |
| Group 1 | chr20: 32359747-32359791 | 6.3 | 27226.28 | 1361 | 13.9 |
| Group 1 | chrX: 41183998-41184128 | 34.7 | 80370.84 | 25214 | 23.6 |
| Group 1 | chr3: 177098466-177098541 | 2.2 | 46383.04 | 7591 | 18.9 |
| Group 1 | chr19: 35736912-35736986 | 7.7 | 45765.08 | 9881 | 18.5 |
| Group 1 | chr3: 89479397-89482134 | 18.2 | 1691392.56 | 53780 | 50.3 |
| Group 1 | chr2: 197396056-197396328 | 20.1 | 168121.16 | 24753 | 30.1 |
| Group 1 | chr12: 40354299-40354492 | 49.4 | 119302.32 | 36891 | 26.7 |
| Group 1 | chrX: 124050186-124050309 | 6.6 | 76045.12 | 5517 | 23.6 |
| Group 1 | chr12: 114674165-114674835 | 6.0 | 414069.24 | 38424 | 37.5 |
| Group 1 | chr17: 39519956-39520087 | 44.5 | 80988.8 | 3554 | 23.8 |
| Group 1 | chr7: 106872537-106872602 | 16.5 | 40203.44 | 19139 | 17.5 |
| Group 1 | chr19: 45361524-45361642 | 38.3 | 72955.32 | 11557 | 22.5 |
| Group 1 | chr12: 77966229-77966301 | 4.9 | 44529.16 | 20674 | 19.0 |
| Group 2 | chr4: 54727823-54727927 | 16.8 | 64303.88 | 3911 | 21.5 |
| Group 1 | chr3: 121519871-121520083 | 7.7 | 131043.56 | 65466 | 28.1 |
| Group 1 | chr14: 104769349-104770420 | 19.4 | 661871.2 | 274771 | 42.0 |
| Group 1 | chr12: 78127167-78127208 | 1.0 | 25372.4 | 8912 | 13.8 |
| Group 1 | chr4: 1801620-1801743 | 13.0 | 76045.12 | 7038 | 23.6 |
| Group 1 | chr4: 54295125-54298245 | 53.9 | 1928071.24 | 844291 | 51.4 |
| Group 1 | chrX: 71424154-71424238 | 31.0 | 51944.68 | 12872 | 20.2 |

TABLE 7-continued

Target genomics biomarkers to be detected in a method.

| Group ID | Genomic location of the target sequence | Collision Energy | Precursor (M/z) | Product (M/z) | Retention Time |
|---|---|---|---|---|---|
| Group 1 | chr4: 54738429-54740715 | 96.1 | 1412692.6 | 212248 | 48.4 |
| Group 1 | chr16: 68808693-68808848 | 3.9 | 95819.84 | 18253 | 24.9 |
| Group 1 | chr11: 45903365-45903440 | 33.6 | 46383.04 | 6153 | 19.0 |
| Group 1 | chrX: 53194139-53194738 | 44.9 | 370194.08 | 183464 | 36.5 |
| Group 1 | chr17: 12139839-12139884 | 17.7 | 27844.24 | 11573 | 14.7 |
| Group 1 | chr19: 35727156-35727269 | 32.2 | 69865.52 | 290 | 22.2 |
| Group 1 | chr7: 152263016-152263130 | 32.7 | 70483.48 | 5525 | 22.6 |
| Group 1 | chr11: 108271251-108271406 | 10.5 | 95819.84 | 45948 | 25.6 |
| Group 1 | chr6: 36684097-36684546 | 59.0 | 277500.08 | 75872 | 34.6 |
| Group 1 | chr3: 179203544-179203789 | 30.1 | 151436.24 | 65203 | 28.9 |
| Group 1 | chr17: 16080408-16080509 | 38.9 | 62450 | 22281 | 21.6 |
| Group 1 | chr7: 152145153-152145295 | 37.7 | 87786.36 | 11732 | 24.6 |
| Group 1 | chr19: 35736690-35736827 | 14.3 | 84696.56 | 4324 | 24.4 |
| Group 1 | chr10: 61940183-61940408 | 55.7 | 139077.04 | 54417 | 28.7 |
| Group 1 | chrX: 71407974-71408151 | 35.2 | 109414.96 | 2725 | 26.0 |
| Group 1 | chr5: 177267562-177267718 | 9.4 | 96437.8 | 22016 | 25.5 |
| Group 1 | chr19: 35737636-35737743 | 1.5 | 66157.76 | 27643 | 22.0 |
| Group 1 | chrX: 53396227-53396380 | 42.5 | 94583.92 | 34641 | 25.1 |
| Group 1 | chrX: 53382506-53382660 | 27.9 | 95201.88 | 13811 | 24.7 |
| Group 1 | chr3: 142566121-142566261 | 5.3 | 86550.44 | 3001 | 24.0 |
| Group 1 | chr7: 152358587-152358675 | 15.2 | 54416.52 | 7174 | 20.5 |
| Group 1 | chr1: 11114318-11114453 | 1.1 | 83460.64 | 24491 | 24.0 |
| Group 1 | chr7: 81725890-81726017 | 5.0 | 78516.96 | 5202 | 23.0 |
| Group 1 | chr1: 6181471-6181486 | 5.4 | 9305.44 | 3655 | 4.8 |
| Group 1 | chr22: 41170406-41170571 | 16.6 | 101999.44 | 41440 | 25.3 |
| Group 1 | chr7: 55143305-55143488 | 12.1 | 113122.72 | 27484 | 26.9 |
| Group 1 | chr19: 40408158-40408256 | 22.5 | 60596.12 | 22030 | 21.2 |
| Group 1 | chr4: 152321258-152323149 | 49.4 | 1168598.4 | 215234 | 47.0 |
| Group 1 | chr3: 169146226-169146305 | 11.2 | 48854.88 | 4388 | 18.9 |
| Group 1 | chr1: 26762973-26763285 | 61.4 | 192839.56 | 27627 | 31.5 |
| Group 1 | chr17: 39551038-39551142 | 5.6 | 64303.88 | 11359 | 21.5 |
| Group 1 | chr3: 169090000-169090236 | 8.4 | 145874.6 | 65672 | 28.7 |
| Group 1 | chr16: 67626555-67626715 | 10.2 | 98909.64 | 33607 | 25.1 |
| Group 1 | chr3: 47016408-47017254 | 7.9 | 522830.2 | 6156 | 40.0 |
| Group 1 | chr7: 55165280-55165437 | 33.8 | 97055.76 | 9970 | 25.5 |
| Group 1 | chr12: 112450318-112450512 | 37.8 | 119920.28 | 7301 | 27.5 |
| Group 1 | chrX: 71454170-71454237 | 22.3 | 41439.36 | 18885 | 17.9 |
| Group 1 | chrX: 41123471-41123724 | 31.4 | 156379.92 | 74264 | 29.2 |
| Group 1 | chr7: 152250853-152250966 | 14.7 | 69865.52 | 18587 | 22.3 |
| Group 1 | chr8: 116848946-116849029 | 26.6 | 51326.72 | 11871 | 19.9 |
| Group 1 | chr3: 142466324-142466533 | 52.9 | 129189.68 | 20348 | 27.6 |
| Group 1 | chr9: 136500552-136500847 | 47.1 | 182334.24 | 71112 | 31.0 |
| Group 1 | chr19: 35727881-35727985 | 6.2 | 64303.88 | 27689 | 21.7 |
| Group 1 | chr7: 140781576-140781693 | 4.5 | 72337.36 | 9112 | 23.2 |
| Group 1 | chrX: 71389585-71389665 | 6.7 | 49472.84 | 18285 | 19.3 |
| Group 1 | chr3: 179234094-179234712 | 19.1 | 381935.32 | 57580 | 37.4 |
| Group 1 | chr14: 104773455-104773580 | 19.0 | 77281.04 | 36654 | 23.3 |
| Group 1 | chr12: 40334967-40335157 | 17.6 | 117448.44 | 21080 | 26.9 |
| Group 1 | chr1: 92841766-92841924 | 14.8 | 97673.72 | 39958 | 25.8 |
| Group 1 | chr5: 68239898-68239937 | 3.6 | 24136.48 | 9281 | 13.5 |
| Group 1 | chr4: 152326006-152326231 | 44.7 | 139077.04 | 768 | 28.7 |
| Group 1 | chr12: 25225614-25225773 | 30.4 | 98291.68 | 22673 | 25.7 |
| Group 1 | chr7: 55201735-55201782 | 17.1 | 29080.16 | 8595 | 15.3 |
| Group 1 | chr7: 142861052-142861186 | 11.0 | 82842.68 | 1887 | 24.2 |
| Group 1 | chr15: 75381613-75381705 | 27.6 | 56888.36 | 3158 | 21.0 |
| Group 1 | chr1: 92837456-92837633 | 25.3 | 109414.96 | 52136 | 25.9 |
| Group 1 | chrX: 124066356-124066436 | 23.5 | 49472.84 | 3953 | 19.8 |
| Group 2 | chrX: 45089743-45089930 | 36.7 | 115594.56 | 37625 | 27.2 |
| Group 1 | chr2: 211750639-211750704 | 9.7 | 40203.44 | 12783 | 17.3 |
| Group 1 | chr2: 177230303-177232030 | 59.7 | 1067252.96 | 57206 | 46.5 |
| Group 1 | chr12: 77994803-77994871 | 30.6 | 42057.32 | 5968 | 17.7 |
| Group 1 | chr2: 177234005-177234271 | 14.8 | 164413.4 | 55350 | 29.4 |

Step 2. According to the retention time of each divider in group 2, and the retention time of each target molecule in group 1, we substantially separate the detection of the targets from group 1 into a certain number of detection segments which are divided/separated by the genomics biomarker dividers from group 2, and create the table (Table 8) below. The actual detection time for each molecule of interest and for each divider is used to establish the detection schedule table (Table 8). The actual detection time may change with a different HPLC or running a different gradient HPLC method, but the relationship (the relative positions of the analytes) represented on the table is stable which has been proven by repeated assays under different HPLC methods.

TABLE 8

Detection Schedule after implementing the BF-Quant strategy.

| | | Chromosome locations of nucleic acid sequences covering cancer related mutations | Retention Time |
|---|---|---|---|
| Detection Segment 1 | Group 1 | chr1: 6181471-6181486 | 4.8 |
| | Group 1 | chr5: 112755075-112755094 | 7.1 |
| | Group 1 | chr5: 68239898-68239937 | 13.5 |
| | Group 1 | chr12: 78127167-78127208 | 13.8 |
| | Group 1 | chr20: 32359747-32359791 | 13.9 |
| | Group 1 | chr17: 12139839-12139884 | 14.7 |
| | Group 1 | chr7: 55201735-55201782 | 15.3 |
| | Group 1 | chr2: 211750639-211750704 | 17.3 |
| | Group 1 | chr7: 106872537-106872602 | 17.5 |
| | Group 1 | chr12: 77994803-77994871 | 17.7 |
| | Group 1 | chrX: 71454170-71454237 | 17.9 |
| | Group 1 | chr19: 35736912-35736986 | 18.5 |
| | Group 1 | chr3: 30623199-30623273 | 18.6 |
| | Group 1 | chr17: 65560825-65560899 | 18.6 |
| | Group 1 | chr19: 35719469-35719541 | 18.7 |
| | Group 1 | chr3: 177098466-177098541 | 18.9 |
| | Group 1 | chr3: 169146226-169146305 | 18.9 |
| | Group 1 | chr11: 45903365-45903440 | 19.0 |
| | Group 1 | chr12: 77966229-77966301 | 19.0 |
| | Group 1 | chr11: 32417577-32417654 | 19.1 |
| | Group 1 | chrX: 71389585-71389665 | 19.3 |
| | Group 1 | chr7: 140777991-140778075 | 19.7 |
| | Group 1 | chrX: 124066356-124066436 | 19.8 |
| | Group 1 | chr8: 116848946-116849029 | 19.9 |
| | Group 1 | chrX: 71424154-71424238 | 20.2 |
| | Group 1 | chr7: 152358587-152358675 | 20.5 |
| | Group 1 | chr4: 105261759-105261848 | 20.5 |
| | Group 1 | chr15: 75381613-75381705 | 21.0 |
| | Group 1 | chr19: 40408158-40408256 | 21.2 |
| | Group 1 | chr12: 112472944-112473040 | 21.3 |
| | Group 2 | chr4: 54727823-54727927 | 21.5 |
| Detection Segment 2 | Group 1 | chr17: 39551038-39551142 | 21.5 |
| | Group 1 | chr17: 16080408-16080509 | 21.6 |
| | Group 1 | chr19: 35727881-35727985 | 21.7 |
| | Group 1 | chr20: 32432880-32432985 | 21.7 |
| | Group 1 | chr4: 54230504-54230606 | 22.0 |
| | Group 1 | chr19: 35737636-35737743 | 22.0 |
| | Group 1 | chr4: 54289009-54289114 | 22.1 |
| | Group 1 | chr19: 35727156-35727269 | 22.2 |
| | Group 1 | chr1: 11212796-11212908 | 22.3 |
| | Group 1 | chr7: 152250853-152250966 | 22.3 |
| | Group 1 | chr19: 10502697-10502805 | 22.4 |
| | Group 1 | chr19: 45361524-45361642 | 22.5 |
| | Group 1 | chr7: 152263016-152263130 | 22.6 |
| | Group 1 | chr2: 25252194-25252315 | 22.7 |
| | Group 1 | chr16: 67571148-67571264 | 22.9 |
| | Group 1 | chr13: 32376670-32376791 | 22.9 |
| | Group 1 | chr3: 142515395-142515515 | 23.0 |
| | Group 1 | chrX: 71375167-71375286 | 23.0 |
| | Group 1 | chr7: 81725890-81726017 | 23.0 |
| | Group 1 | chr12: 40293545-40293663 | 23.1 |
| | Group 1 | chr7: 140781576-140781693 | 23.2 |
| | Group 1 | chr9: 117708199-117708318 | 23.2 |
| | Group 1 | chr17: 16064068-16064187 | 23.2 |
| | Group 1 | chr14: 104773455-104773580 | 23.3 |
| | Group 1 | chr17: 12069724-12069849 | 23.5 |
| | Group 1 | chrX: 41183998-41184128 | 23.6 |
| | Group 1 | chr4: 1801620-1801743 | 23.6 |
| | Group 1 | chrX: 124050186-124050309 | 23.6 |
| | Group 1 | chr17: 39519956-39520087 | 23.8 |
| | Group 1 | chr7: 152187715-152187847 | 23.9 |
| | Group 1 | chr3: 142566121-142566261 | 24.0 |
| | Group 1 | chr1: 11114318-11114453 | 24.0 |
| | Group 1 | chrX: 77600434-77600564 | 24.0 |
| | Group 1 | chr17: 7673207-7673339 | 24.1 |
| | Group 1 | chr3: 121485041-121485184 | 24.2 |
| | Group 1 | chr7: 142861052-142861186 | 24.2 |
| | Group 1 | chr5: 38503976-38504121 | 24.4 |
| | Group 1 | chr19: 35736690-35736827 | 24.4 |
| | Group 1 | chr6: 36677793-36677933 | 24.5 |
| | Group 1 | chr7: 152151442-152151581 | 24.5 |
| | Group 2 | chr3: 121509561-121509703 | 24.5 |

TABLE 8-continued

Detection Schedule after implementing the BF-Quant strategy.

| | | Chromosome locations of nucleic acid sequences covering cancer related mutations | Retention Time |
|---|---|---|---|
| Detection Segment 3 | Group 1 | chr7: 152145153-152145295 | 24.6 |
| | Group 1 | chr15: 75410134-75410286 | 24.6 |
| | Group 1 | chr17: 65538203-65538343 | 24.7 |
| | Group 1 | chrX: 53382506-53382660 | 24.7 |
| | Group 1 | chr3: 89449225-89449374 | 24.7 |
| | Group 1 | chr16: 68808693-68808848 | 24.9 |
| | Group 1 | chr17: 49619234-49619385 | 25.0 |
| | Group 1 | chr3: 41234139-41234297 | 25.0 |
| | Group 1 | chrX: 53396227-53396380 | 25.1 |
| | Group 1 | chr16: 67626555-67626715 | 25.1 |
| | Group 1 | chr15: 75409836-75409991 | 25.3 |
| | Group 1 | chr22: 41170406-41170571 | 25.3 |
| | Group 1 | chr7: 55165280-55165437 | 25.5 |
| | Group 1 | chr5: 177267562-177267718 | 25.5 |
| | Group 1 | chr11: 108271251-108271406 | 25.6 |
| | Group 1 | chr21: 43107451-43107606 | 25.6 |
| | Group 1 | chr12: 25225614-25225773 | 25.7 |
| | Group 1 | chr11: 108246964-108247127 | 25.7 |
| | Group 1 | chr1: 92841766-92841924 | 25.8 |
| | Group 1 | chr12: 51951667-51951834 | 25.8 |
| | Group 1 | chr1: 92837456-92837633 | 25.9 |
| | Group 1 | chrX: 71407974-71408151 | 26.0 |
| | Group 1 | chr3: 142497013-142497192 | 26.1 |
| | Group 1 | chr12: 40354299-40354492 | 26.7 |
| | Group 1 | chr17: 65536869-65537063 | 26.7 |
| | Group 1 | chr3: 142578646-142578826 | 26.8 |
| | Group 1 | chr12: 40334967-40335157 | 26.9 |
| | Group 1 | chr7: 55143305-55143488 | 26.9 |
| | Group 1 | chr12: 49039435-49039617 | 27.0 |
| | Group 1 | chr12: 40303948-40304134 | 27.0 |
| | Group 1 | chr2: 147844517-147844706 | 27.2 |
| | Group 2 | chrX: 45089743-45089930 | 27.2 |
| Detection Segment 4 | Group 1 | chrX: 77557451-77557645 | 27.3 |
| | Group 1 | chr1: 161176912-161177106 | 27.4 |
| | Group 1 | chr12: 112450318-112450512 | 27.5 |
| | Group 1 | chr3: 142466324-142466533 | 27.6 |
| | Group 1 | chr7: 140924566-140924764 | 27.6 |
| | Group 1 | chr10: 110584183-110584396 | 27.9 |
| | Group 1 | chr3: 121519871-121520083 | 28.1 |
| | Group 1 | chr3: 177051504-177051726 | 28.5 |
| | Group 1 | chr17: 49677933-49678163 | 28.6 |
| | Group 1 | chr10: 61940183-61940408 | 28.7 |
| | Group 1 | chr4: 152326006-152326231 | 28.7 |
| | Group 1 | chrX: 53412900-53413138 | 28.7 |
| | Group 1 | chr3: 169090000-169090236 | 28.7 |
| | Group 1 | chr3: 179203544-179203789 | 28.9 |
| | Group 1 | chrX: 41123471-41123724 | 29.2 |
| | Group 1 | chr16: 68737225-68737463 | 29.3 |
| | Group 1 | chr1: 6199370-6199619 | 29.4 |
| | Group 1 | chr2: 177234005-177234271 | 29.4 |
| | Group 1 | chr13: 32319077-32319325 | 29.5 |
| | Group 1 | chr1: 11228668-11228918 | 29.7 |
| | Group 1 | chr2: 197396056-197396328 | 30.1 |
| | Group 1 | chrX: 123960560-123960866 | 30.8 |
| | Group 1 | chr9: 136500552-136500847 | 31.0 |
| | Group 1 | chr11: 45900138-45900452 | 31.1 |
| | Group 1 | chr1: 26762973-26763285 | 31.5 |
| | Group 1 | chr16: 67029147-67029485 | 31.6 |
| | Group 1 | chr16: 67562407-67562724 | 31.7 |
| | Group 1 | chr9: 136522850-136523188 | 32.2 |
| | Group 2 | chr9: 21994139-21994491 | 32.7 |
| Detection Segment 5 | Group 1 | chr7: 142855014-142855385 | 33.2 |
| | Group 1 | chr20: 32372164-32372549 | 33.5 |
| | Group 1 | chr20: 53185283-53185676 | 33.5 |
| | Group 1 | chr2: 147844803-147845207 | 33.6 |
| | Group 1 | chr21: 34821277-34821696 | 33.9 |
| | Group 1 | chr11: 45885496-45885921 | 34.4 |
| | Group 1 | chr6: 36684097-36684546 | 34.6 |
| | Group 1 | chr17: 7675053-7675493 | 34.7 |
| | Group 1 | chr20: 32358344-32358832 | 35.2 |
| | Group 1 | chr22: 41092610-41093098 | 35.4 |
| | Group 1 | chr9: 21967752-21968242 | 35.5 |
| | Group 1 | chrX: 44873173-44873712 | 35.6 |
| | Group 1 | chr17: 49646116-49646641 | 35.6 |

TABLE 8-continued

Detection Schedule after implementing the BF-Quant strategy.

| | Chromosome locations of nucleic acid sequences covering cancer related mutations | Retention Time |
|---|---|---|
| Group 1 | chr12: 49059613-49060152 | 35.8 |
| Group 1 | chr8: 22692791-22693302 | 35.9 |
| Group 1 | chrX: 53194139-53194738 | 36.5 |
| Group 1 | chr3: 179234094-179234712 | 37.4 |
| Group 1 | chr12: 114674165-114674835 | 37.5 |
| Group 1 | chr9: 21974404-21975133 | 38.3 |
| Group 1 | chr7: 55170307-55171045 | 38.7 |
| Group 1 | chr7: 140734012-140734770 | 38.9 |
| Group 1 | chr12: 77830905-77831704 | 39.4 |
| Group 1 | chr11: 32434700-32435558 | 40.0 |
| Group 1 | chr3: 47016408-47017254 | 40.0 |
| Group 1 | chr20: 52972407-52973333 | 41.0 |
| Group 1 | chr3: 89399318-89400345 | 41.3 |
| Group 1 | chr3: 121431426-121432417 | 41.6 |
| Group 1 | chr14: 104769349-104770420 | 42.0 |
| Group 1 | chr17: 7668402-7669690 | 43.6 |
| Group 1 | chr2: 25281452-25282711 | 43.7 |
| Group 1 | chr12: 114682812-114684164 | 43.8 |
| Group 1 | chrX: 45111382-45112779 | 44.7 |
| Group 1 | chr1: 26696031-26697540 | 44.9 |
| Group 1 | chr13: 32398162-32399672 | 44.9 |
| Group 1 | chr17: 43044295-43045802 | 45.1 |
| Group 2 | chr6: 36685751-36687339 | 45.6 |
| Group 1 | chr17: 49598884-49600522 | 45.7 |
| Group 1 | chr17: 58330884-58332508 | 45.8 |
| Group 1 | chr21: 34886843-34888690 | 46.4 |
| Group 1 | chr2: 177230303-177232030 | 46.5 |
| Group 1 | chr4: 152321258-152323149 | 47.0 |
| Group 1 | chr12: 49037125-49038989 | 47.1 |
| Group 1 | chrX: 53191321-53193332 | 47.2 |
| Group 1 | chr1: 202015209-202017188 | 47.3 |
| Group 1 | chr19: 35719784-35721804 | 47.7 |
| Group 1 | chrX: 71463824-71466005 | 47.9 |
| Group 1 | chr16: 68833290-68835542 | 48.0 |
| Group 1 | chr4: 54738429-54740715 | 48.4 |
| Group 1 | chr17: 16030094-16032483 | 48.6 |
| Group 1 | chr16: 67098710-67101058 | 48.7 |
| Group 1 | chr14: 22971177-22973568 | 48.7 |
| Group 1 | chr19: 33299934-33302524 | 49.5 |
| Group 1 | chr3: 30691420-30694142 | 49.9 |
| Group 1 | chr19: 1223638-1226446 | 50.2 |
| Group 1 | chr3: 89479397-89482134 | 50.3 |
| Group 1 | chr12: 49031175-49033964 | 50.4 |
| Group 1 | chr1: 26779023-26782110 | 51.3 |
| Group 1 | chr12: 51993985-51997079 | 51.4 |
| Group 1 | chr4: 54295125-54298245 | 51.4 |
| Group 1 | chr8: 22687658-22691482 | 53.1 |
| Group 1 | chr3: 10149787-10154072 | 54.0 |
| Group 1 | chrX: 41232387-41236579 | 54.2 |
| Group 1 | chr19: 47000331-47005077 | 54.6 |
| Group 1 | chr9: 117712389-117717491 | 55.8 |
| Group 1 | chr10: 62090862-62096948 | 57.1 |
| Group 1 | chrX: 53374149-53380186 | 57.2 |
| Group 1 | chr7: 55205256-55211569 | 57.8 |
| Group 1 | chr20: 53487144-53495330 | 59.5 |

Step 3. A body fluid genomics biomarker detection and quantification platform is therefore established through the BF-Quant. Detailed schedule of the detection of each biomarker is shown in Table 8. The transitions (the actual detection parameters to be implemented by the instrument) of each target (Table 7) can be compiled and load to instrument according to their detection schedules outlined in Table 8.

The invention is claimed as follows:

1. A method for detecting and quantifying analytes in a sample of a subject, the method comprising:
   (a) identifying and/or profiling the analytes;
   (b) identifying at least one endogenous divider analyte from the analytes;
   (c) dividing the analytes into a plurality of groups using the at least one divider analyte; and
   (d) detecting and/or quantifying a first group of analytes ending with a first of the at least one divider analyte by scanning and/or quantifying the first group of analytes while masking detection of remaining groups until a first threshold of intensity of the first of the at least one divider analyte is reached.

2. The method of claim 1 further comprising:
   (e) switching to detect and quantify a second group of analytes starting with the first of the at least one divider analyte by scanning and quantifying the second group of analytes until a second threshold of intensity of a second of the at least one divider analyte is reached.

3. The method of claim 2 comprising:
   (f) repeating step e) until each of the plurality of groups are scanned and quantified.

4. The method of claim 1, wherein the sample comprises a body fluid.

5. The method of claim 1, wherein the sample is selected from the group consisting of a saliva sample, a plasma sample, a sweat sample, a lacrimal fluid sample, a gastro intestinal fluid sample, a pancreatic fluid sample, a serum sample, a urine sample, and combinations thereof.

6. The method of claim 1, wherein at least one of the steps (a)-(d) is conducted by a mass spectrometry equipment.

7. The method of claim 1, wherein at least one of the plurality of groups comprises at least 500 analytes.

8. The method of claim 5, wherein at least one of the plurality of groups comprises at least 1000 analytes.

9. The method of claim 2, wherein at least one of the steps (a)-(e) is conducted by a mass spectrometry equipment.

10. The method of claim 3, wherein at least one of the steps (a)-(d) is conducted by a mass spectrometry equipment.

11. The method of claim 1, wherein the step (b) comprises ranking the analytes according to detectability of the analytes to identify the at least one divider analyte.

12. The method of claim 1, wherein the at least one divider analyte has an abundance, and the abundance of the at least one divider analyte is used as a threshold for each group of analytes next to the at least one divider analyte.

13. The method of claim 1, wherein the quantifying of the first group of analytes comprises using the first of the at least one divider analyte as an internal standard.

14. The method of claim 1, wherein the quantifying of the first group of analytes comprises adding an exogenous divider.

15. The method of claim 2, wherein the step (e) comprises changing detection parameters according to the second group of analytes.

16. The method of claim 15, wherein the detection parameters comprise retention time and intensity threshold specific to the analytes in the second group.

17. A system for detecting and quantifying analytes in a sample of a subject, the system comprising:
   an input member configured for receiving the sample in a detecting member;
   the detecting member configured for detecting and/or quantifying the analytes in the sample; and a control member comprising a storage member and a processor, wherein the storage member stores one or more instructions to cause the processor to execute steps comprising:
(a) identifying and/or profiling the analytes;
(b) identifying at least one endogenous divider analyte from the analytes;
(c) dividing the analytes into a plurality of groups using the at least one divider analyte; and
(c) detecting and/or quantifying a first group of analytes ending with a first of the at least one divider analyte by scanning and/or quantifying the first group of analytes while masking detection of remaining groups until a first threshold of intensity of the first of the at least one divider analyte is reached.

18. The system of claim 17, wherein the steps further comprise
(e) switching to detect and quantify a second group of analytes starting with the first of the at least one divider analyte by scanning and quantifying the second group of analytes until a second threshold of intensity of a second of the at least one divider analyte is reached.

19. The system of claim 18, wherein the steps further comprise
(f) repeating step e) until each of the plurality of groups are scanned and quantified.

20. The system of claim 17 further comprising an output member configured for generating a report of results of the detecting and/or quantifying step.

* * * * *